(12) United States Patent
Song et al.

(10) Patent No.: US 11,101,803 B2
(45) Date of Patent: Aug. 24, 2021

(54) SEMICONDUCTOR DEVICE

(71) Applicant: SAMSUNG ELECTRONICS CO., LTD., Suwon-si (KR)

(72) Inventors: Taejoong Song, Seongnam-si (KR); Jungho Do, Hwaseong-si (KR); Seungyoung Lee, Seoul (KR); Jonghoon Jung, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/820,835

(22) Filed: Mar. 17, 2020

(65) Prior Publication Data

US 2020/0220548 A1    Jul. 9, 2020

Related U.S. Application Data

(63) Continuation of application No. 16/677,165, filed on Nov. 7, 2019, now Pat. No. 10,622,999, which is a continuation of application No. 16/159,196, filed on Oct. 12, 2018, now Pat. No. 10,505,546.

(30) Foreign Application Priority Data

Feb. 28, 2018 (KR) .................... 10-2018-0024411

(51) Int. Cl.
| | |
|---|---|
| *H03K 19/17724* | (2020.01) |
| *H01L 27/02* | (2006.01) |
| *H01L 29/06* | (2006.01) |
| *H01L 23/528* | (2006.01) |

(Continued)

(52) U.S. Cl.
CPC ..... *H03K 19/17724* (2013.01); *H01L 23/528* (2013.01); *H01L 27/0207* (2013.01); *H01L 27/0886* (2013.01); *H01L 29/0653* (2013.01); *H01L 29/4232* (2013.01)

(58) Field of Classification Search
CPC .......... H03K 19/17724; H01L 27/0886; H01L 29/4232; H01L 29/0653; H01L 27/0207; H01L 23/528
See application file for complete search history.

(56) References Cited

U.S. PATENT DOCUMENTS

| | | |
|---|---|---|
| 9,412,616 B1 | 8/2016 | Xie et al. |
| 9,704,862 B2 | 7/2017 | Park et al. |
| 9,755,079 B2 | 9/2017 | Park et al. |

(Continued)

*Primary Examiner* — Daniel D Chang
(74) *Attorney, Agent, or Firm* — Sughrue Mion, PLLC

(57) ABSTRACT

A semiconductor device is provided. The semiconductor device includes first and second logic cells adjacent to each other on a substrate, and a mixed separation structure extending in a first direction between the first and second logic cells. Each logic cell includes first and second active fins that protrude from the substrate, the first and second active fins extending in a second direction intersecting the first direction and being spaced apart from each other in the first direction, and gate electrodes extending in the first direction and spanning the first and second active fins, and having a gate pitch. The mixed separation structure includes a first separation structure separating the first active fin of the first logic cell from the first active fin of the second logic cell; and a second separation structure on the first separation structure. A width of the first separation structure is greater than the gate pitch.

29 Claims, 59 Drawing Sheets

(51) Int. Cl.
    *H01L 29/423*     (2006.01)
    *H01L 27/088*     (2006.01)

(56) References Cited

U.S. PATENT DOCUMENTS

| | | |
|---|---|---|
| 10,050,058 B2 | 8/2018 | Song et al. |
| 2015/0102413 A1 | 4/2015 | Azmat et al. |
| 2016/0086947 A1 | 3/2016 | Park et al. |
| 2016/0254180 A1 | 9/2016 | Liu et al. |
| 2016/0268414 A1 | 9/2016 | Park et al. |
| 2017/0062403 A1* | 3/2017 | Song .................... G06F 30/398 |
| 2017/0117411 A1* | 4/2017 | Kim ................ H01L 21/823821 |
| 2017/0200651 A1 | 7/2017 | Lee et al. |
| 2017/0338229 A1* | 11/2017 | Oh .................... H01L 29/66674 |
| 2018/0006035 A1 | 1/2018 | Yuan et al. |
| 2018/0083036 A1 | 3/2018 | Agarwal et al. |
| 2018/0254287 A1* | 9/2018 | Seo ...................... G06F 30/394 |

\* cited by examiner

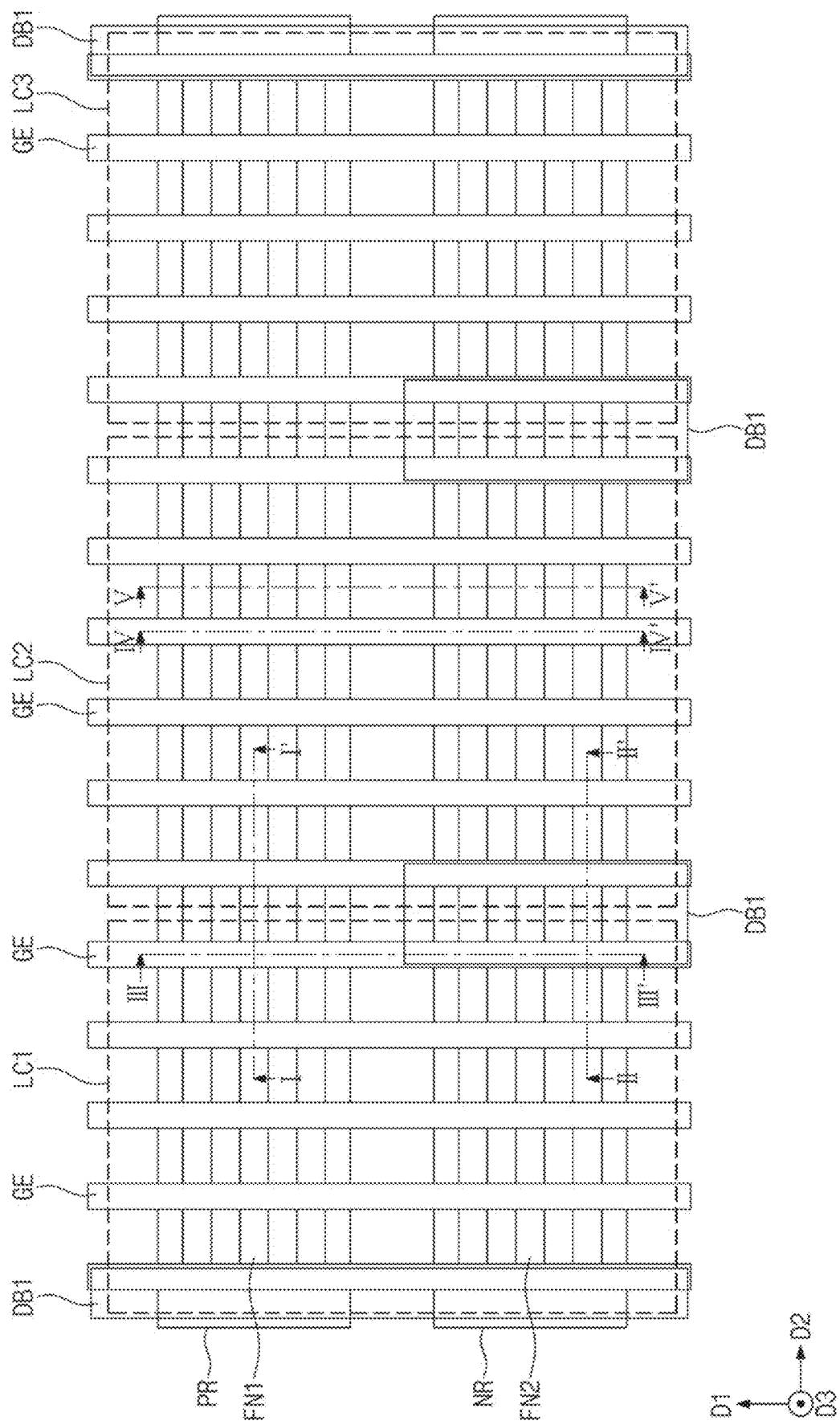

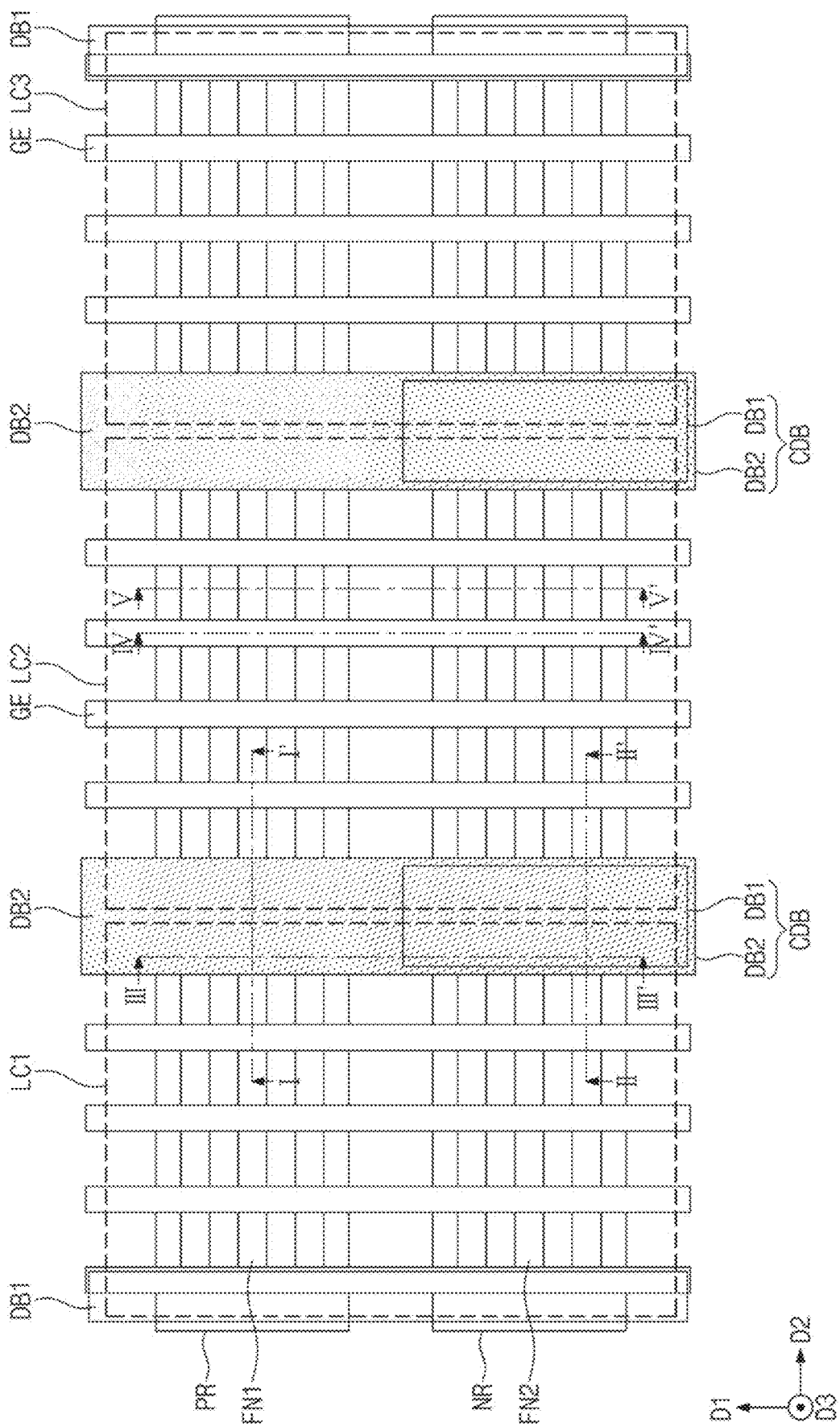

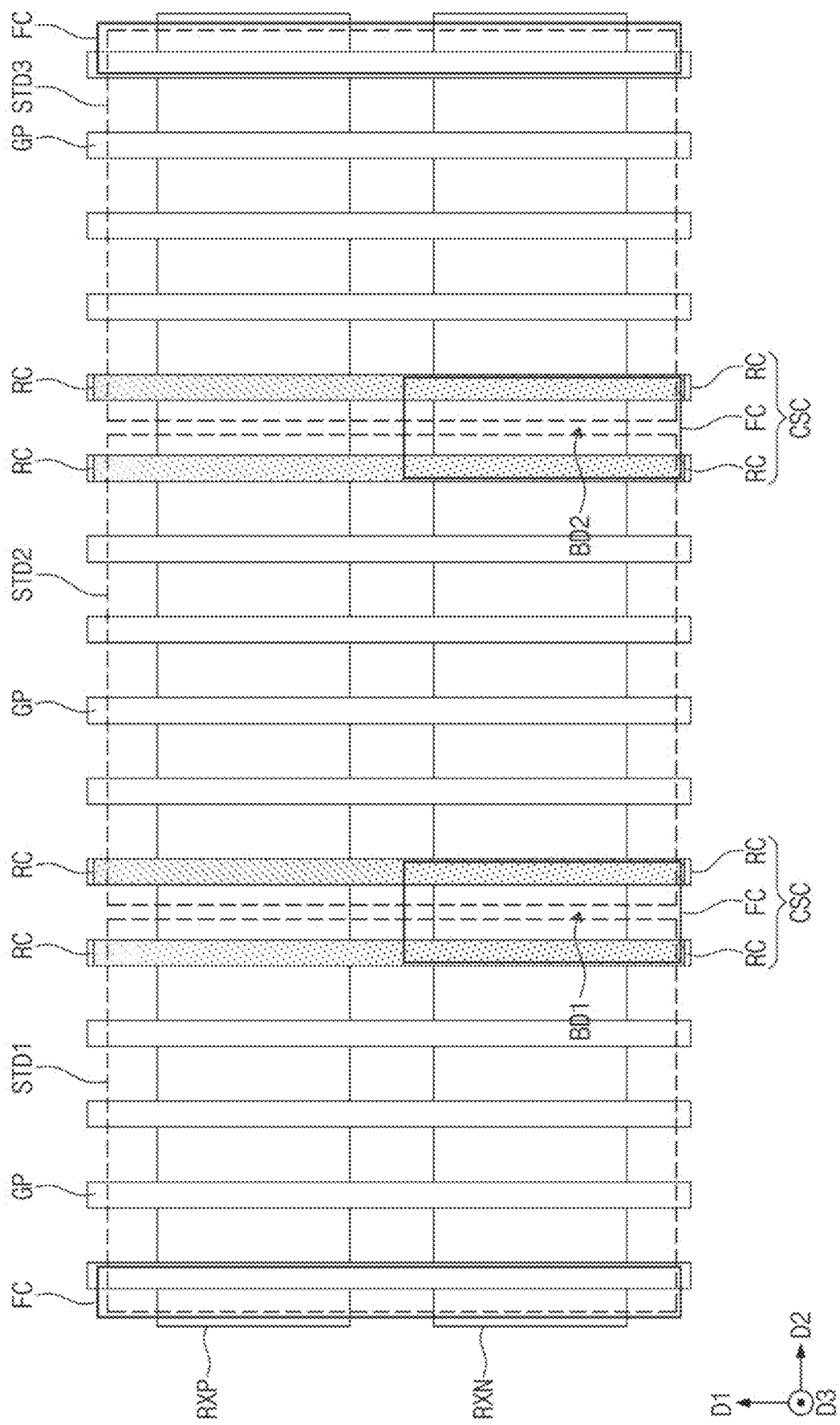

SEMICONDUCTOR DEVICE

CROSS-REFERENCE TO RELATED APPLICATIONS

This is a Continuation Application of U.S. application Ser. No. 16/677,165 filed Nov. 7, 2019, which is a Continuation Application of U.S. non-provisional application Ser. No. 16/159,196 filed on Oct. 12, 2018, now U.S. Pat. No. 10,505,546 issued Dec. 10, 2019, which claims priority under 35 U.S.C § 119 from Korean Patent Application No. 10-2018-0024411 filed on Feb. 28, 2018, in the Korean Intellectual Property Office, the entire contents of each of which are hereby incorporated by reference in their entireties.

BACKGROUND

Apparatuses, devices, and articles of manufacture consistent with the present disclosure relate to a semiconductor device, and more particularly, to a semiconductor device including a field effect transistor. Semiconductor devices are beneficial in electronic industry because of their small size, multi-functionality, and/or low fabrication cost. Semiconductor devices may encompass semiconductor memory devices storing logic data, semiconductor logic devices processing operations of logic data, and hybrid semiconductor devices having both memory and logic elements. Semiconductor devices have been increasingly required for high integration with the advanced development of the electronic industry. For example, semiconductor devices have been increasingly requested to have characteristics including high reliability, high speed, and/or multi-functionality. Semiconductor devices are gradually becoming more complicated and more integrated to meet these requested characteristics.

SUMMARY

It is an aspect to provide a semiconductor device including a field effect transistor that has enhanced electrical characteristics.

According to an aspect of an exemplary embodiment, there is provided a semiconductor device including a first logic cell and a second logic cell that are adjacent to each other on a substrate; and a mixed separation structure extending in a first direction between the first logic cell and the second logic cell, wherein each of the first logic cell and the second logic cell comprises a first active pattern and a second active pattern that extend in a second direction intersecting the first direction and that are spaced apart from each other in the first direction; and a plurality of gate electrodes extending in the first direction and spanning the first active pattern and the second active pattern, and having a gate pitch, and wherein the mixed separation structure comprises a first separation structure separating the first active pattern of the first logic cell from the first active pattern of the second logic cell; and a second separation structure on the first separation structure, wherein a width of the first separation structure is greater than the gate pitch.

According to another aspect of an exemplary embodiment, there is provided a semiconductor device including a substrate including a first active region and a second active region, the first active region and the second active region being spaced apart from each other in a first direction and extending in a second direction intersecting the first direction; a device isolation layer provided on the substrate and defining a first active pattern and a second active pattern, the first active pattern and the second active pattern extending in the second direction on the first active region and the second active region, respectively; and a mixed separation structure spanning the first active region and the second active region and extending in the first direction, wherein the mixed separation structure comprises a first separation structure selectively spanning the first active pattern except for the second active pattern; and a second separation structure spanning the first active pattern and the second active pattern, wherein a first level of a first bottom surface of the first separation structure is lower than a second level of a second bottom surface of the second separation structure.

According to another aspect of an exemplary embodiment, there is provided a semiconductor device including a first logic cell and a second logic cell that are adjacent to each other on a substrate; and a mixed separation structure extending in a first direction between the first logic cell and the second logic cell, wherein each of the first logic cell and the second logic cell comprises a first active region provided with a plurality of first transistors having a first conductivity; and a second active region provided with a plurality of second transistors having a second conductivity different from the first conductivity, and wherein the mixed separation structure comprises a first separation structure separating the first active region of the first logic cell from the first active region of the second logic cell; and a second separation structure extending in the first direction on the first separation structure and separating the second active region of the first logic cell from the second active region of the second logic cell, wherein the second separation structure comprises a second insulating material different from a first insulating material of the first separation structure.

BRIEF DESCRIPTION OF THE DRAWINGS

FIGS. 8, 10, and 12 illustrate plan views showing a method of manufacturing a semiconductor device according to exemplary embodiments;

FIG. 14 illustrates a layout according to exemplary embodiments;

DETAILED DESCRIPTION

Figure 1:
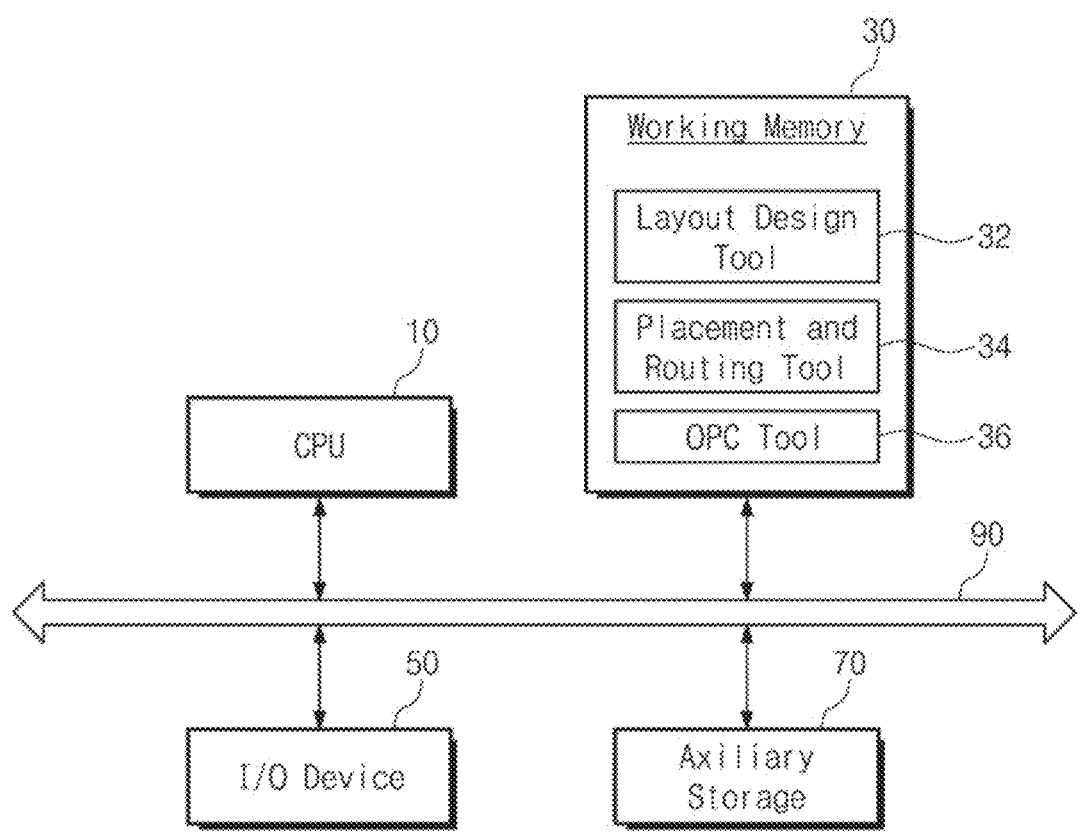
FIG. 1 illustrates a block diagram showing a computer system for designing a semiconductor device, according to exemplary embodiments.

FIG. 1 illustrates a block diagram showing a computer system for designing a semiconductor device, according to exemplary embodiments. Referring to FIG. 1, a computer system may include a central processing unit (CPU) 10, a working memory 30, an input/output (I/O) device 50, and an auxiliary storage 70. The computer system may be provided as a dedicated device for designing a layout according to exemplary embodiments. The computer system may be configured to drive various programs for design and verification simulation.

The CPU 10 may allow the computer system to execute software (e.g., application programs, operating system, and device drivers). The CPU 10 may process an operating system loaded in the working memory 30. The CPU 10 may execute various application programs driven based on the operating system. For example, the CPU 10 may process a layout design tool 32, a placement and routing tool 34, and/or an optical proximity correction (OPC) tool 36 that are loaded in the working memory 30.

The operating system or application programs may be loaded in the working memory 30. When the computer system is booted up, based on booting sequence, an operating system image (not shown) stored in the auxiliary storage 70 may be loaded to the working memory 30. Overall input/output operations of the computer system may be supported by the operating system. Likewise, the working memory 30 may be loaded with the application programs that are selected by a user or provided for a basic service.

The layout design tool 32 for layout design may be loaded from the auxiliary storage 70 to the working memory 30. The working memory 30 may be loaded from the auxiliary storage 70 with the placement and routing tool 34 that places designed standard cells and routes the placed standard cells. The working memory 30 may be loaded from the auxiliary storage 70 with the OPC tool 36 that performs an optical proximity correction (OPC) on designed layout data.

The layout design tool 32 may include a bias function by which specific layout patterns are changed in shapes and positions defined by a design rule. In addition, the layout design tool 32 may perform a design rule check (DRC) under the changed bias data condition. The working memory 30 may be either a volatile memory such as SRAM (Static Random Access Memory) or DRAM (Dynamic Random Access Memory) or a nonvolatile memory such as PRAM (Phase change Random Access Memory), MRAM (Magnetic Random Access Memory), ReRAM (Resistance Random Access Memory), FRAM (Ferroelectric Random Access Memory), or NOR Flash memory.

The I/O device 50 may control user input/output operations of user interfaces. For example, the I/O device 50 may include a keyboard or a monitor, allowing a designer to put relevant information.

The auxiliary storage 70 may serve as a storage medium for the computer system. The auxiliary storage 70 may store the application programs, the operating system image, and various data. The auxiliary storage 70 may be provided in the form of one of memory cards (e.g., MMC, eMMC, SD, and Micro SD) or in the form of a hard disk drive (HDD). The auxiliary storage 70 may include a NAND Flash memory having large memory capacity. Alternatively, the auxiliary storage 70 may include a NOR Flash memory or a next-generation volatile memory such as PRAM, MRAM, ReRAM, and FRAM.

A system interconnector 90 may be provided to serve as a system bus for providing a network in the computer system. The CPU 10, the working memory 30, the I/O device 50, and the auxiliary storage 70 may be electrically connected through the system interconnector 90 and may exchange data with each other. The system interconnector 90 may not be limited to the above descriptions, and may further include intermediary means for efficient management.

Figure 2:
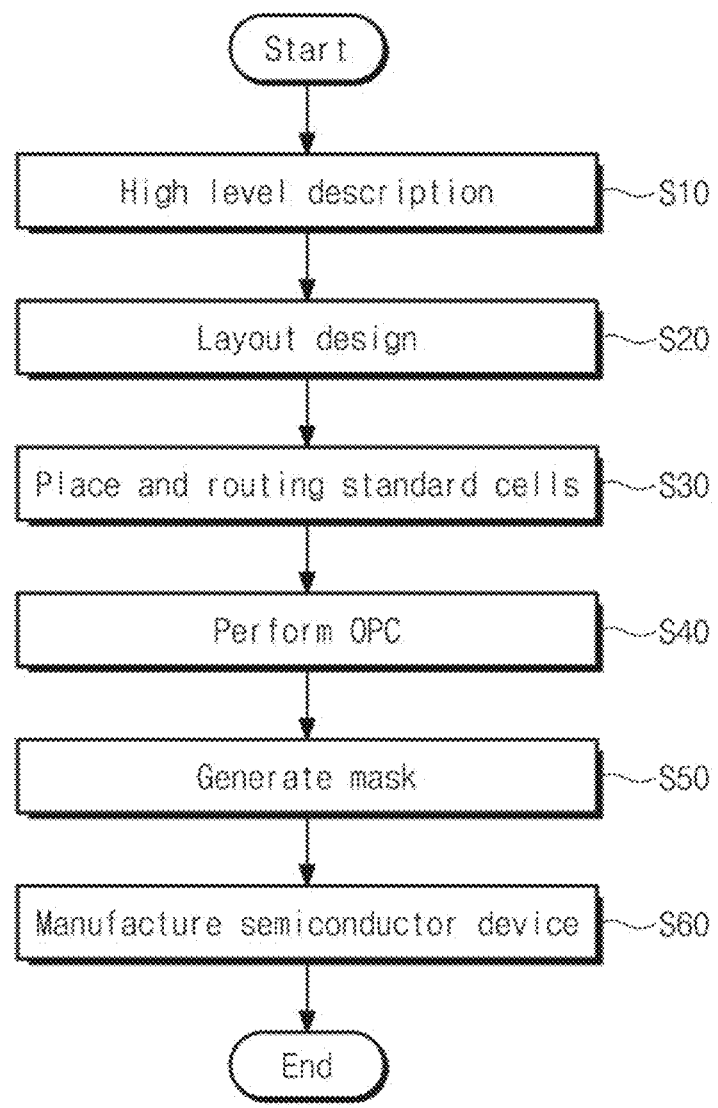
FIG. 2 illustrates a flow chart showing a method of designing and manufacturing a semiconductor device, according to exemplary embodiments.

FIG. 2 illustrates a flow chart showing a method of designing and manufacturing a semiconductor device, according to exemplary embodiments.

Referring to FIG. 2, a high-level design of a semiconductor integrated circuit may be performed using the computer system discussed with reference to FIG. 1 (S10). The high-level design may mean that an integrated circuit corresponding to a design target is described with a high-level language of a hardware description language. For example, the high-level language such as C language may be used in the high-level design. A register transfer level (RTL) coding or simulation may be used to express in detail circuits designed by the high-level design. In addition, codes created by the RTL coding may be converted into a netlist, which netlist may be synthesized to describe an entire semiconductor device. The synthesized schematic circuit may be verified by a simulation tool, and an adjustment process may be performed based on the verified result.

A layout design may be performed to implement on a silicon substrate a semiconductor integrated circuit that is logically completed (S20). For example, the layout design may be performed based on the schematic circuit synthesized in the high-level design or the netlist corresponding to the schematic circuit.

A cell library for the layout design may include information about operation, speed, and power consumption of the standard cell. A cell library for representing a layout of a specific gate-level circuit as a layout may be defined in most tools for designing layouts. The layout may be prepared to define shapes or dimensions of patterns constituting transistors and metal lines that will be actually formed on a silicon substrate. For example, in order to actually form an inverter circuit on a silicon substrate, it may be necessary to appropriately place or describe layout patterns such as PMOS, NMOS, N-WELL, gate electrodes, and metal lines thereon. For this, a search may be first performed to select a suitable one of inverters predefined in the cell library.

Designed standard cells may be placed and routed (S30). For example, high-level lines may be provided on the placed standard cells. The placed standard cells may be well-designedly connected to each other through the routing step. The placement and routing of the standard cells may be automatically performed by the placement and routing tool 34 of FIG. 1.

After the routing step, a verification step may be performed on the layout to check whether any portion of the schematic circuit violates the given design rule. The verification step may include a design rule check (DRC) for verifying whether the layout meets the given design rule, an electrical rule check (ERC) for verifying whether there is an issue of an electrical disconnection in the layout, and a layout vs. schematic (LVS) for verifying whether the layout is coincident with the gate-level netlist.

An optical proximity correction (OPC) step may be performed (S40). A photolithography process may be employed to achieve on a silicon substrate the layout patterns obtained by the layout design. The optical proximity correction may be a technique for correcting an unintended optical effect occurred in the photolithography process. For example, the optical proximity correction may correct an undesirable phenomenon such as refraction or process side effects caused by characteristics of light in an exposure process using the layout patterns. When the optical proximity correction is performed, the designed layout patterns may be slightly changed (or biased) in shapes and positions.

A photomask may be generated based on the layout changed by the optical proximity correction (S50). The photomask may generally be manufactured by describing the layout patterns using a chromium layer coated on a glass substrate.

The generated photomask may be used to manufacture a semiconductor device (S60). Various exposure and etching processes may be repeatedly performed in manufacturing the semiconductor device using the photomask. Through these processes discussed above, patterns defined in the layout design may be sequentially formed on a silicon substrate.

Figure 3:
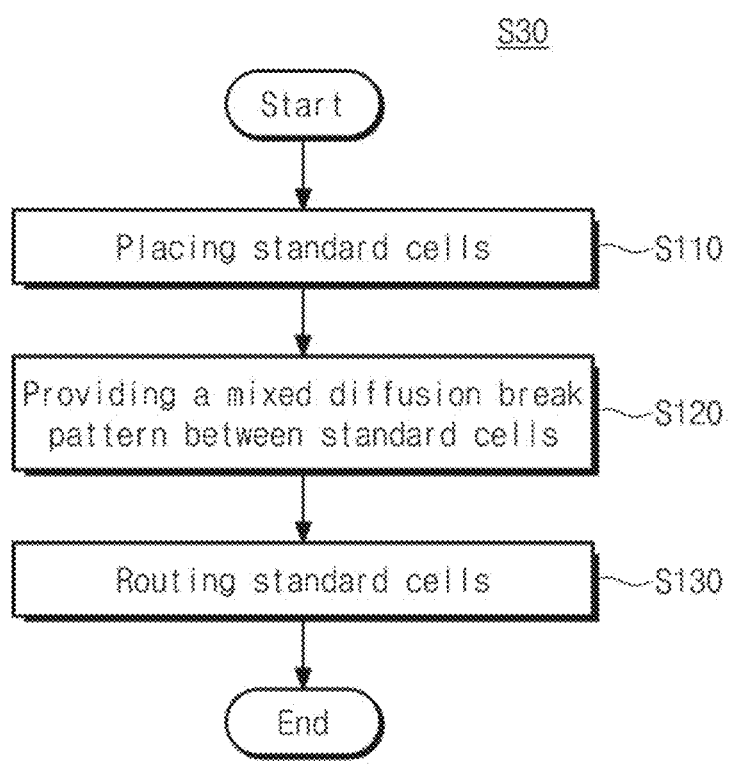
FIG. 3 illustrates a flow chart showing in detail a step S30 of placing and routing standard cells in the method of FIG. 2.
Figure 4:
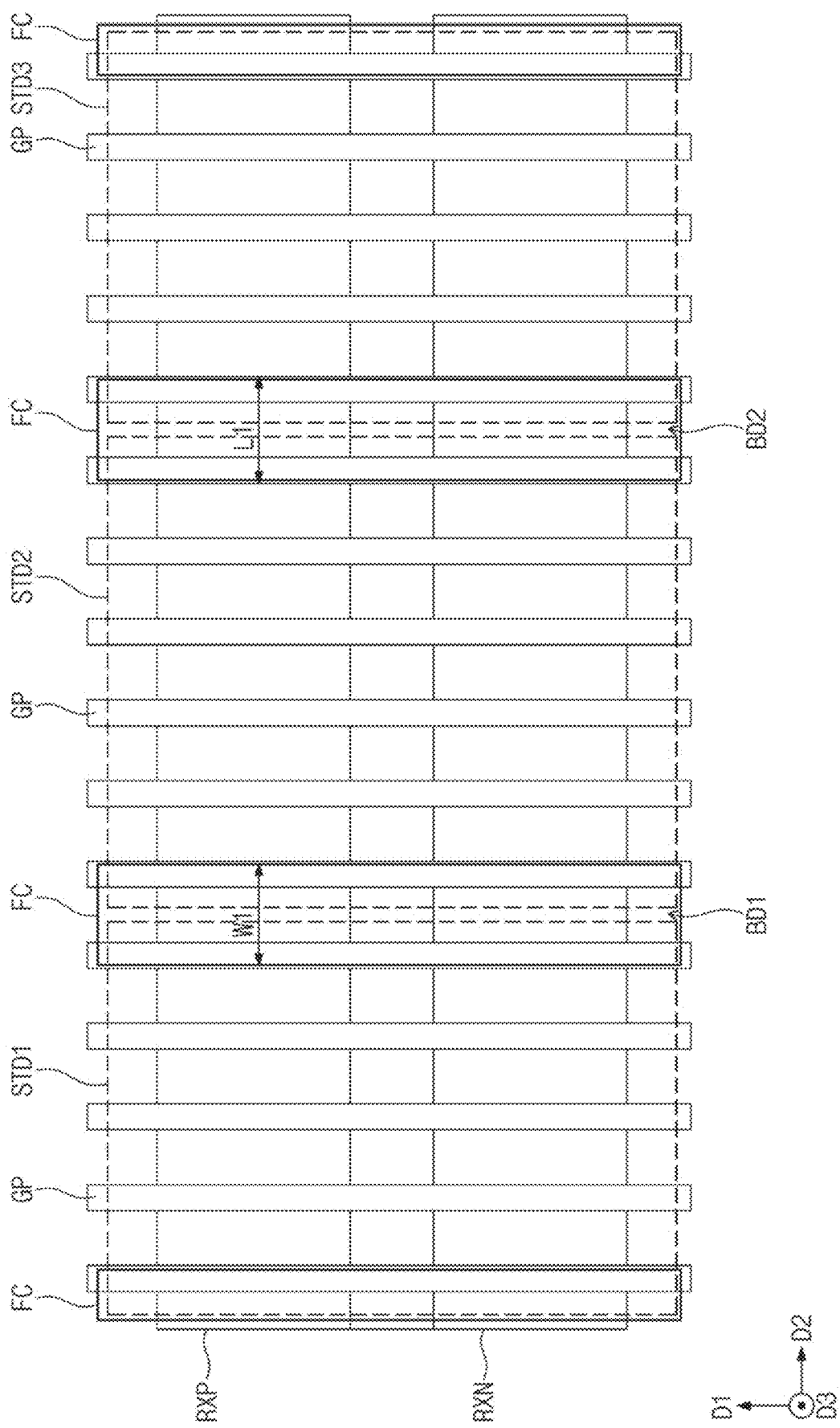
FIGS. 4 and 5 illustrate layouts according to exemplary embodiments, showing the step of placing and routing standard cells of FIG. 3.
Figure 5:
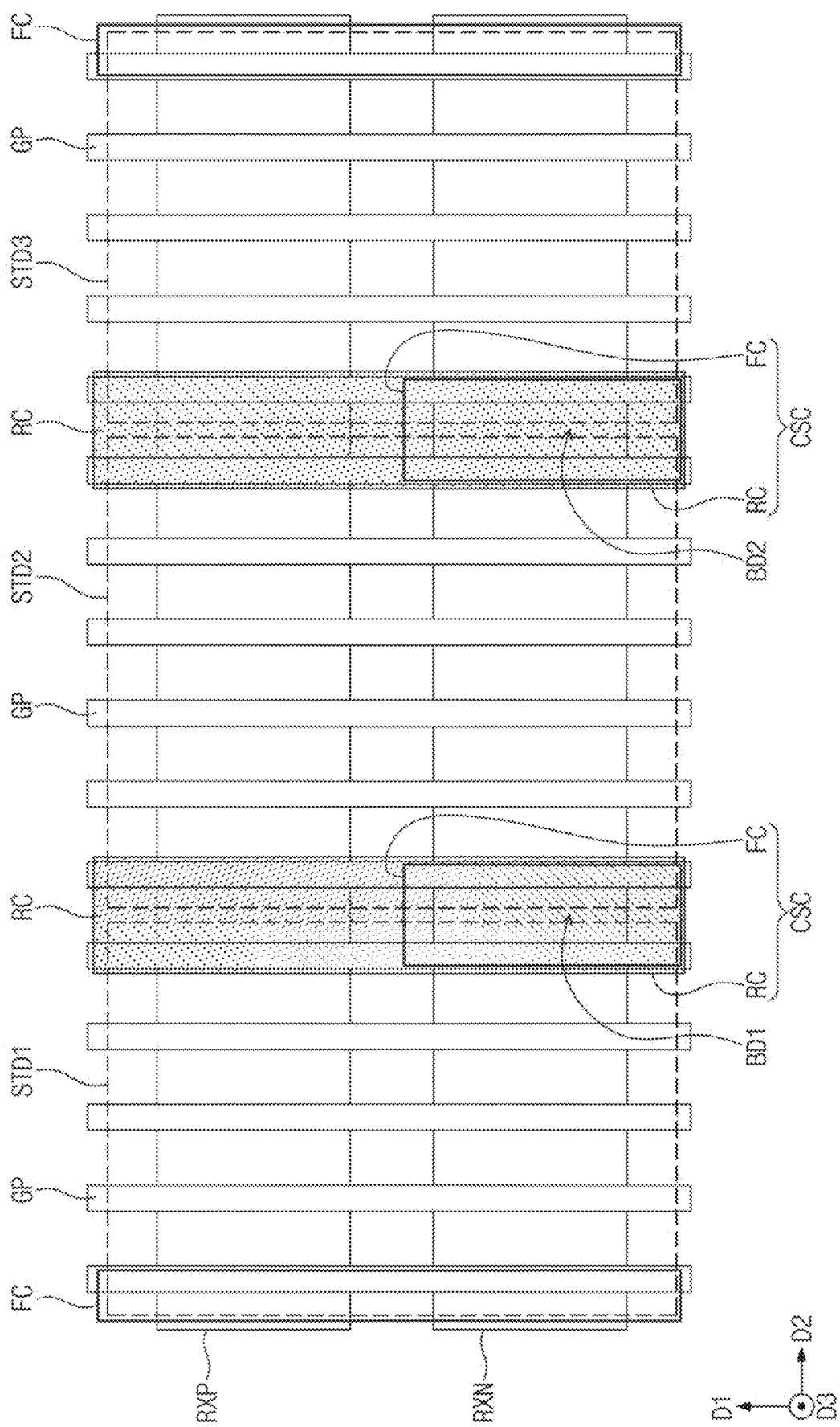

FIG. 3 illustrates a flow chart showing in detail the step S30 of placing and routing standard cells of FIG. 2. FIGS. 4 and 5 illustrate layouts according to exemplary embodiments, showing the step of placing and routing standard cells of FIG. 3.

Referring to FIGS. 3 and 4, there may be disposed a first standard cell STD1, a second standard cell STD2, and a third standard cell STD3 (S110). The first to third standard cells STD1, STD2, and STD3 may be linearly arranged in a second direction D2. The first to third standard cells STD1, STD2, and STD3 may be different standard cells from each other. The first, second, and third standard cells STD1, STD2, and STD3 may respectively constitute first, second, and third logic circuits that are different from each other.

Each of the first to third standard cells STD1, STD2, and STD3 may include a first active region pattern RXP, a second active region pattern RXN, and gate patterns GP. Each of the first to third standard cells STD1, STD2, and STD3 may further include additional layout patterns (e.g., active fin patterns, active contact patterns, gate contact patterns, via patterns, and line patterns). For brevity of drawings and their description, the additional layout patterns may not be illustrated in the first to third standard cells STD1, STD2, and STD3 shown in FIGS. 4 and 5.

The first and second active region patterns RXP and RXN may extend in the second direction D2. The first and second active region patterns RXP and RXN may be spaced apart from each other in a first direction D1. The first active region pattern RXP may define a first active region, and the second active region pattern RXN may define a second active region.

The gate patterns GP may extend in the first direction D1 and may be arranged along the second direction D2 intersecting (e.g., perpendicular to) the first direction D1. The gate patterns GP may be arranged to have the same pitch. The pitch may be a distance between a center of a first pattern and a center of a second pattern adjacent to the first pattern. The gate patterns GP may define gate electrodes.

A first diffusion break pattern FC may be disposed on a boundary of each of the first to third standard cells STD1, STD2, and STD3. For example, the first diffusion break pattern FC may be disposed between neighboring standard cells. The first diffusion break pattern FC may extend in the first direction D1. The first diffusion break pattern FC may separate neighboring standard cells from each other. The first diffusion break pattern FC may define a first separation structure.

For example, a first cell boundary BD1 may be defined between the first and second standard cells STD1 and STD2, and a second cell boundary BD2 may be defined between the second and third standard cells STD2 and STD3. The first diffusion break pattern FC may be disposed on each of the first and second cell boundaries BD1 and BD2. The first diffusion break pattern FC may separate the first active region pattern RXP of the first standard cell STD1 from the first active region pattern RXP of the second standard cell STD2. The first diffusion break pattern FC may separate the second active region pattern RXN of the first standard cell STD1 from the second active region pattern RXN of the second standard cell STD2.

The first diffusion break pattern FC may overlap a pair of neighboring gate patterns GP. The first diffusion break pattern FC may have a first width W1 in the second direction D2. A first distance L1 may be provided between opposite sidewalls of the pair of neighboring gate patterns GP. The first width W1 and the first distance L1 may be substantially the same.

Referring to FIGS. 3 and 5, a mixed diffusion break pattern CSC may be provided on each of the first and second cell boundaries BD1 and BD2 (S120). For example, the mixed diffusion break pattern CSC may replace the first diffusion break pattern FC on each of the first and second cell boundaries BD1 and BD2. The mixed diffusion break pattern CSC may include a first diffusion break pattern FC and a second diffusion break pattern RC. The first and second diffusion break patterns FC and RC may have substantially the same width in the second direction D2.

The second diffusion break pattern RC may extend in the first direction D1. The second diffusion break pattern RC may extend from the second active region pattern RXN toward the first active region pattern RXP. The second diffusion break pattern RC may have substantially the same size and shape as those of the first diffusion break pattern FC discussed above with reference to FIG. 4. Similar to the first diffusion break pattern FC discussed above with reference to FIG. 4, the second diffusion break pattern RC may separate neighboring standard cells from each other.

The first diffusion break pattern FC of the mixed diffusion break pattern CSC may be disposed limitedly on the second active region pattern RXN. The first diffusion break pattern FC of the mixed diffusion break pattern CSC may have a size approximately half that of the second diffusion break pattern RC. For example, the first diffusion break pattern FC of the mixed diffusion break pattern CSC may separate the second active region pattern RXN of the first standard cell STD1 from the second active region pattern RXN of the second standard cell STD2. The mixed diffusion break pattern CSC may define a mixed separation structure.

Thereafter, a routing step may be performed on the placed first to third standard cells STD1, STD2, and STD3 (S130). The routing of the first to third standard cells STD1, STD2, and STD3 may include placing high-level line patterns (not shown) that electrically connect the first to third standard cells STD1, STD2, and STD3 to one another. When the high-level line patterns are placed, the first to third standard cells STD1, STD2, and STD3 may be connected to one another in accordance with a designed circuit.

Figure 6:
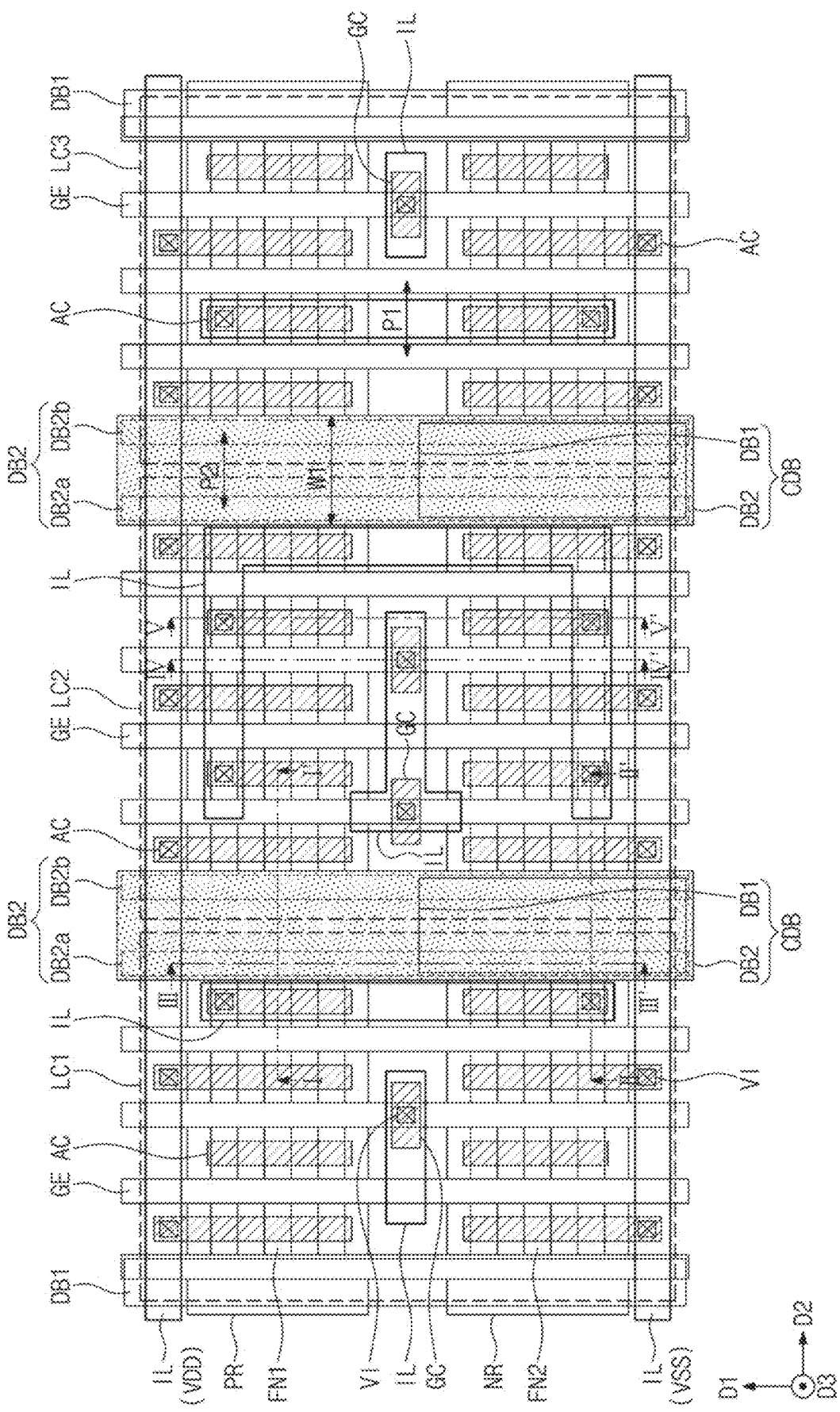
FIG. 6 illustrates a plan view showing a semiconductor device according to exemplary embodiments.

FIG. 6 illustrates a plan view showing a semiconductor device according to exemplary embodiments. FIGS. 7A to 7E illustrate cross-sectional views respectively taken along lines I-I', II-II', III-III', IV-IV', and V-V' of FIG. 6. FIGS. 6 and 7A to 7E exemplarily show a semiconductor device actually achieved on a substrate when the layout of FIG. 5 is used.

Referring to FIGS. 5, 6, and 7A to 7E, first to third logic cells LC1, LC2, and LC3 may be provided. The first to third logic cells LC1, LC2, and LC3 may be arranged in the second direction D2. The first to third logic cells LC1, LC2, and LC3 may respectively correspond to the first to third standard cells STD1, STD2, and STD3 of FIG. 5. Each of the first to third logic cells LC1, LC2, and LC3 may constitute a logic circuit. For example, each of the first to third logic cells LC1, LC2, and LC3 may be provided thereon with logic transistors constituting the logic circuit. In some exemplary embodiments, the first to third logic cells LC1, LC2, and LC3 may include different logic circuits from each other. The following describes in detail the logic transistors and electrical lines constituting the first to third logic cells LC1, LC2, and LC3.

A substrate 100 may be provided. For example, the substrate 100 may be or include a silicon substrate, a germanium substrate, or a silicon-on-insulator (SOI) substrate. The substrate 100 may be provided thereon with a device isolation layer ST that defines a first active region PR and a second active region NR. For example, the first active region PR may be a PMOSFET region, and the second active region NR may be an NMOSFET region. The first and second active regions PR and NR may be defined by a second trench TR2 on an upper portion of the substrate 100, and the device isolation layer ST may fill the second trench TR2. For example, the device isolation layer ST may include a silicon oxide layer.

The first and second active regions PR and NR may be spaced apart from each other in a first direction D1 across the device isolation layer ST. The first and second active regions PR and NR may extend in the second direction D2 and run across the first to third logic cells LC1, LC2, and LC3.

The first active region PR may be provided thereon with a plurality of first active patterns FN1 extending in the second direction D2. The second active region NR may be provided thereon with a plurality of second active patterns FN2 extending in the second direction D2. The first and second active patterns FN1 and FN2 may be vertically protruding portions of the substrate 100. The first and second active patterns FN1 and FN2 may be arranged along the first direction D1.

For example, the first active region PR may be provided thereon with three first active patterns FN1 parallel extending along the second direction D2. For example, the second active region NR may be provided thereon with three second active patterns FN2 parallel extending along the second direction D2. The numbers and shapes of the first and second active patterns FN1 and FN2 respectively on the first and second active regions PR and NR are exemplary, but not limited to that shown.

A first trench TR1 may be defined between a pair of the active patterns FN1 and FN2 adjacent to each other in the first direction D1. The device isolation layer ST may further fill the first trenches TR1.

The first and second active patterns FN1 and FN2 may have their upper portions higher than a top surface of the device isolation layer ST. The upper portions of the first and second active patterns FN1 and FN2 may vertically protrude beyond the device isolation layer ST. The upper portion of each of the first and second active patterns FN1 and FN2 may be shaped like a fin protruding from the device isolation layer ST.

The upper portion of each of the first active patterns FN1 may include first channel regions CH1 and first source/drain regions SD1. The first source/drain regions SD1 may be p-type impurity regions. Each of the first channel regions CH1 may be interposed between a pair of the first source/drain regions SD1. The upper portion of each of the second active patterns FN2 may include second channel regions CH2 and second source/drain regions SD2. The second source/drain regions SD2 may be n-type impurity regions. Each of the second channel regions CH2 may be interposed between a pair of the second source/drain regions SD2.

The first and second source/drain regions SD1 and SD2 may be epitaxial patterns formed by a selective epitaxial growth process. The first and second source/drain regions SD1 and SD2 may have their top surfaces higher than those of the first and second channel regions CH1 and CH2.

For example, the first source/drain regions SD1 may include a semiconductor element whose lattice constant is greater than that of a semiconductor element of the substrate 100. As a result, the first source/drain regions SD1 may provide the first channel regions CH1 with compressive stresses. Alternatively, the second source/drain regions SD2 may include the same semiconductor element as that of the substrate 100. For example, the first source/drain regions SD1 may include silicon-germanium, and the second source/drain regions SD2 may include silicon.

Figure 7A:
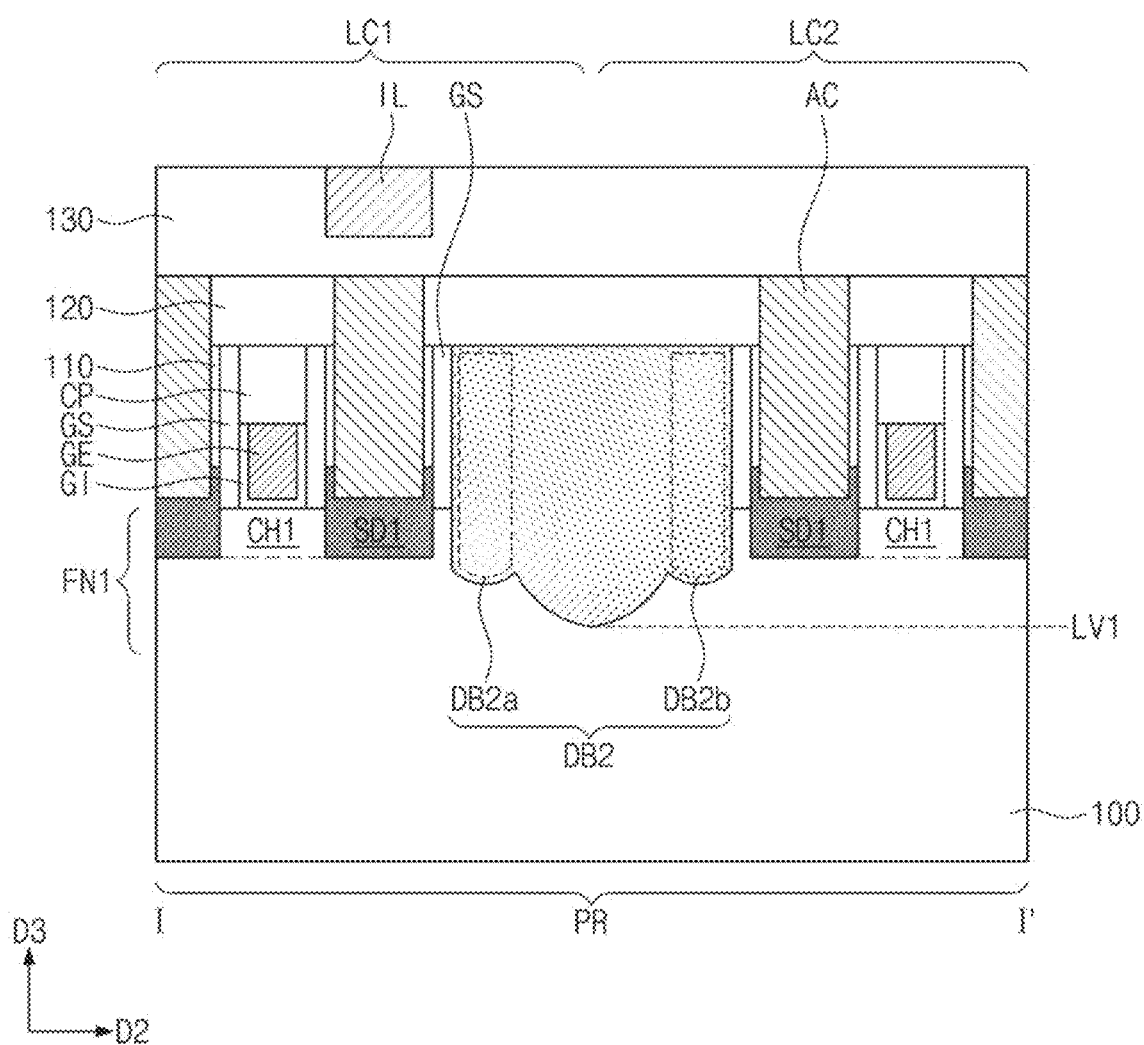
FIGS. 7A to 7E illustrate cross-sectional views respectively taken along lines I-I', II-II', III-III', IV-IV', and V-V' of FIG. 6.
Figure 7B:
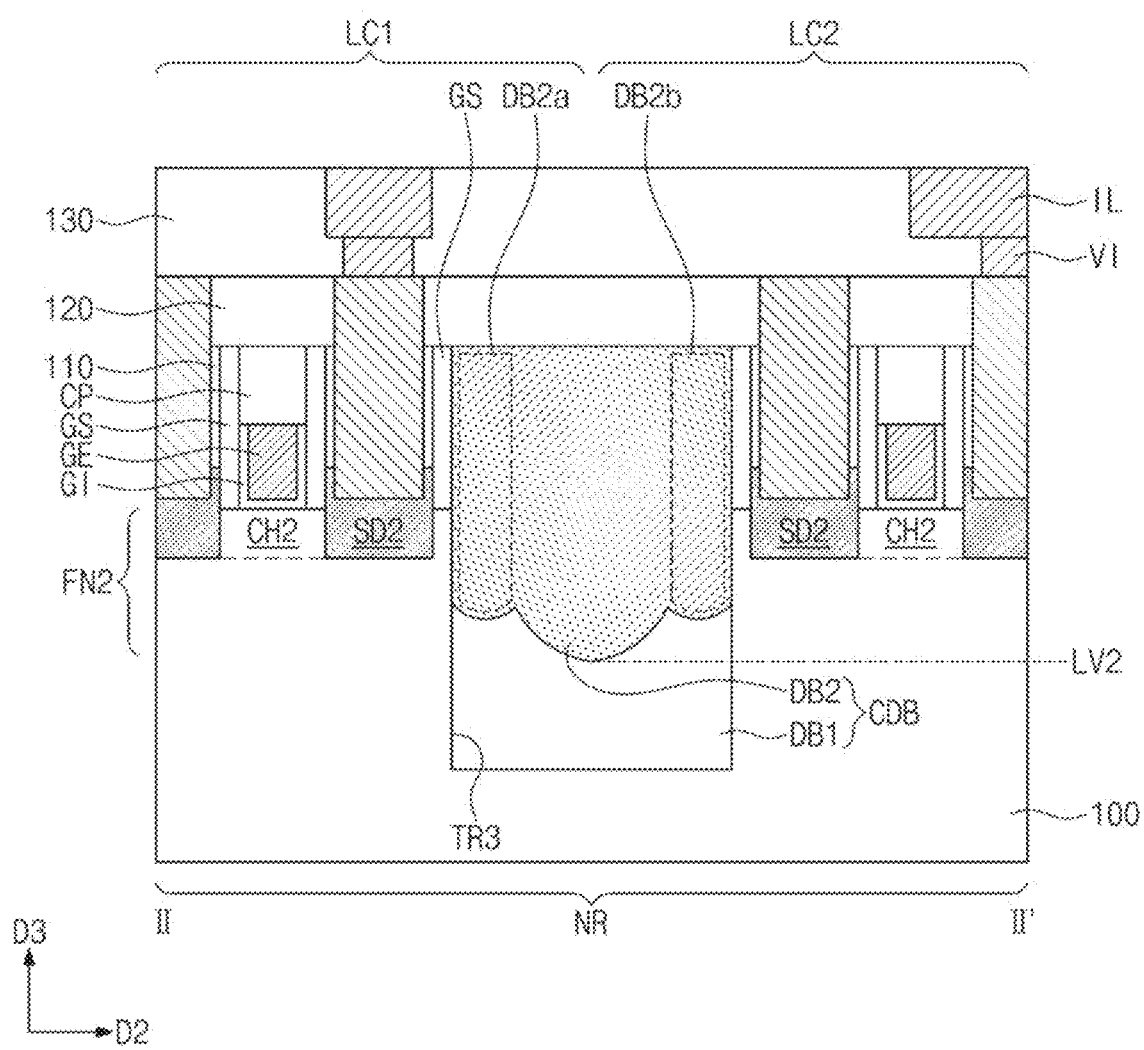
Figure 7C:
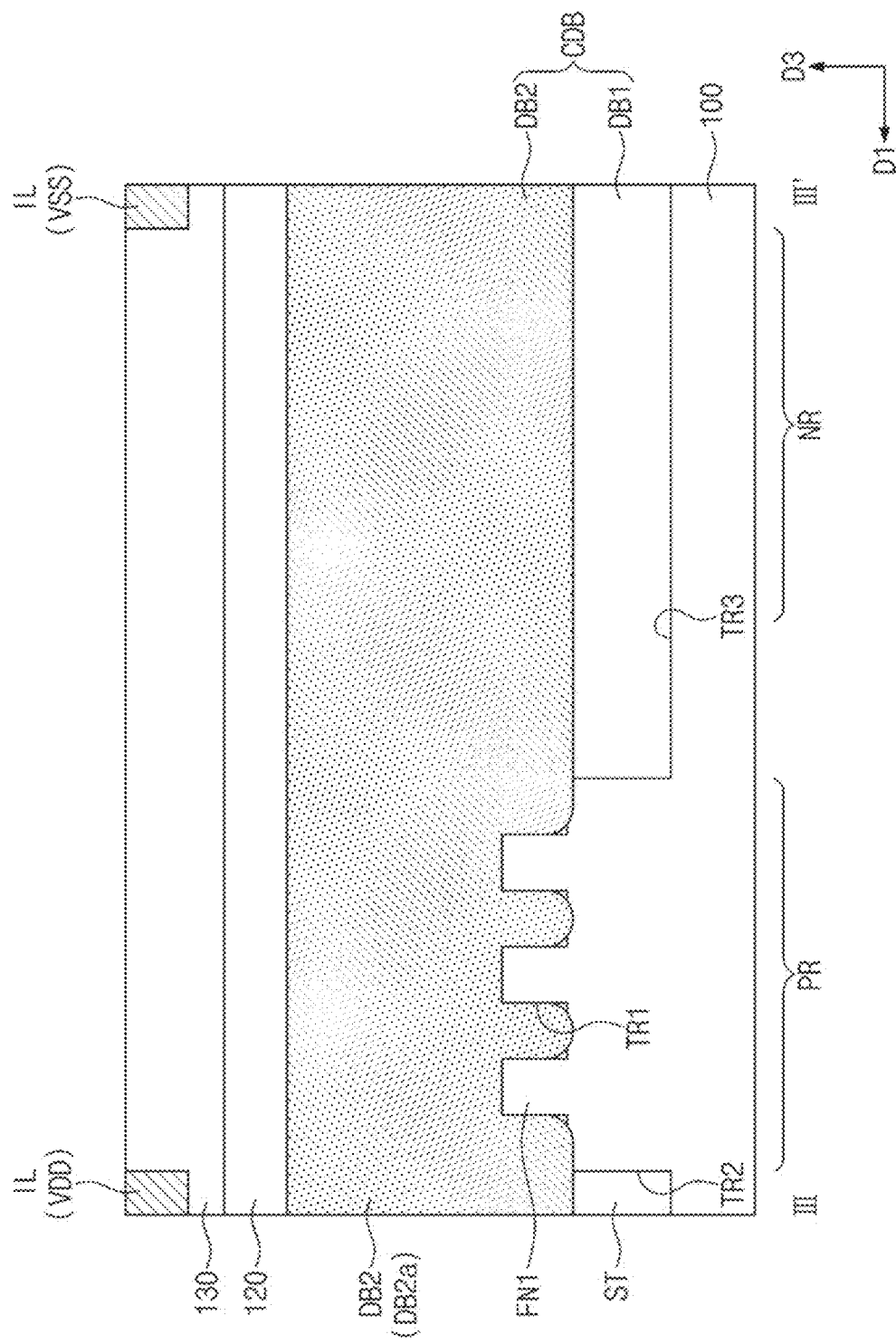
Figure 7D:
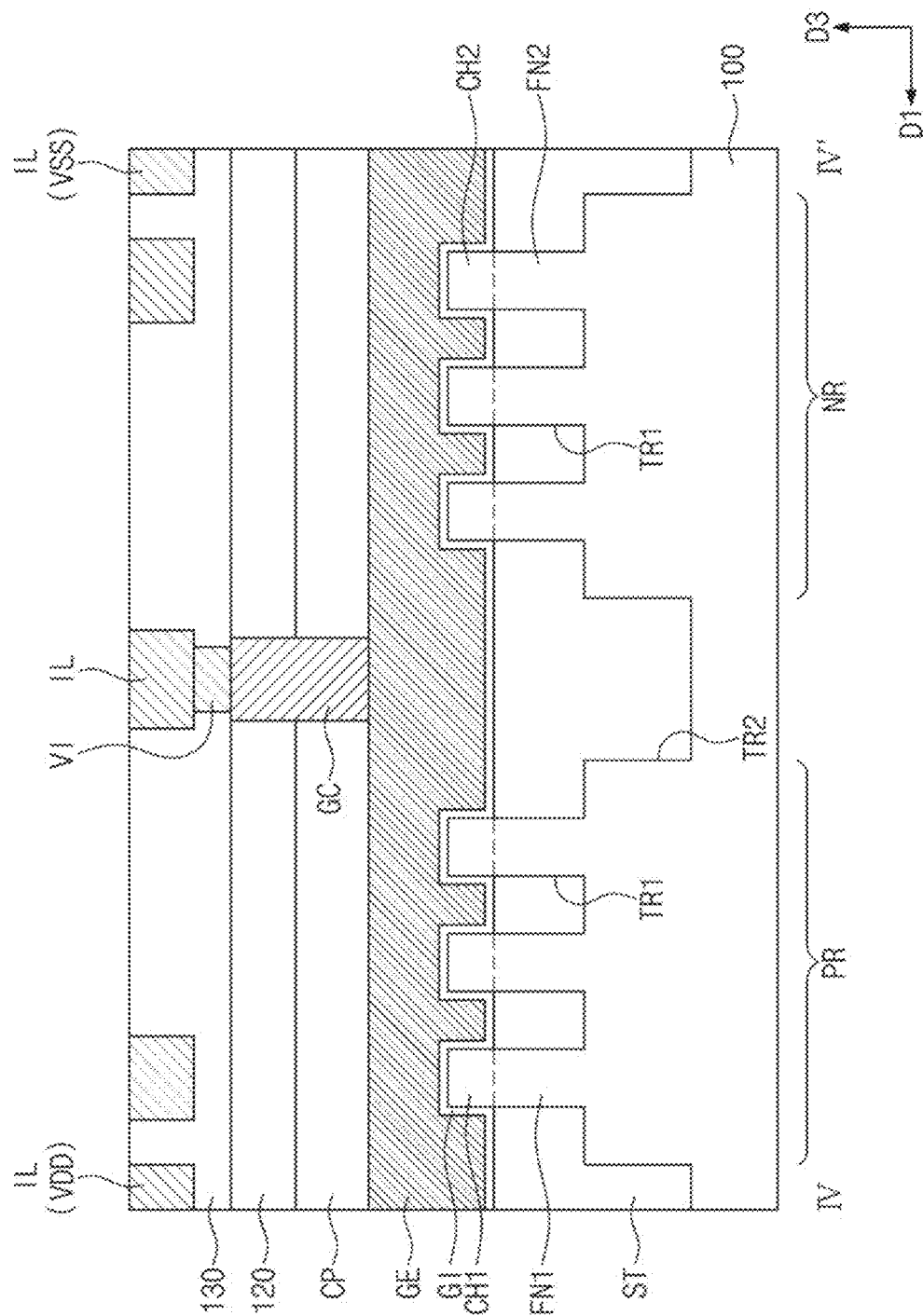
Figure 7E:
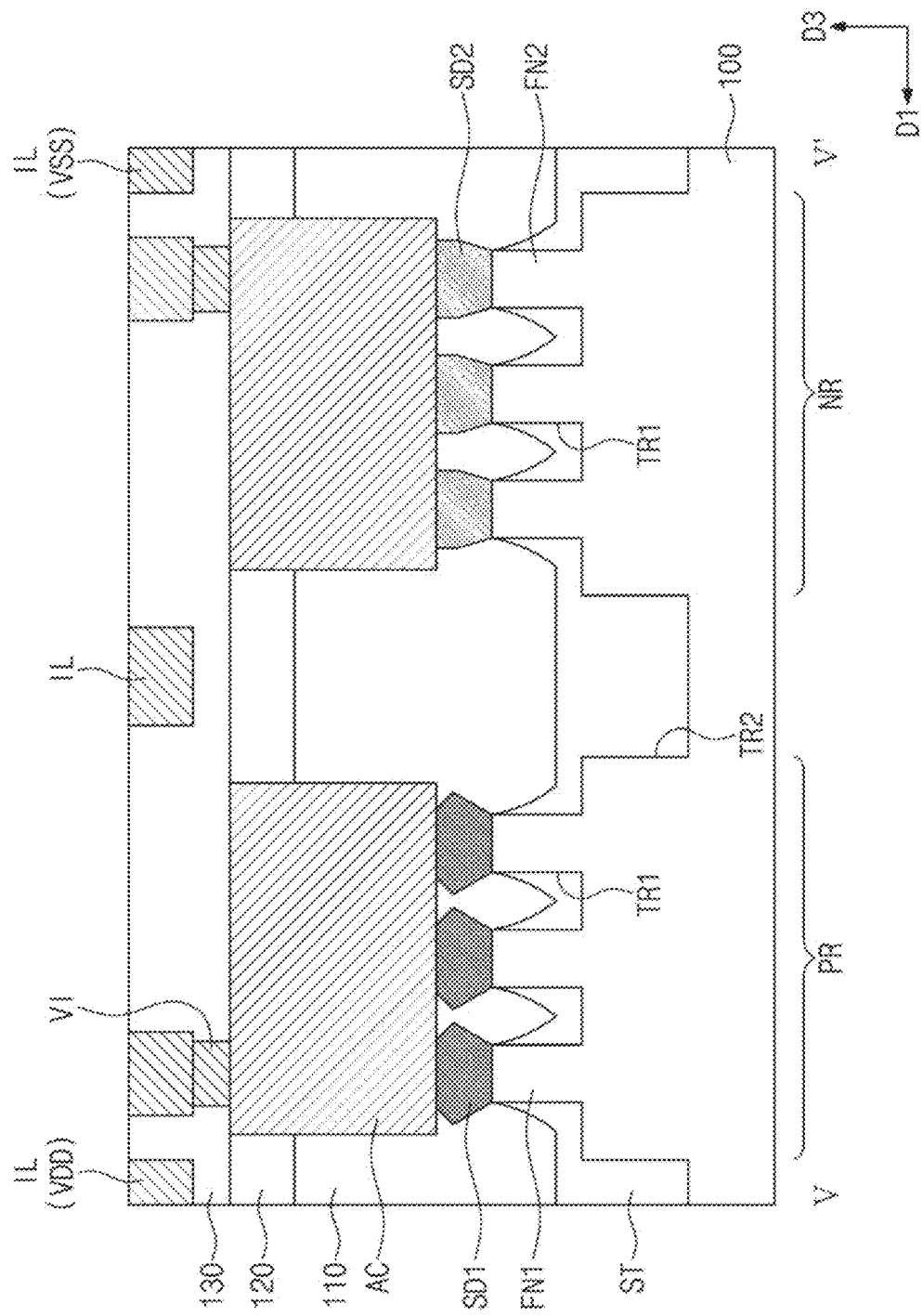

When viewed in cross-section along the first direction D1, each of the first source/drain regions SD1 may have a cross-section different from that of each of the second source/drain regions SD2 (see FIG. 7E).

Gate electrodes GE may be provided to run across the first and second active patterns FN1 and FN2 and to extend in the first direction D1. The gate electrodes GE may be spaced apart from each other in the second direction D2. A pair of neighboring gate electrodes GE may have a first pitch P1 therebetween. The gate electrodes GE may be equally spaced at the first pitch P1.

The gate electrodes GE may vertically overlap the first and second channel regions CH1 and CH2. Each of the gate electrodes GE may be provided on a top surface and opposite sidewalls of each of the first and second channel regions CH1 and CH2 (see FIG. 7D). For example, the gate electrodes GE may include one or more of conductive metal nitride (e.g., titanium nitride or tantalum nitride) and metal (e.g., titanium, tantalum, tungsten, copper, or aluminum).

A pair of gate spacers GS may be disposed on opposite sidewalls of each of the gate electrodes GE. The gate spacers GS may extend in the first direction D1 along the gate electrodes GE. The gate spacers GS may have top surfaces higher than those of the gate electrodes GE. The top surfaces of the gate spacers GS may be coplanar with that of a gate capping layer CP which will be discussed below. For example, the gate spacers GS may include one or more of SiCN, SiCON, and SiN. Alternatively, the gate spacers GS may include a multiple layer consisting of two or more of SiCN, SiCON, and SiN.

Gate dielectric layers GI may be interposed between the gate electrodes GE and the first and second channel regions CH1 and CH2. Each of the gate dielectric layers GI may extend along a bottom surface of a corresponding one of the gate electrodes GE. Each of the gate dielectric layers GI may cover the top surface and the opposite sidewalls of each of the first and second channel regions CH1 and CH2. The gate dielectric layers GI may include a high-k dielectric material whose dielectric constant is greater than that of a silicon oxide layer. For example, the high-k dielectric material may include one or more of hafnium oxide, hafnium silicon oxide, lanthanum oxide, zirconium oxide, zirconium silicon oxide, tantalum oxide, titanium oxide, barium strontium titanium oxide, barium titanium oxide, strontium titanium oxide, lithium oxide, aluminum oxide, lead scandium tantalum oxide, and lead zinc niobate.

A gate capping layer CP may be provided on each of the gate electrodes GE. The gate capping layers CP may extend in the first direction D1 along the gate electrodes GE. The gate capping layers GP may include a material exhibiting an etch selectivity to first and second interlayer dielectric layers 110 and 120 which will be discussed below. For example, the gate capping layers CP may include one or more of SiON, SiCN, SiCON, and SiN.

A mixed separation structure CDB may be provided on a cell boundary between the first and second logic cells LC1 and LC2 and on a cell boundary between the second and third logic cells LC2 and LC3. The mixed separation structure CDB may extend in the first direction D1 and separate neighboring logic cells from each other. The mixed separation structure CDB may include a first separation structure DB1 and a second separation structure DB2. The first separation structure DB1 may be provided on other cell boundary of the first logic cell LC1 and on other cell boundary of the third logic cell LC3.

The first separation structure DB1 may fill a third trench TR3 extending in the first direction D1. The third trench TR3 may mutually separate a pair of the active patterns FN1 and FN2 adjacent to each other in the second direction D2. For example, the third trench TR3 may have substantially the same depth as that of the second trench TR2. The third trench TR3 may be deeper than the first trench TR1. For another example, the third trench TR3 may have a different depth from that of the second trench TR2. The first separation structure DB1 may be the device isolation layer ST filling the third trench TR3. The first separation structure DB1 may thus include the same silicon oxide layer as that of the device isolation layer ST. The first separation structure DB1 may have a width in the second direction D2, which width may be substantially the same as a distance between opposite sidewalls of a pair of neighboring gate electrodes GE.

The first separation structure DB1 of the mixed separation structure CDB may selectively run across the second active region NR except for the first active region PR. The first separation structure DB1 of the mixed separation structure CDB may separate the second active pattern FN2 of the first logic cell LC1 from the second active pattern FN2 of the second logic cell LC2. The first separation structure DB1 of the mixed separation structure CDB may separate the second active pattern FN2 of the second logic cell LC2 from the second active pattern FN2 of the third logic cell LC3.

The second separation structure DB2 may extend in the first direction D1 and run across the first and second active regions PR and NR. On the first active region PR, the second separation structure DB2 may extend in the first direction D1 and run across upper portions of the first active pattern FN1. On the second active region NR, the second separation structure DB2 may be disposed on the first separation structure DB1. For example, the first separation structure DB1 may have a bottom surface whose level is lower than that of a bottom surface of the second separation structure DB2.

The second separation structure DB2 may include a first segment DB2a and a second segment DB2b at opposite sides thereof. The first and second segments DB2a and DB2b may be parallel in and extend in the first direction D1. Each of the first and second segments DB2a and DB2b may have substantially the same width as that of the gate electrode GE. The first and second segments DB2a and DB2b may have a second pitch P2 therebetween. The second pitch P2 may be substantially the same as the first pitch P1 between the gate electrodes GE.

The level of the bottom surface of the second separation structure DB2 may fall and then rise back as approaching the second segment DB2b from the first segment DB2a. The level of the bottom surface of the second separation structure DB2 may become a minimum at a site between the first and second segments DB2a and DB2b. For example, when viewed in cross-section along the second direction D2, the second separation structure DB2 may have a U-shaped profile (see, e.g., FIGS. 7A and 7B).

The bottom surface of the second separation structure DB2 on the first active patterns FN1 may have a lowest level LV1 higher than a lowest level LV2 of the bottom surface of the second separation structure DB2 on the first separation structure DB1.

A pair of the gate spacers GS may be provided on opposite sidewalls of the second separation structure DB2. The second separation structure DB2 may have a top surface whose level is higher than that of a top surface of the gate electrode GE. The top surface of the second separation structure DB2 may be coplanar with that of a first interlayer dielectric layer 110 which will be discussed below.

The second separation structure DB2 may include an insulating material the same as or different from that of the first separation structure DB1. For example, the second separation structure DB2 may include a silicon oxide layer, a silicon nitride layer, or a silicon oxynitride layer.

The mixed separation structure CDB may have a width W1' in the second direction D2, which width W1' may be greater than the first pitch P1 between the gate electrodes GE. The width W1' of the mixed separation structure CDB may be substantially the same as a width of each of the first and second separation structures DB1 and DB2.

The first separation structure DB1 of the mixed separation structure CDB may increase a breakdown voltage between the second source/drain regions SD2 disposed on opposite sides of the first separation structure DB1. The second separation structure DB2 of the mixed separation structure CDB may provide stresses to the gate electrodes GE adjacent to the second separation structure DB2. A semiconductor device according to some exemplary embodiments may be configured in such a way that the first and second separation structures DB1 and DB2 are combined to form the mixed separation structure CDB. The mixed separation structure CDB may affect performance of the semiconductor device. The semiconductor device may improve in electrical characteristics when the first and second separation structures DB1 and DB2 are appropriately arranged in the mixed separation structure CDB.

The substrate 100 may be provided thereon with a first interlayer dielectric layer 110, a second interlayer dielectric layer 120, and a third interlayer dielectric layer 130 that are sequentially stacked. Each of the first to third interlayer dielectric layers 110, 120, and 130 may include a silicon oxide layer or a silicon oxynitride layer.

A pair of the gate electrodes GE may be provided therebetween with one or more active contacts AC that penetrate the first and second interlayer dielectric layers 110 and 120 to come into electrical connection with the first and second source/drain regions SD1 and SD2. The active contacts AC may have a bar shape extending in the first direction D1. For example, one or more active contacts AC may be connected to a plurality of the first source/drain regions SD1. For example, one or more active contacts AC may be connected to a plurality of the second source/drain regions SD2.

At least one gate electrode GE may be provided thereon with at least one gate contact GC that penetrates the second interlayer dielectric layer 120 and the gate capping layer CP to come into electrical connection with at least one gate electrode GE. The gate contact GC may have a bar shape extending in the second direction D2. When viewed in plan, the gate contact GC may be disposed between the first and second active regions PR and NR. The gate contact GC may vertically overlap the device isolation layer ST filling the second trench TR2 between the first and second active regions PR and NR.

The active contacts AC and the gate contacts GC may include the same conductive material. The active contacts AC and the gate contacts GC may include at least one metallic material selected from, for example, aluminum, copper, tungsten, molybdenum, and cobalt.

The third interlayer dielectric layer 130 may be provided therein with interconnection lines IL and vias VI. For example, the interconnection lines IL and the vias VI may constitute a first metal layer. The interconnection lines IL may include power lines VDD and VSS that run across the first to third logic cells LC1, LC2, and LC3 and extend in the second direction D2.

The vias VI may be interposed between the interconnection lines IL and the active contacts AC and between the interconnection lines IL and the gate contacts GC, thereby electrically connecting the interconnection lines IL to the active contacts AC and also electrically connecting the interconnection lines IL to the gate contacts GC. The interconnection lines IL and the vias VI may include the same conductive material. For example, the interconnection lines IL and the vias VI may include at least one metallic material selected from aluminum, copper, tungsten, molybdenum, and cobalt.

The interconnection line IL and its underlying via VI may be integrally connected to constitute one conductive structure. For example, the interconnection line IL and the via VI may be formed simultaneously with each other. In some exemplary embodiments, a dual damascene process may be performed such that the interconnection line IL and the via VI are formed as one conductive structure.

Although not shown, one or more additional metal layers may be provided on the first metal layer. Through the first metal layer and the additional metal layers, the first to third logic cells LC1, LC2, and LC3 may be connected to one another in accordance with a designed circuit.

Figure 8:
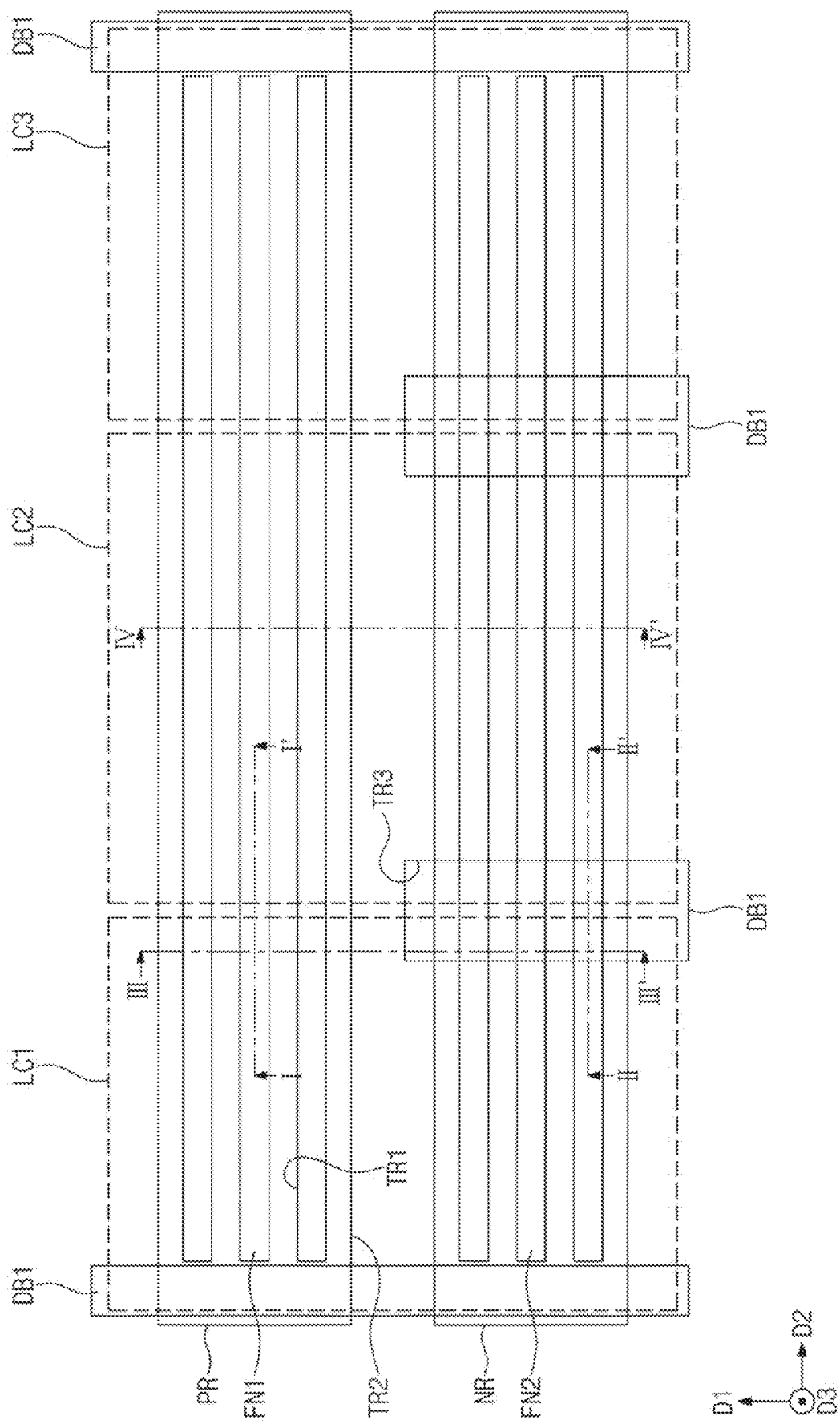
Figure 9A:
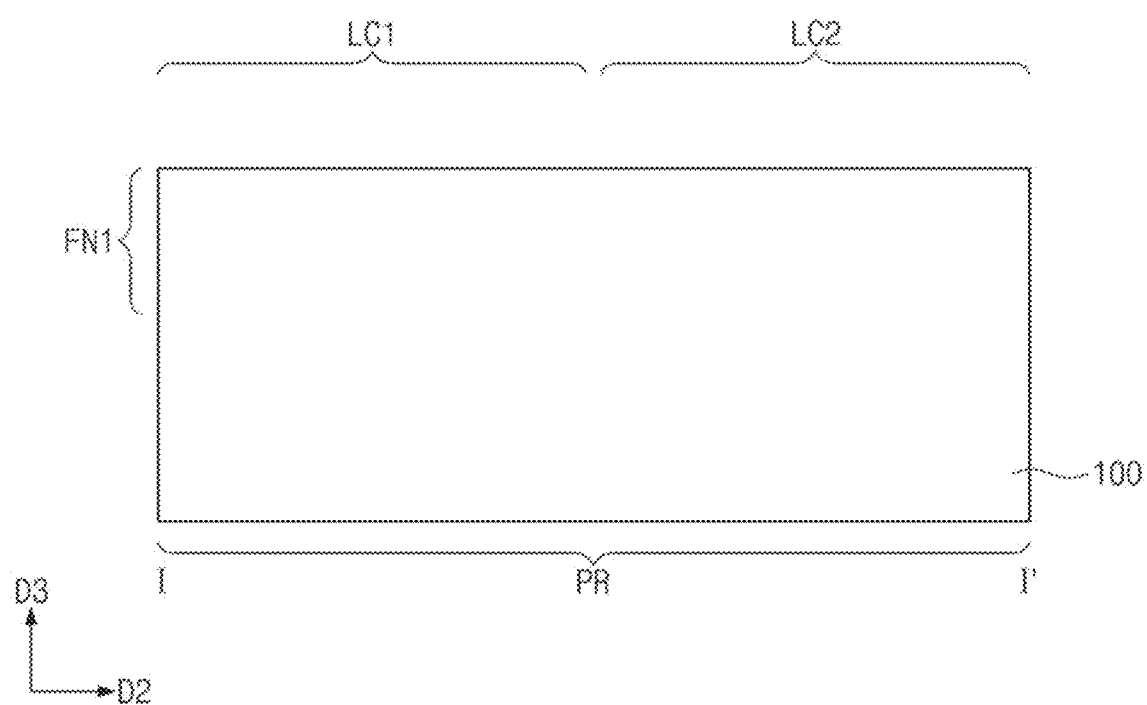
FIGS. 9A to 9D illustrate cross-sectional views respectively taken along lines I-I', II-II', III-III', and IV-IV' of FIG. 8.
Figure 9B:
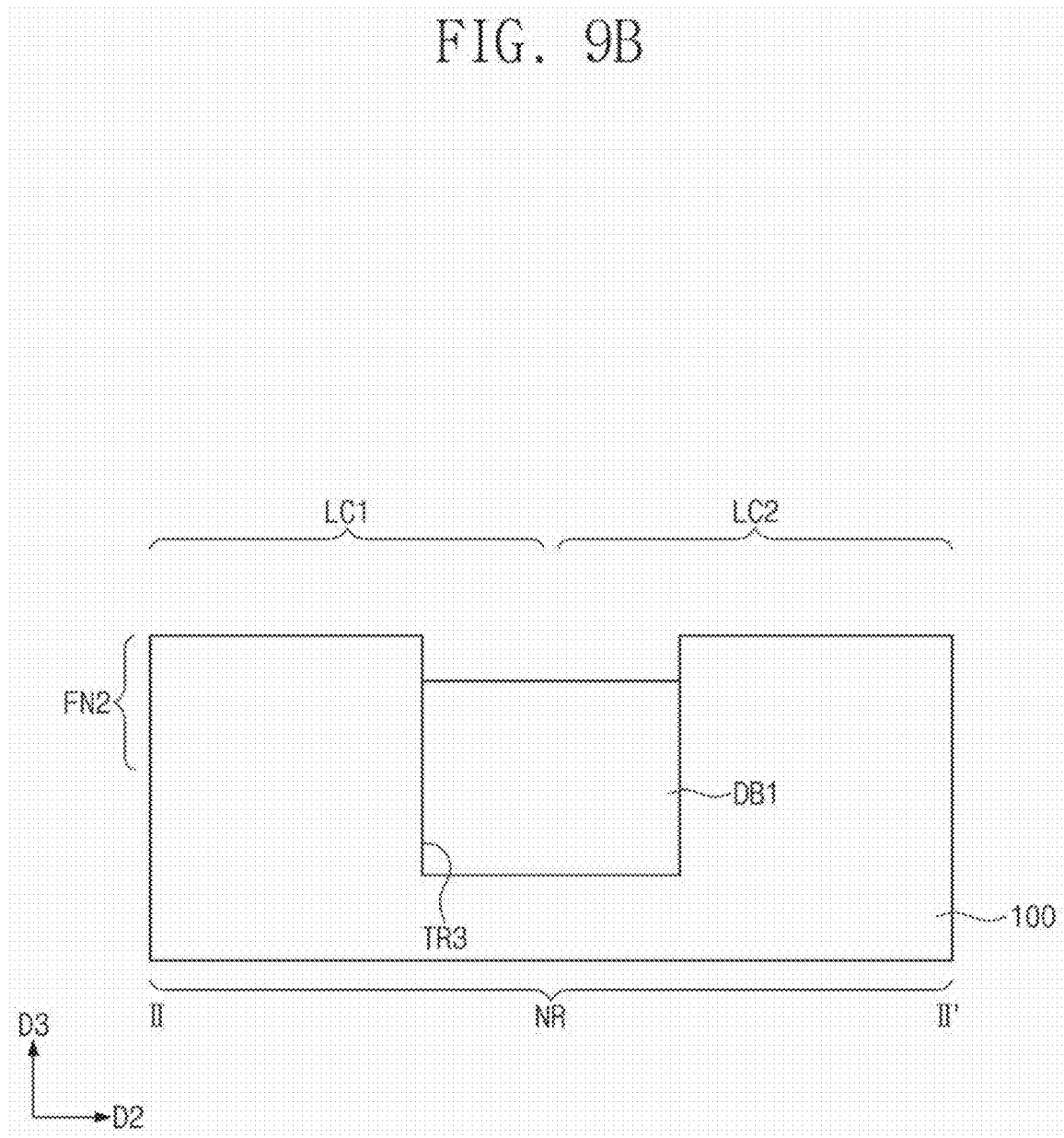
Figure 9C:
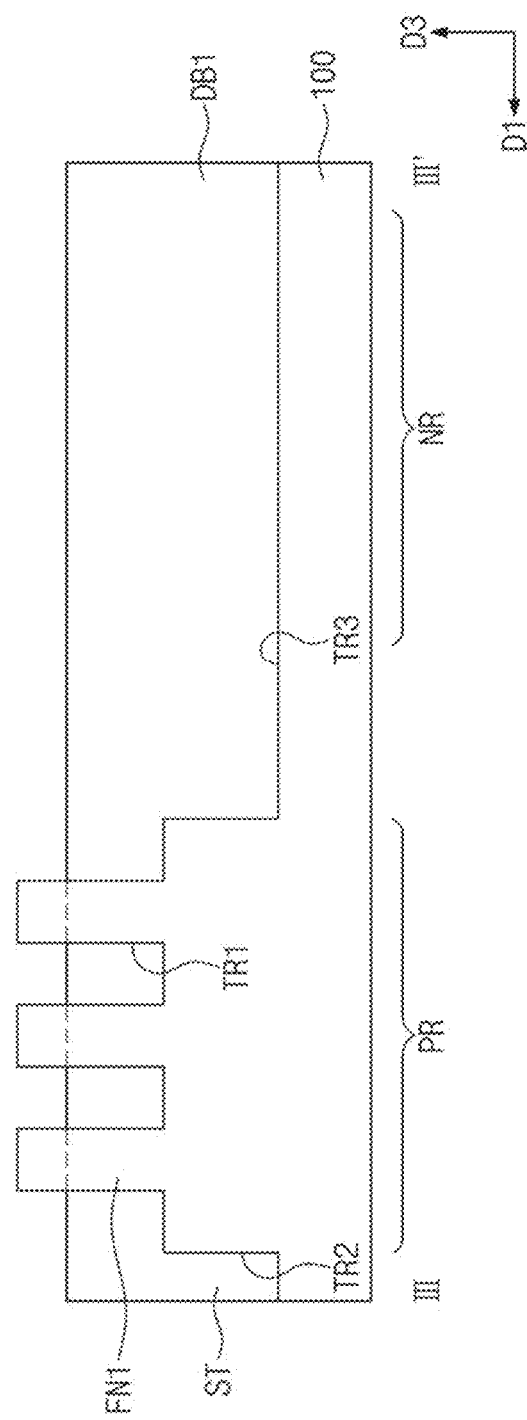
Figure 9D:
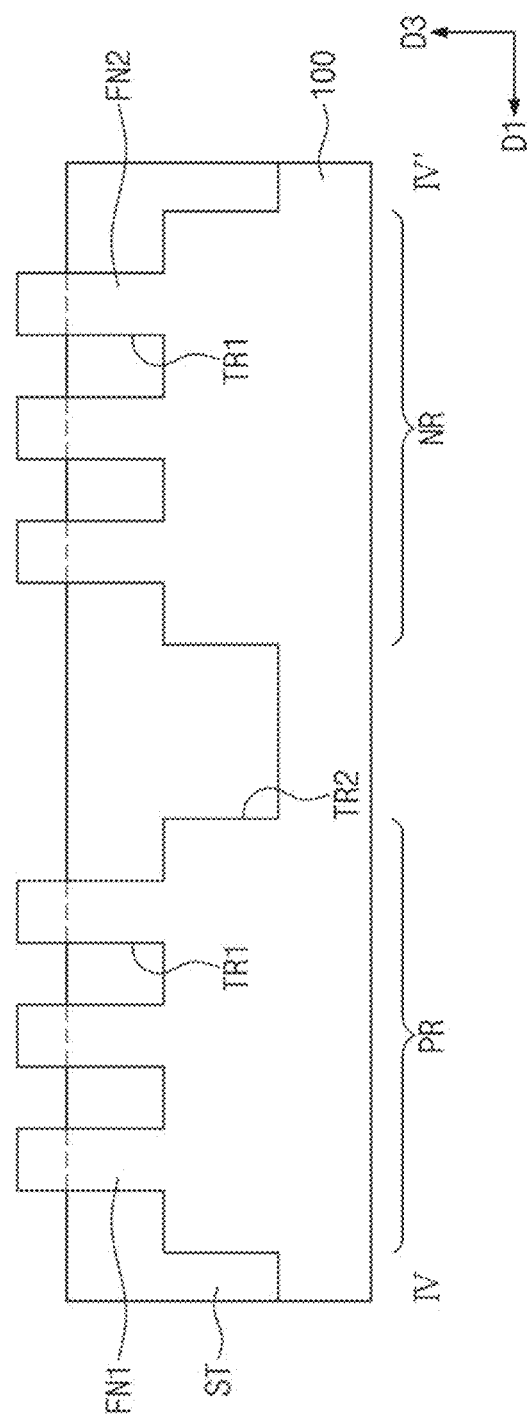
Figure 11A:
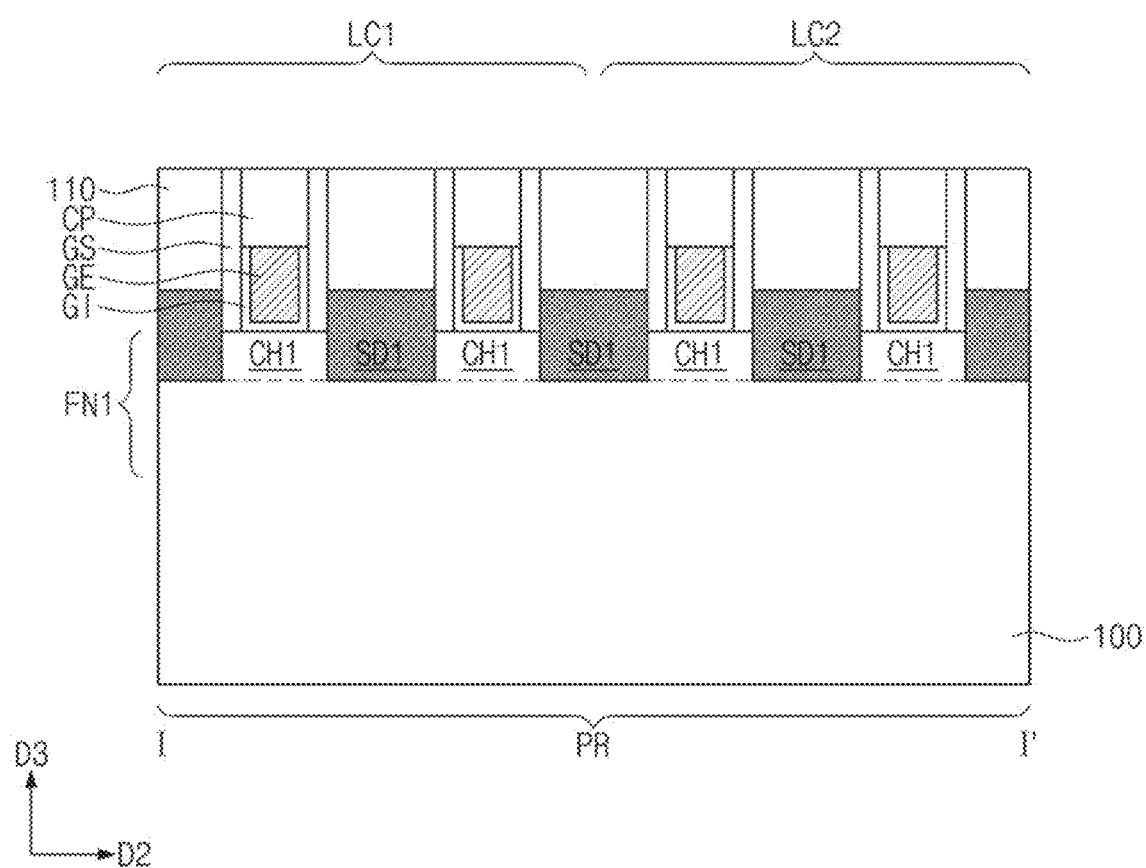
FIGS. 11A to 11E illustrate cross-sectional views respectively taken along lines I-I', II-II', III-III', IV-IV', and V-V' of FIG. 10.
Figure 11B:
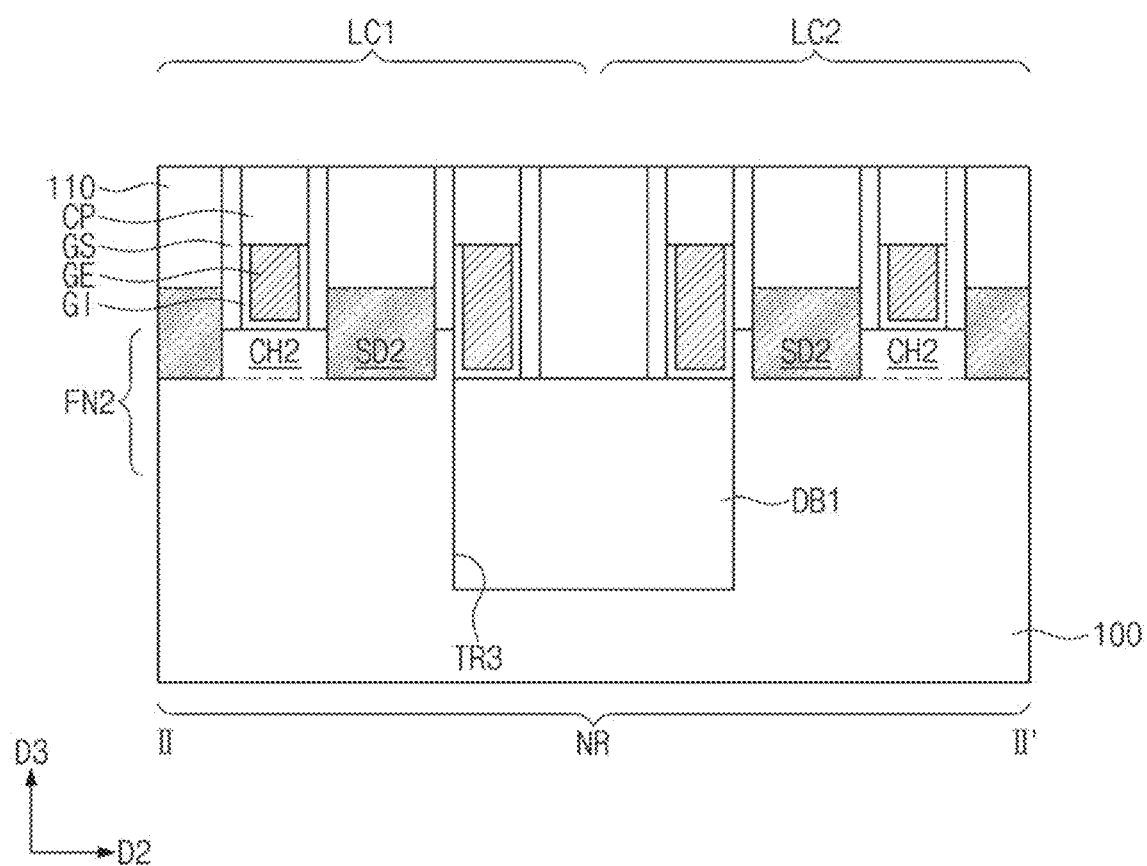
Figure 11C:
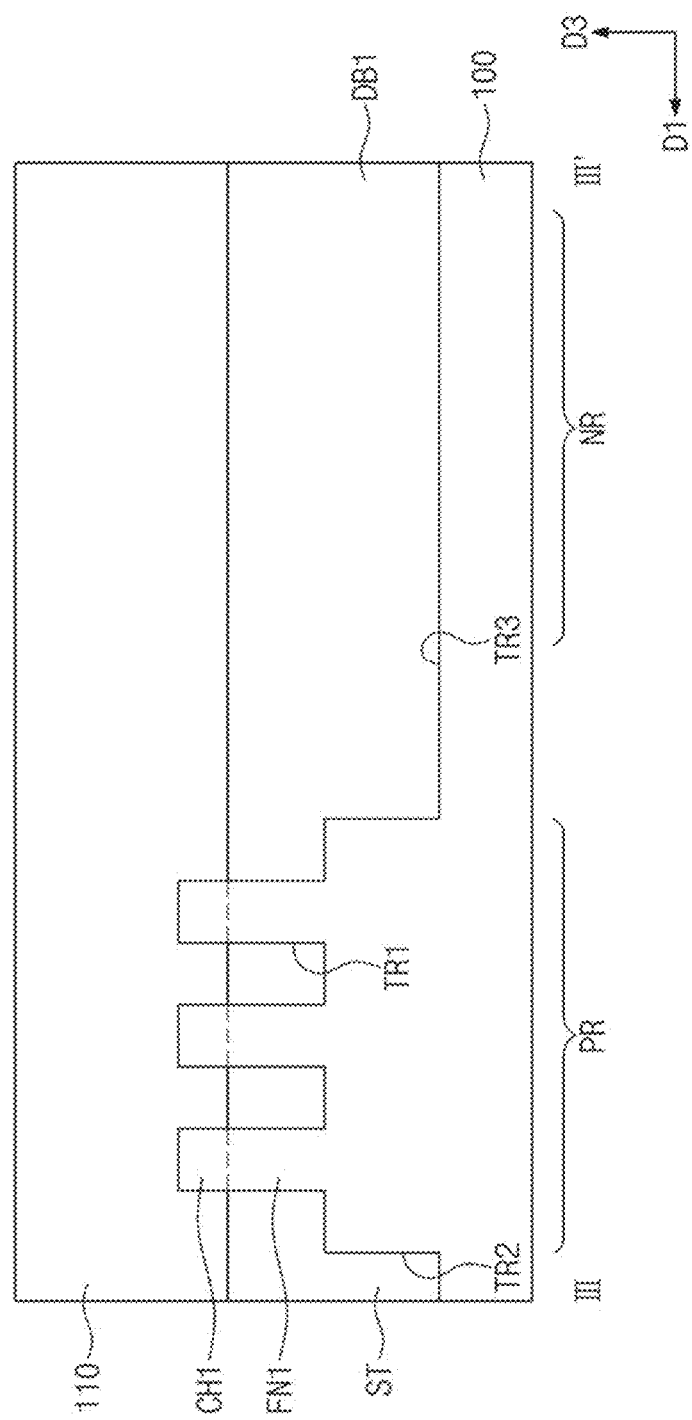
Figure 11D:
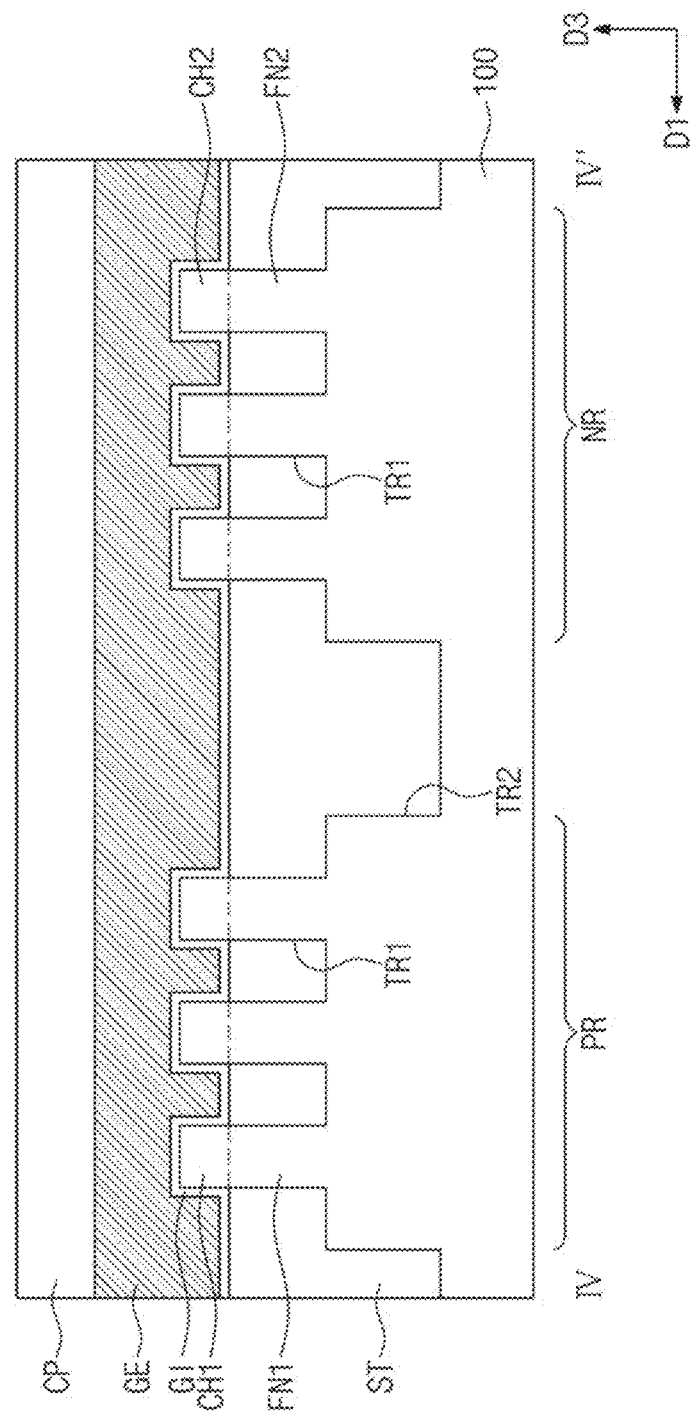
Figure 11E:
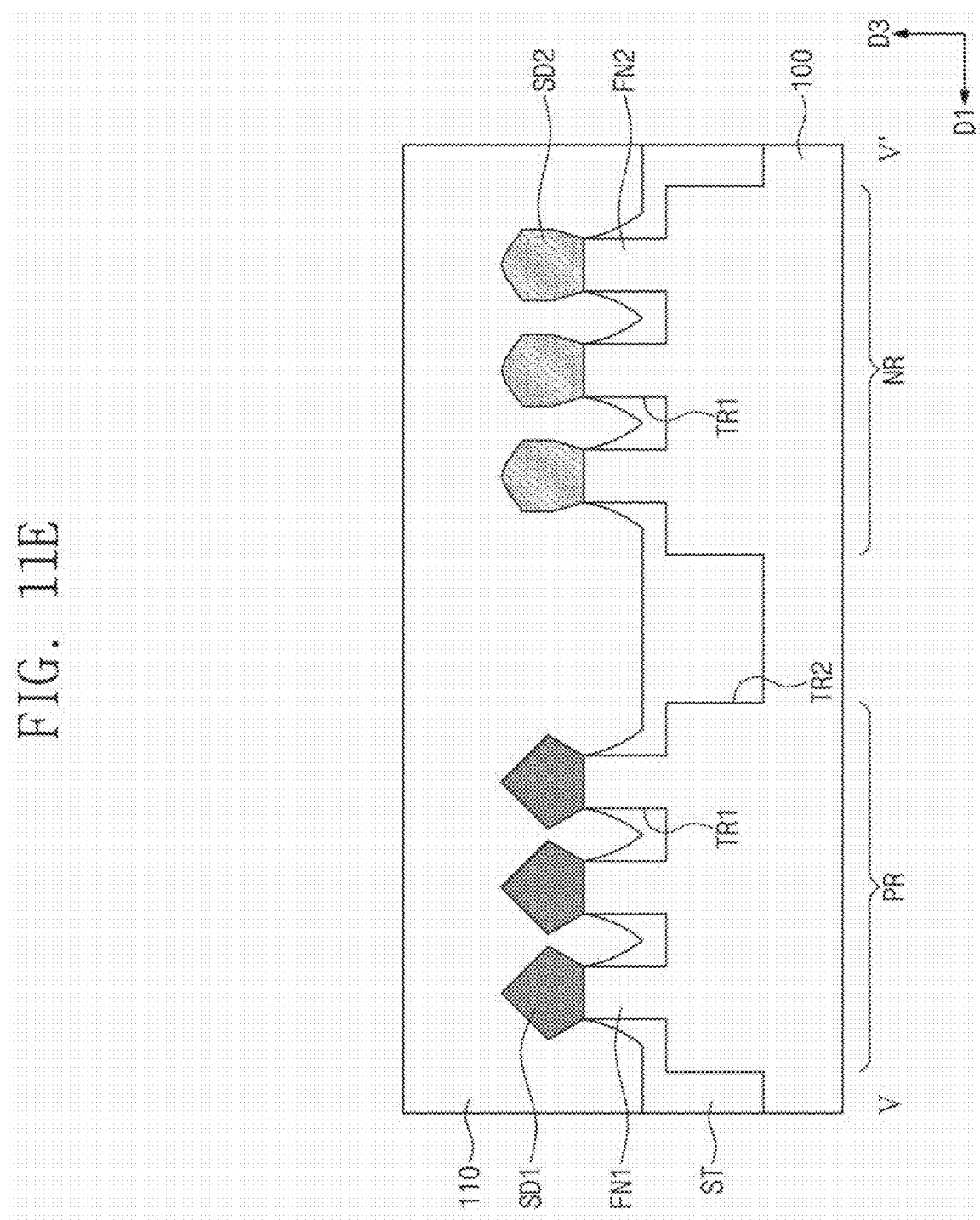
Figure 13A:
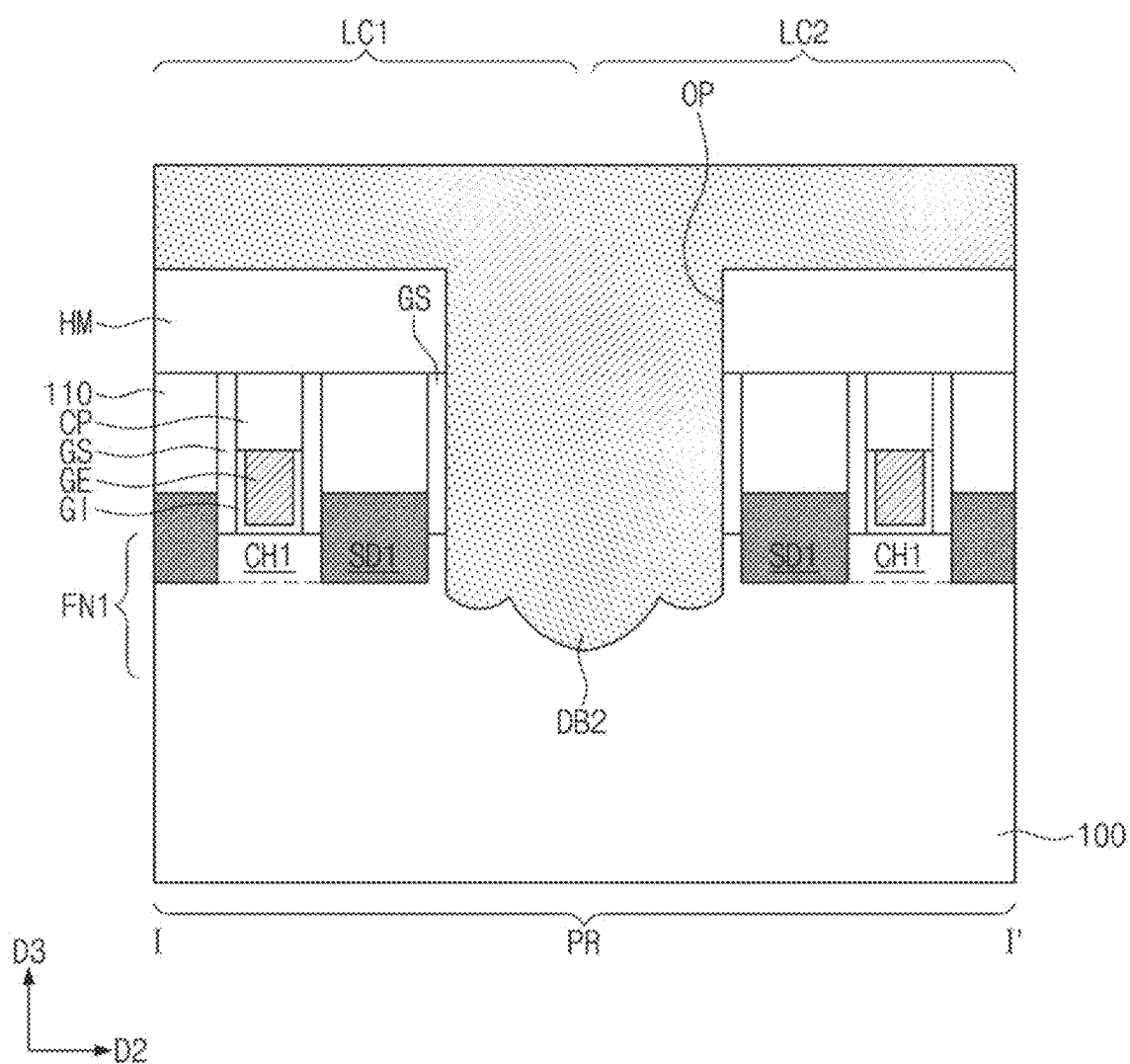
FIGS. 13A to 13E illustrate cross-sectional views respectively taken along lines I-I', II-II', III-III', IV-IV', and V-V' of FIG. 12.
Figure 13B:
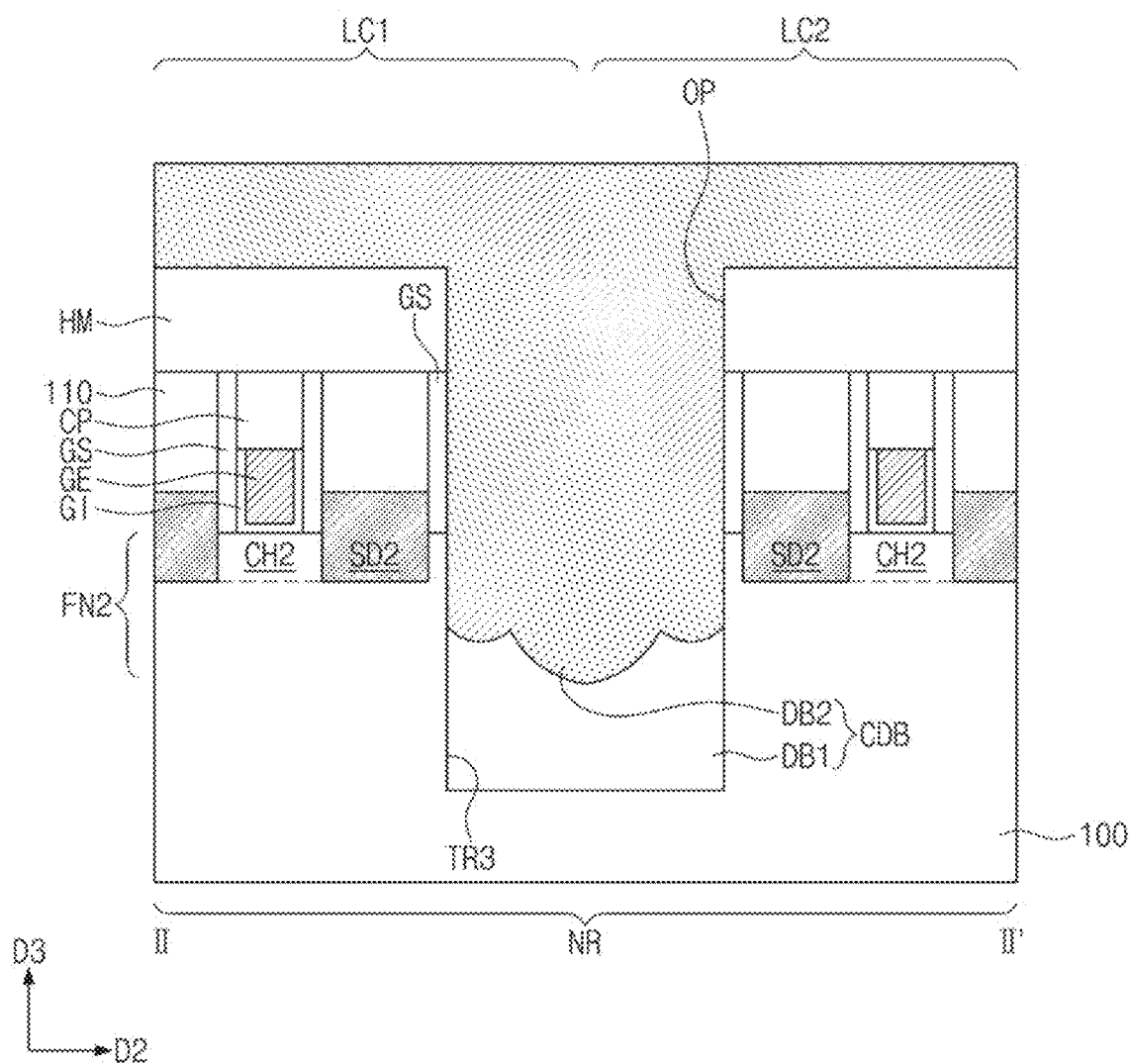
Figure 13C:
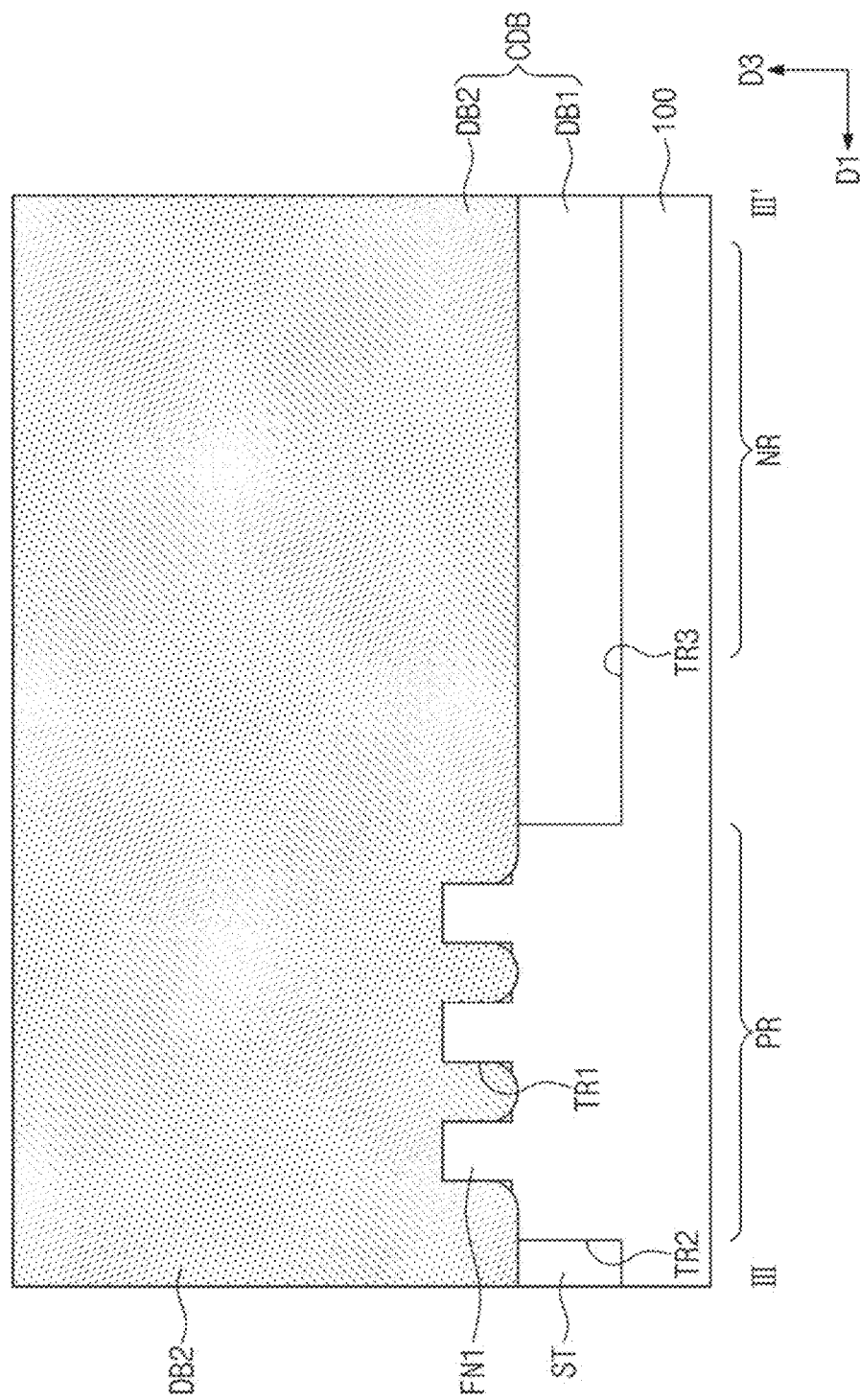
Figure 13D:
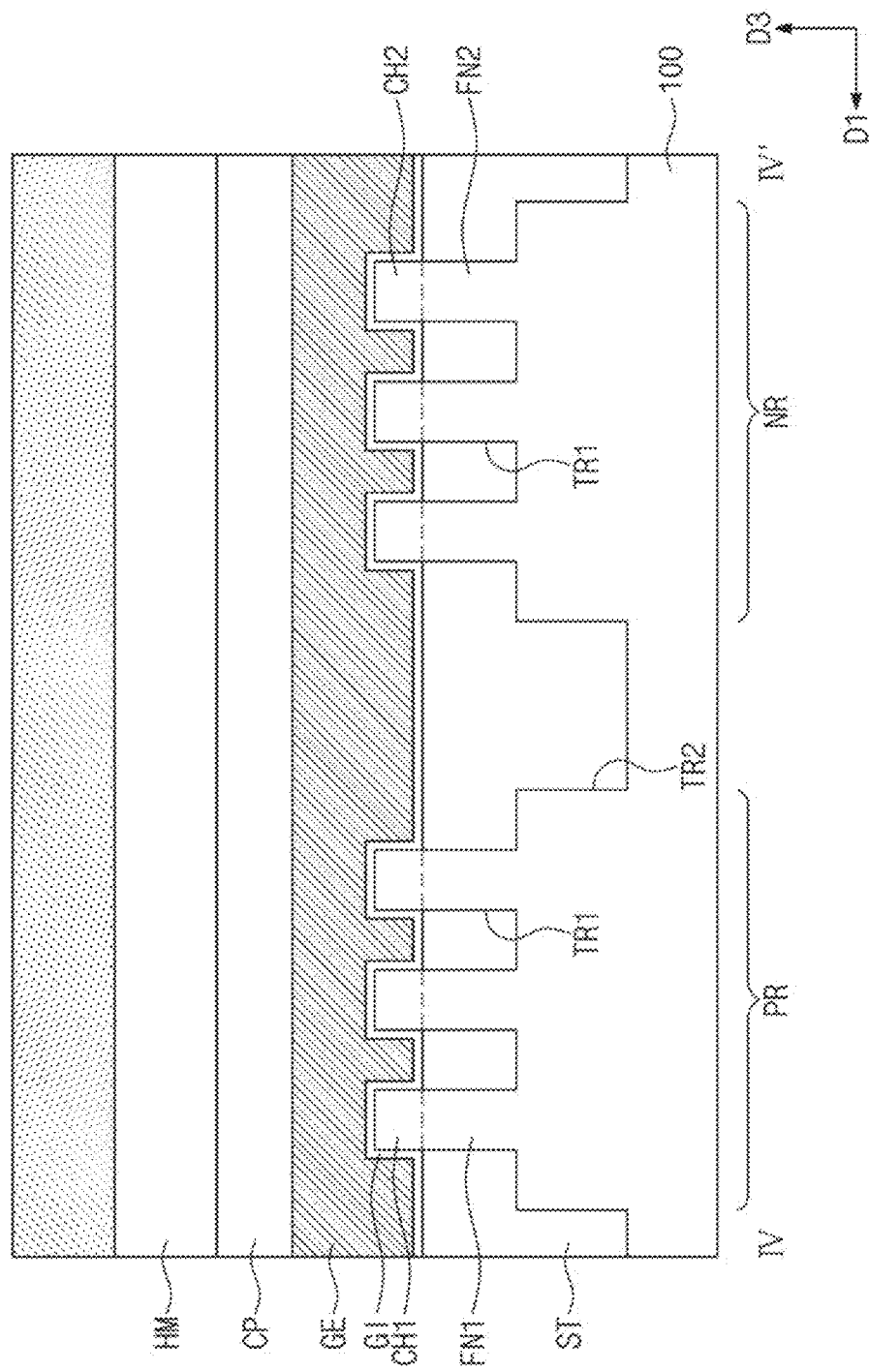
Figure 13E:
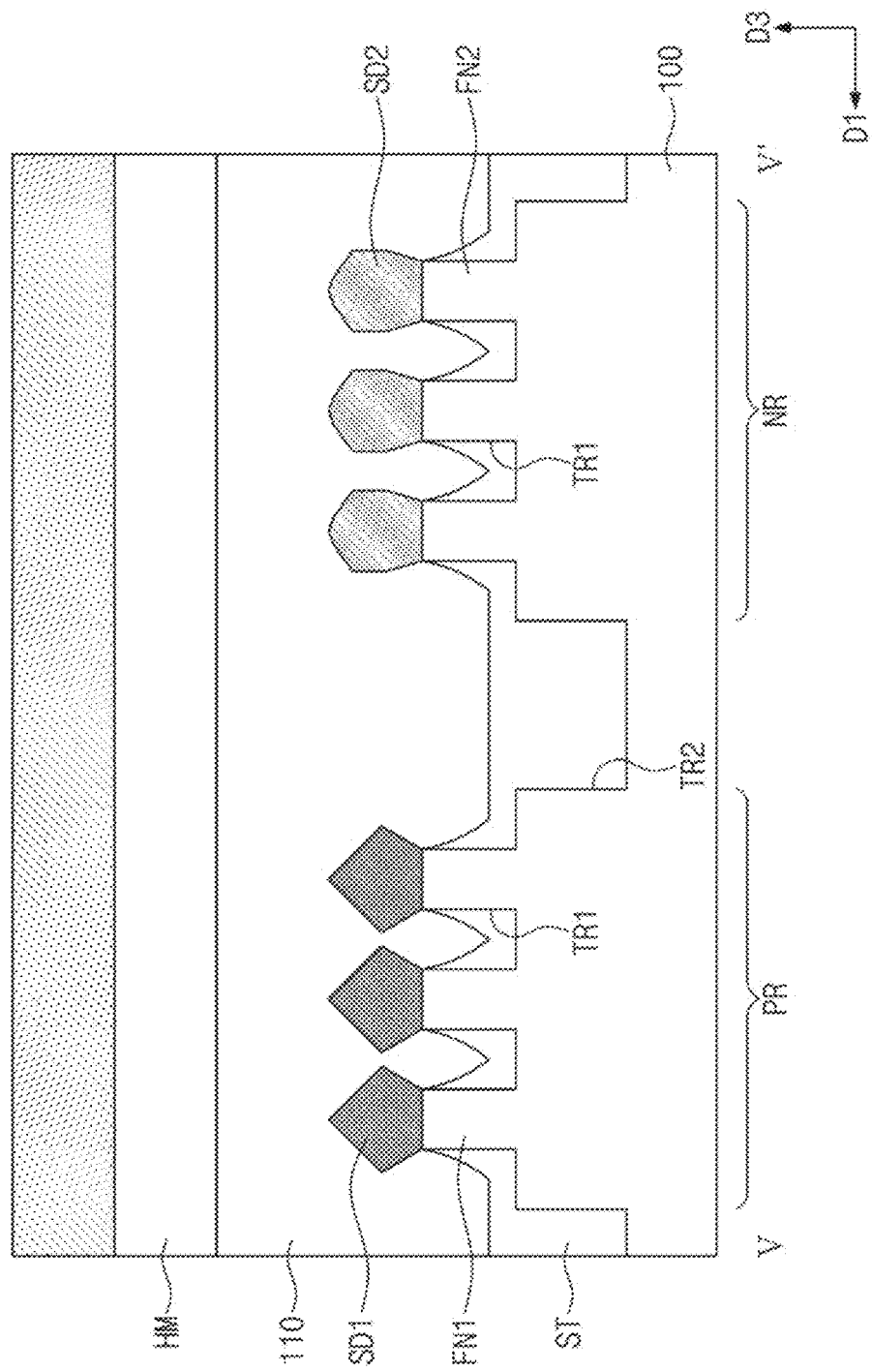

FIGS. 8, 10, and 12 illustrate plan views showing a method of manufacturing a semiconductor device according to exemplary embodiments. FIGS. 9A to 9D illustrate cross-sectional views respectively taken along lines I-I', II-II', III-III', and IV-IV' of FIG. 8. FIGS. 11A to 11E illustrate cross-sectional views respectively taken along lines I-I', II-II' III-III', IV-IV', and V-V' of FIG. 10. FIGS. 13A to 13E illustrate cross-sectional views respectively taken along lines I-I', II-II', III-III', IV-IV', and V-V' of FIG. 12. According to some exemplary embodiments, a method of manufacturing a semiconductor device includes that the layout of FIG. 5 is used to actually form patterns on a substrate.

Referring to FIGS. 5, 8, and 9A to 9D, a substrate 100 may be provided. For example, the substrate 100 may be or include a silicon substrate, a germanium substrate, or a silicon-on-insulator (SOI) substrate.

An upper portion of the substrate 100 may be patterned to form first trenches TR1 extending in a second direction D2. The first trenches TR1 may define first and second active patterns FN1 and FN2 on the upper portion of the substrate 100. The first and second active patterns FN1 and FN2 may be arranged along a first direction D1.

The upper portion of the substrate 100 may be patterned to form a second trench TR2 that defines a first active region PR and a second active region NR. When the second trench TR2 is formed, the active patterns FN1 and FN2 may be removed from an area where the second trench TR2 is formed. The formation of the second trench TR2 may include performing an etching process that uses a photomask fabricated based on the first and second active region patterns RXP and RXN of FIG. 5.

The upper portion of the substrate 100 may be patterned to form third trenches TR3 on boundaries among first to third logic cells LC1, LC2, and LC3. When the third trenches TR3 are formed, the active patterns FN1 and FN2 may be removed from areas where the third trenches TR3 are formed. The formation of the third trenches TR3 may include performing an etching process that uses a photomask fabricated based on the first diffusion break patterns FC of FIG. 5.

For example, the second and third trenches TR2 and TR3 may be formed to have the same depth as each other. For example, the second and third trenches TR2 and TR3 may be simultaneously formed by the same etching process. The second and third trenches TR2 and TR3 may be deeper than the first trenches TR1.

A device isolation layer ST may be formed to fill the first to third trenches TR1, TR2, and TR3. Silicon oxide may be used to form the device isolation layer ST. For example, the formation of the device isolation layer ST may include forming on the substrate 100 an insulation layer filling the first to third trenches TR1, TR2, and TR3, and then recessing the insulation layer until the first and second active patterns FN1 and FN2 are exposed on their upper portions. The device isolation layer ST filling the third trenches TR3 may be defined as first separation structures DB1.

Referring to FIGS. 5, 10, and 11A to 11E, gate electrodes GE may be formed to extend in the first direction D1 and to run across the first and second active patterns FN1 and FN2. Gate dielectric layers GI may be formed below the gate electrodes GE. Gate spacers GS may be formed on opposite sides of each of the gate electrodes GE. Gate capping layers CP may be formed on the gate electrodes GE. For example, a pair of the gate electrodes GE may be formed on the first separation structure DB1 (see FIG. 11B).

In some exemplary embodiments, the formation of the gate electrodes GE may include forming sacrificial patterns to run across the first and second active patterns FN1 and FN2, forming the gate spacers GS on opposite sides of each of the sacrificial patterns, and replacing the sacrificial patterns with the gate electrodes GE.

The gate electrodes GE may include one or more of metal and conductive metal nitride. The gate dielectric layers GI may include a high-k dielectric material whose dielectric constant is greater than that of a silicon oxide layer. The gate spacers GS may include one or more of SiCN, SiCON, and SiN. The gate capping layers CP may include one or more of SiON, SiCN, SiCON, and SiN.

First source/drain regions SD1 may be formed on upper portions of the first active patterns FN1. Second source/drain regions SD2 may be formed on upper portions of the second active patterns FN2. The first and second source/drain regions SD1 and SD2 may be formed on opposite sides of each of the gate electrodes GE. The first source/drain regions SD1 may be doped with p-type impurities, and the second source/drain regions SD2 may be doped with n-type impurities.

The first and second source/drain regions SD1 and SD2 may be epitaxial patterns formed by a selective epitaxial growth process. For example, a partial recess process may be performed on the first and second active patterns FN1 and FN2 formed on opposite sides of each of the gate electrodes GE, and then an epitaxial growth process may be performed on the recessed portions of the first and second active patterns FN1 and FN2.

A first interlayer dielectric layer 110 may be formed on an entire surface of the substrate 100. The first interlayer dielectric layer 110 may be formed of a silicon oxide layer or a silicon oxynitride layer. The first interlayer dielectric layer 110 may have a top surface substantially coplanar with those of the gate spacers GS and those of the gate capping layers CP.

Referring to FIGS. 5, 12, and 13A to 13E, second separation structures DB2 may be formed on a cell boundary between the first and second logic cells LC1 and LC2 and on a cell boundary between the second and third logic cells LC2 and LC3.

The second separation structure DB2 between the first and second logic cells LC1 and LC2 may be formed on the first separation structure DB1 between the first and second logic cells LC1 and LC2. A mixed separation structure CDB may be constituted by the first and second separation structures DB1 and DB2 that are formed between the first and second logic cells LC1 and LC2. The second separation structure DB2 between the second and third logic cells LC2 and LC3 may be formed on the first separation structure DB1 between the second and third logic cells LC2 and LC3. A mixed separation structure CDB may be constituted by the first and second separation structures DB1 and DB2 that are formed between the second and third logic cells LC2 and LC3.

For example, a mask layer HM may be formed on the first interlayer dielectric layer 110. The mask layer HM may include an opening OP that exposes the cell boundary between the first and second logic cells LC1 and LC2 and also include an opening OP that exposes the cell boundary between the second and third logic cells LC2 and LC3. The openings OP of the mask layer HM may be formed by performing an etching process that uses a photomask fabricated based on the second diffusion break patterns RC of FIG. 5.

An anisotropic etching process may be performed to etch the gate capping layers CP, the gate spacers GS, the gate electrodes GE, the gate dielectric layers GI, the first active patterns FN1, and the device isolation layer ST that are exposed to the openings OP of the mask layer HM that serves as an etching mask of the anisotropic etching process. The first active patterns FN1 may be removed on their upper portions exposed to the openings OP, which removal may cause the first active patterns FN1 of neighboring logic cells are separated from each other.

After the anisotropic etching process, the openings OP may be filled with an insulating material to form second separation structures DB2. The insulating material may include a silicon oxide layer, a silicon nitride layer, or a silicon oxynitride layer.

During the anisotropic etching process, an area where the first interlayer dielectric layer 110 is positioned may be etched more than areas where the gate capping layers CP, the gate electrodes GE, and the gate spacers SG are positioned. As a result, each of the second separation structures DB2 may be formed to have a U-shaped cross-section in the second direction D2.

Referring back to FIGS. 5, 6, and 7A to 7E, a planarization process may be performed until a top surface of the first interlayer dielectric layer 110 is exposed. A second interlayer dielectric layer 120 may be formed on the first interlayer dielectric layer 110.

Active contacts AC and gate contacts GC may be formed to penetrate the first and second interlayer dielectric layers 110 and 120. The active contacts AC may be formed on the first and second source/drain regions SD1 and SD2. The active contacts AC may have a linear shape extending in the first direction D1. The gate contacts GC may be formed on the gate electrodes GE. The gate contacts GC may have a bar shape extending in the second direction D2.

A third interlayer dielectric layer 130 may be formed on the second interlayer dielectric layer 120. Interconnection lines IL and vias VI may be formed in the third interlayer dielectric layer 130. The vias VI may be formed between the interconnection lines IL and the active contacts AC and between the interconnection lines IL and the gate contacts GC.

FIG. 14 illustrates a layout according to exemplary embodiments. In the exemplary embodiment that follows, a detailed description of technical features repetitive to those discussed above with reference to FIGS. 4 and 5 will be omitted, and a difference thereof will be discussed in detail.

Referring to FIGS. 3 and 14, the mixed diffusion break pattern CSC may be provided on each of the first and second cell boundaries BD1 and BD2 (S120). The mixed diffusion break pattern CSC may include the first diffusion break pattern FC and a pair of the second diffusion break patterns RC.

The pair of the second diffusion break patterns RC may parallel extend in the first direction D1. The pair of the second diffusion break patterns RC may be disposed to overlap a pair of the gate patterns GP. Likewise the first diffusion break pattern FC, the pair of the second diffusion break patterns RC may separate neighboring standard cells from each other.

Figure 15:
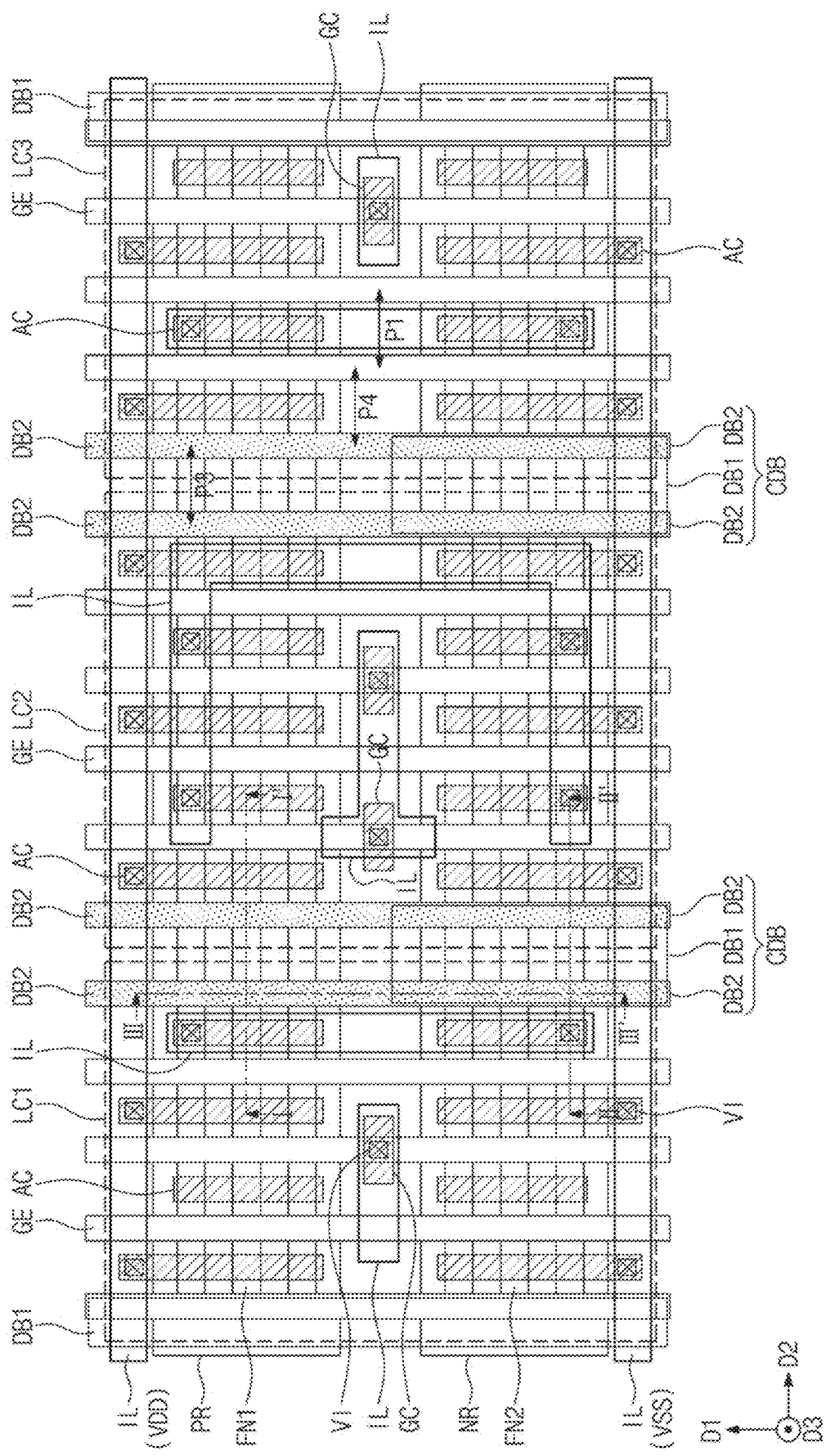
FIG. 15 illustrates a plan view showing a semiconductor device according to exemplary embodiments.
Figure 16A:
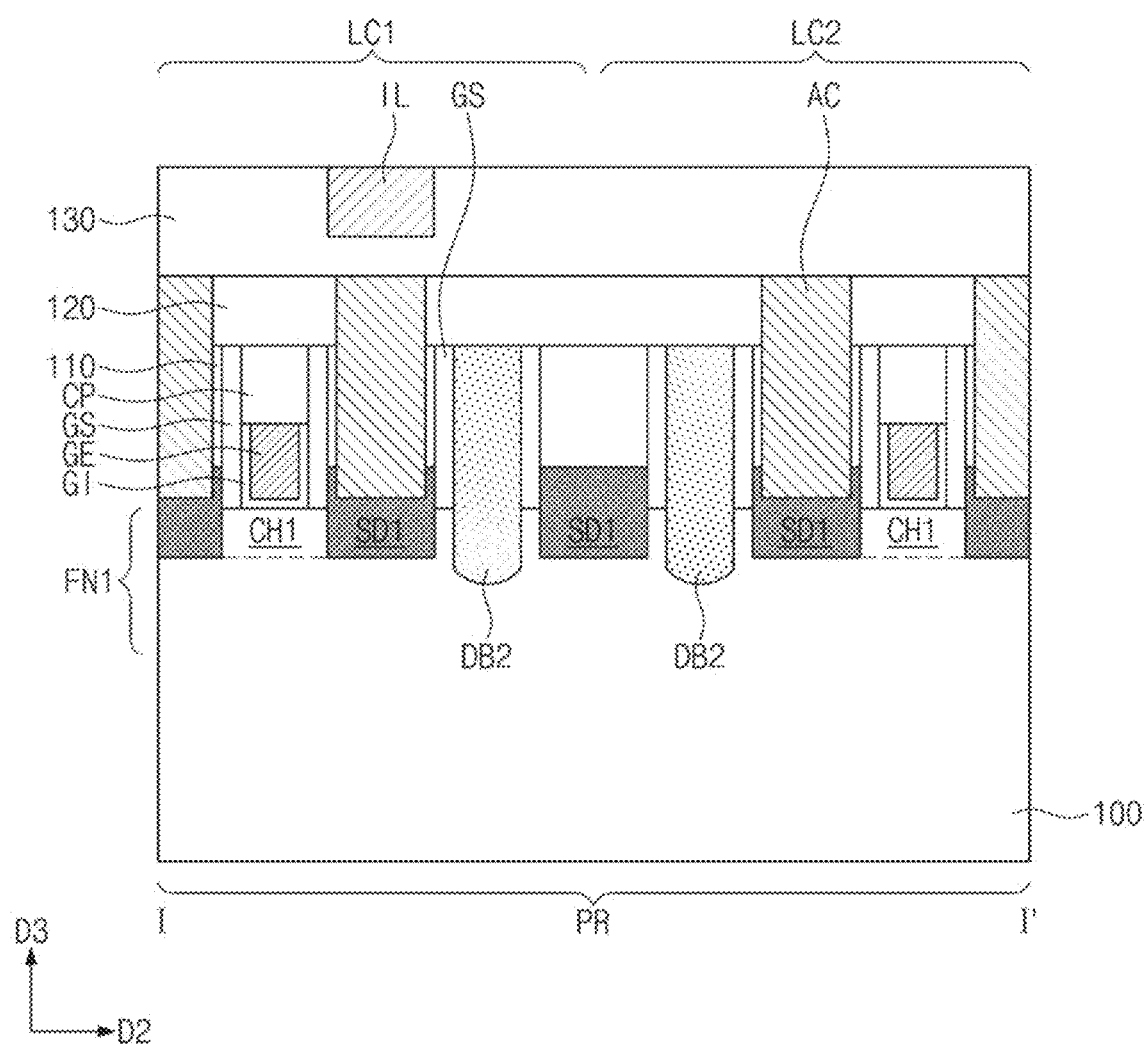
FIGS. 16A to 16C illustrate cross-sectional views respectively taken along lines I-I', II-II', and III-III' of FIG. 15.
Figure 16B:
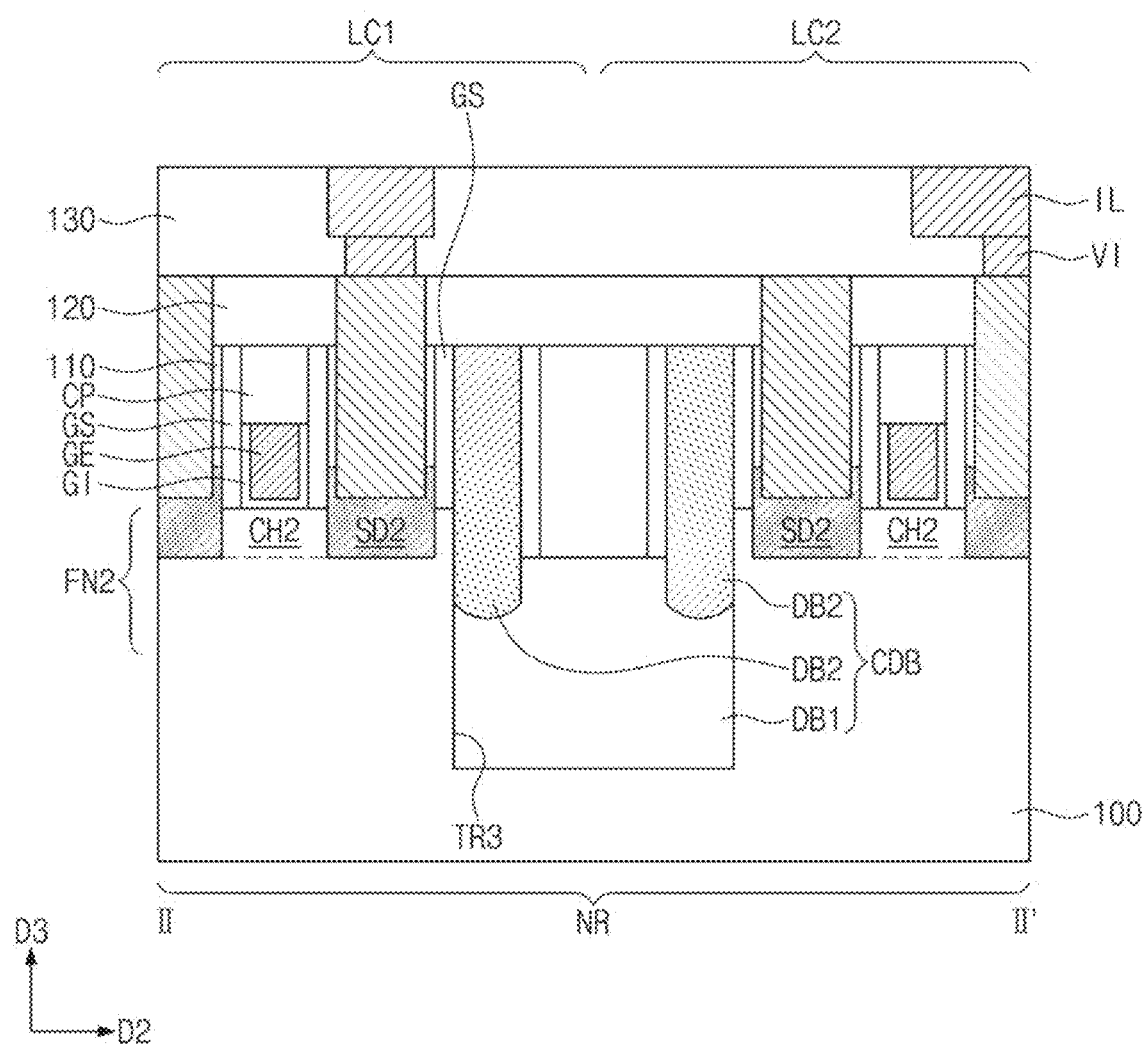
Figure 16C:
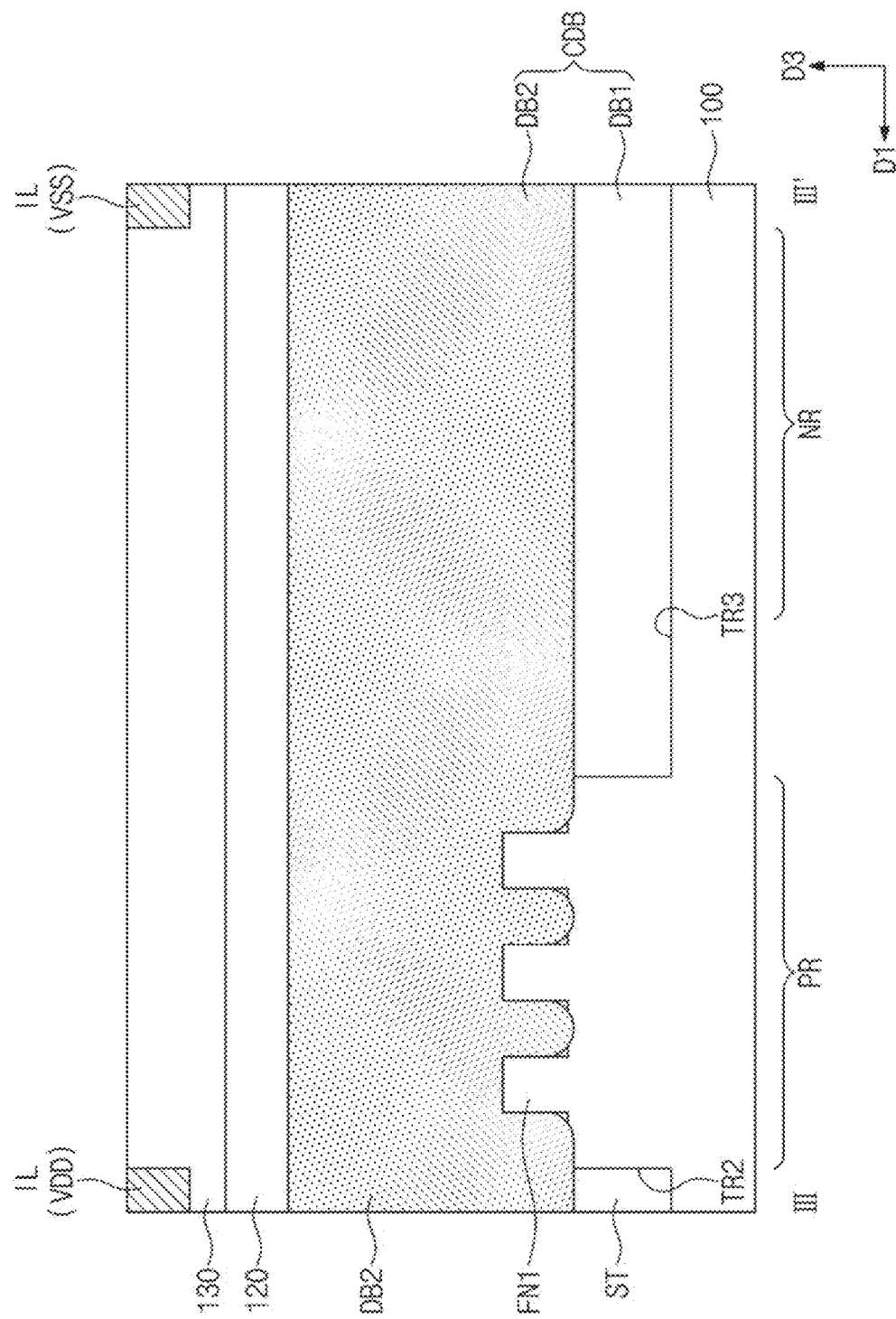

FIG. 15 illustrates a plan view showing a semiconductor device according to exemplary embodiments. FIGS. 16A to 16C illustrate cross-sectional views respectively taken along lines I-I', II-II', and III-III' of FIG. 15. FIGS. 15 and 16A to 16C exemplarily show a semiconductor device actually achieved on a substrate when the layout of FIG. 14 is used. In the exemplary embodiment that follows, a detailed description of technical features repetitive to those discussed above with reference to FIGS. 6 and 7A to 7E will be omitted, and a difference thereof will be discussed in detail.

Referring to FIGS. 14, 15, and 16A to 16C, the mixed separation structure CDB may be provided on each of the cell boundary between the first and second logic cells LC1 and LC2 and the cell boundary between the second and third logic cells LC2 and LC3. The mixed separation structure CDB may include the first separation structure DB1 and a pair of the second separation structures DB2.

The pair of the second separation structures DB2 may extend in the first direction D1 and run across the first and second active regions PR and NR. A pair of the gate spacers GS may be provided on opposite sidewalls of each of the pair of the second separation structures DB2. On the first active region PR, the first source/drain region SD1 may be interposed between the pair of the second separation structures DB2.

Each of the pair of the second separation structures DB2 may have substantially the same width as that of the gate electrode GE. The pair of the second separation structures DB2 may have a third pitch P3 therebetween. The second separation structure DB2 and its adjacent gate electrode GE may have a fourth pitch P4 therebetween. The third pitch P3 may be substantially the same as the first pitch P1 between the gate electrodes GE. The fourth pitch P4 may be substantially the same as the first pitch P1 between the gate electrodes GE.

Figure 17A:
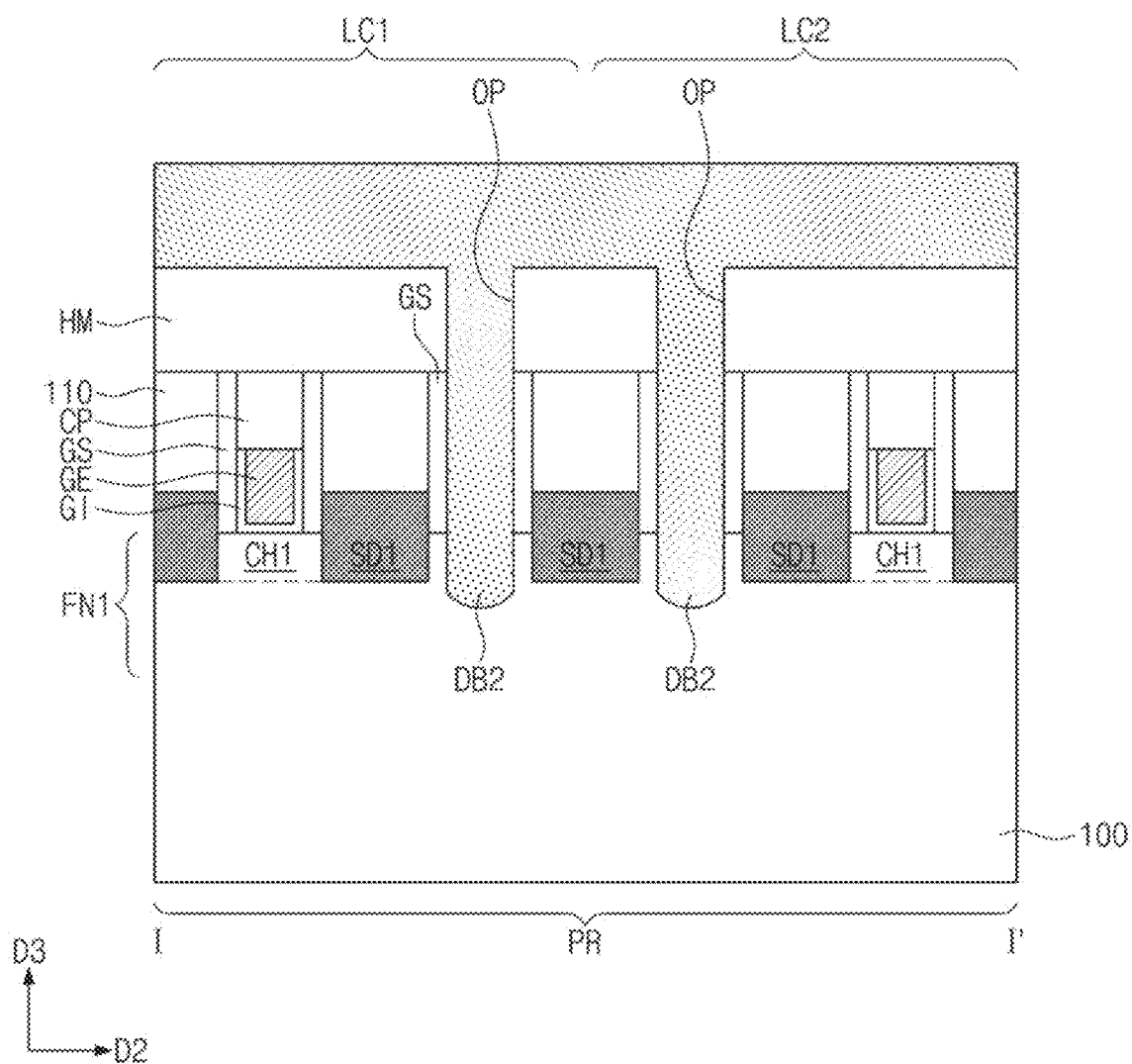
FIGS. 17A and 17B illustrate cross-sectional views respectively taken along lines I-I' and II-II' of FIG. 15, showing a method of manufacturing a semiconductor device according to exemplary embodiments.
Figure 17B:
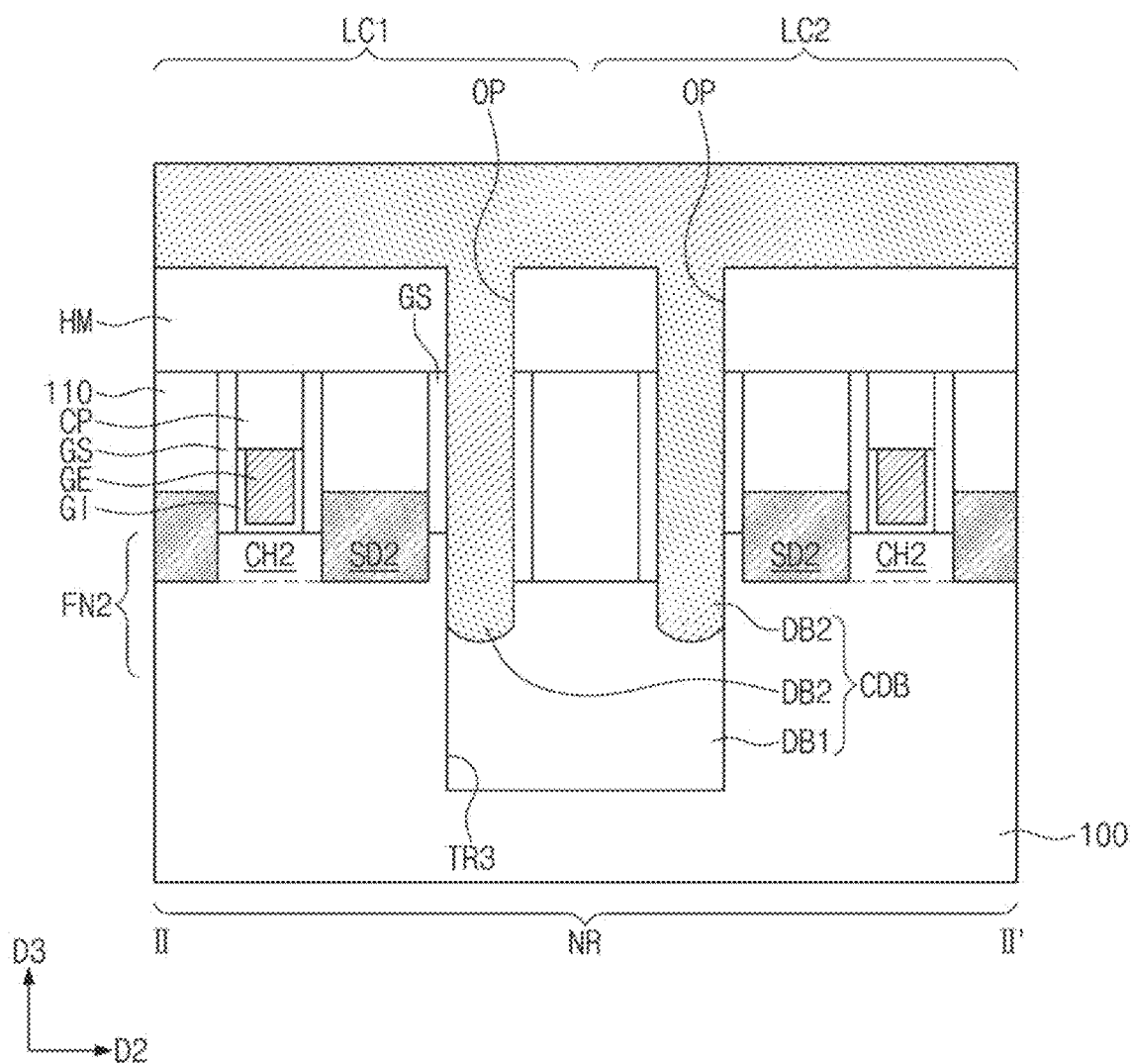

FIGS. 17A and 17B illustrate cross-sectional views respectively taken along lines I-I' and II-II' of FIG. 15, showing a method of manufacturing a semiconductor device according to exemplary embodiments. According to some exemplary embodiments, a method of manufacturing a semiconductor device includes that the layout of FIG. 14 is used to actually form patterns on a substrate.

Referring to FIGS. 14, 15, and 17A and 17B, the mask layer HM may be formed on a resultant structure shown in FIGS. 10 and 11A to 11E. The mask layer HM may include a pair of the openings OP that expose the cell boundary between the first and second logic cells LC1 and LC2. The mask layer HM may include a pair of the openings OP that expose the cell boundary between the second and third logic cells LC2 and LC3. The pair of the openings OP of the mask layer HM may be formed by performing an etching process that uses a photomask fabricated based on the second diffusion break patterns RC of FIG. 14.

The first active patterns FN1 may be removed on their upper portions exposed to the openings OP when an anisotropic etching process is performed using the mask layer HM as an etching mask. After the anisotropic etching process, the openings OP may be filled with an insulating material to form the second separation structures DB2.

Figure 18:
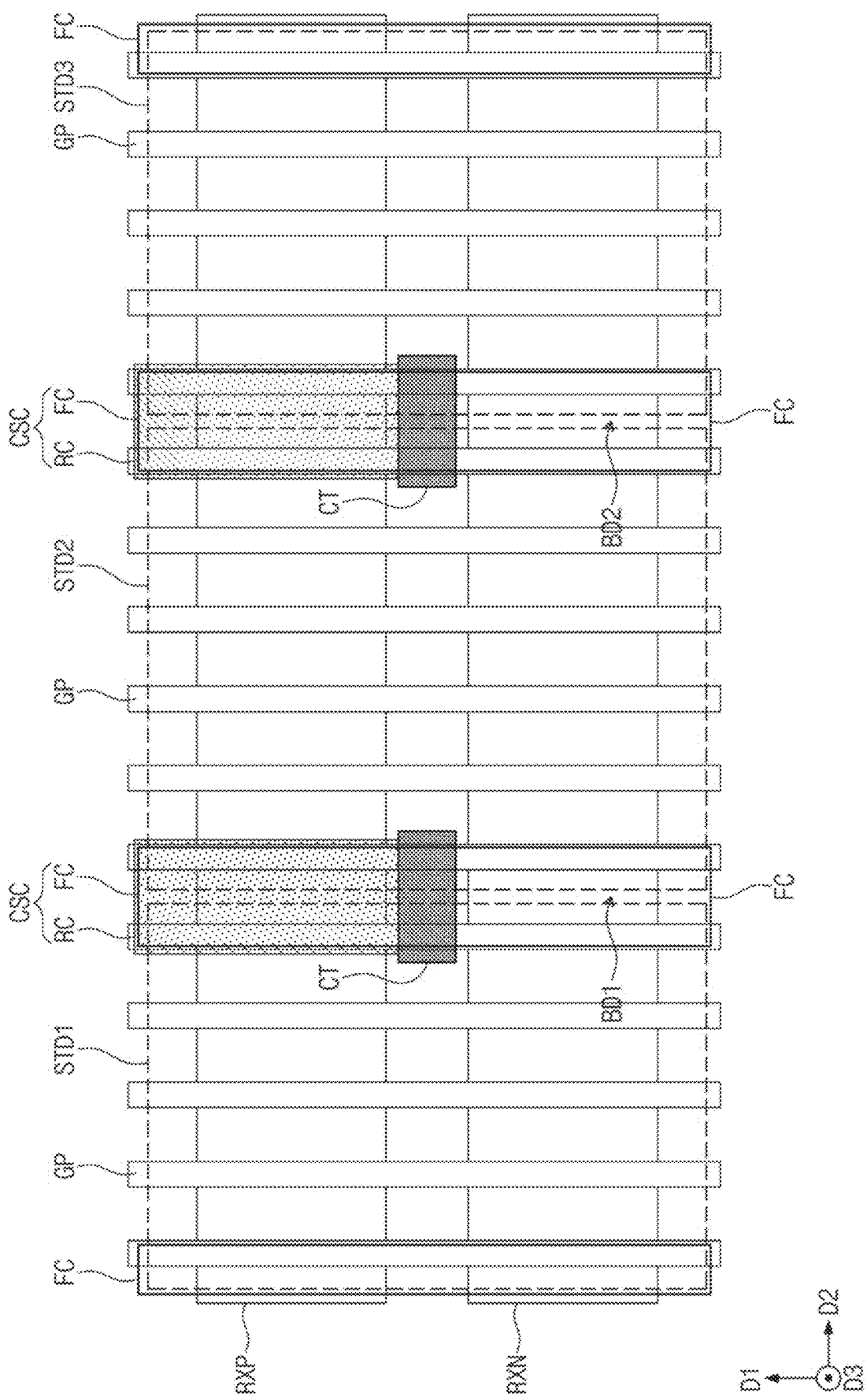
FIG. 18 illustrates a layout according to exemplary embodiments.

FIG. 18 illustrates a layout according to exemplary embodiments. In the exemplary embodiment that follows, a detailed description of technical features repetitive to those discussed above with reference to FIGS. 4 and 5 will be omitted, and a difference thereof will be discussed in detail.

Referring to FIGS. 3 and 18, the mixed diffusion break pattern CSC may be provided on each of the first and second cell boundaries BD1 and BD2 (S120). The mixed diffusion break pattern CSC may include the first diffusion break pattern FC (see solid line in FIG. 18) and the second diffusion break pattern RC (see light shaded portion in FIG. 18). The first and second diffusion break patterns FC and RC may have substantially the same width in the second direction D2.

The first diffusion break pattern FC of the mixed diffusion break pattern CSC may extend in the first direction D1. The first diffusion break pattern FC of the mixed diffusion break pattern CSC may extend from the second active region pattern RXN toward the first active region pattern RXP. The first diffusion break pattern FC of the mixed diffusion break pattern CSC may have substantially the same size and shape as those of the first diffusion break pattern FC of FIG. 4.

The second diffusion break pattern RC may be disposed limitedly on the first active region pattern RXP. The second diffusion break pattern RC may have a size approximately half that of the first diffusion break pattern FC. That is, the second diffusion break pattern RC may extend up to a boundary of a gate cut pattern CT, described below.

A gate cut pattern CT may be disposed on a pair of the gate patterns GP overlapping the mixed diffusion break pattern CSC. The gate cut pattern CT may be disposed between the first and second active region patterns RXP and RXN. The gate cut pattern CT may define a gate separation structure.

Figure 19:
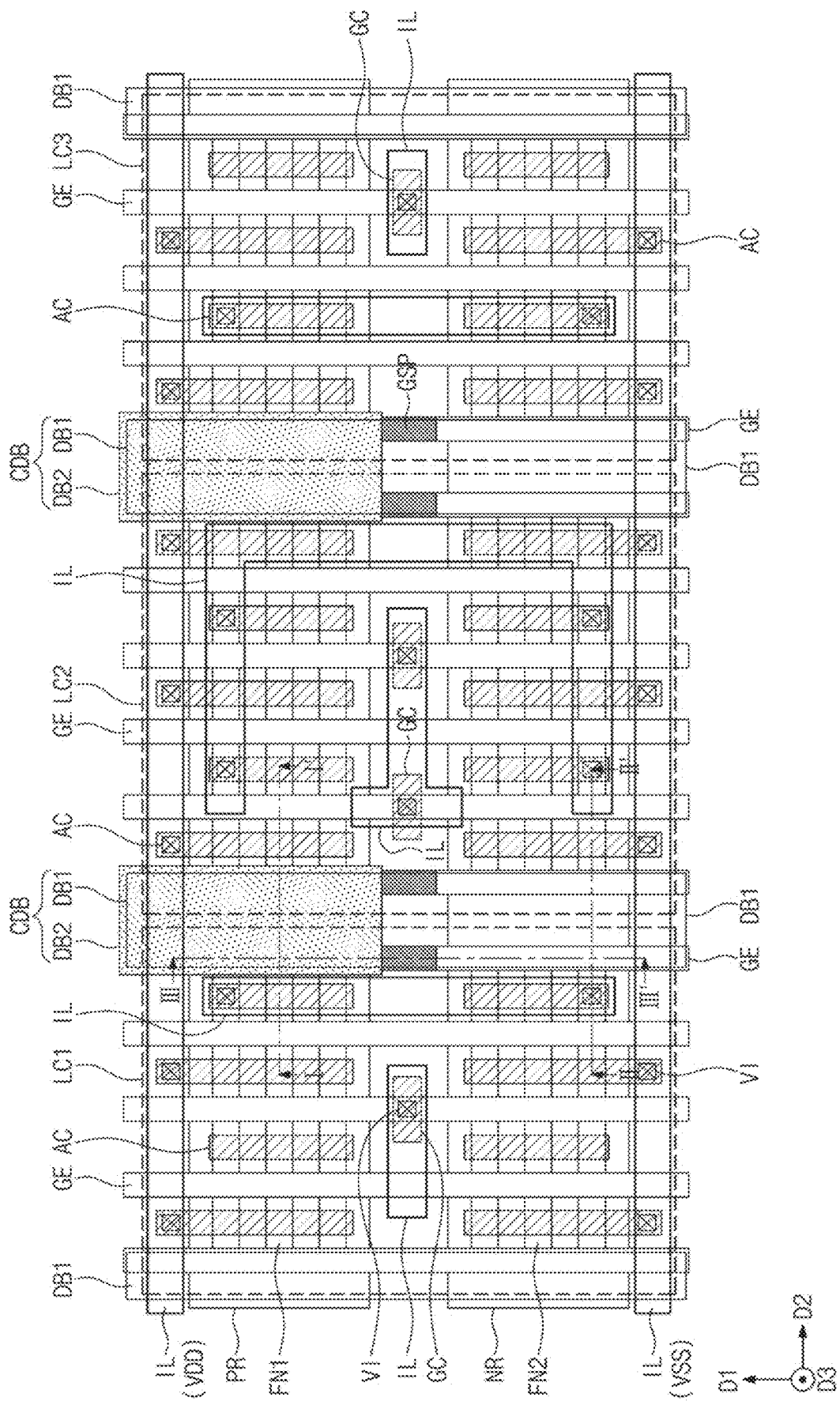
FIG. 19 illustrates a plan view showing a semiconductor device according to exemplary embodiments.
Figure 20A:
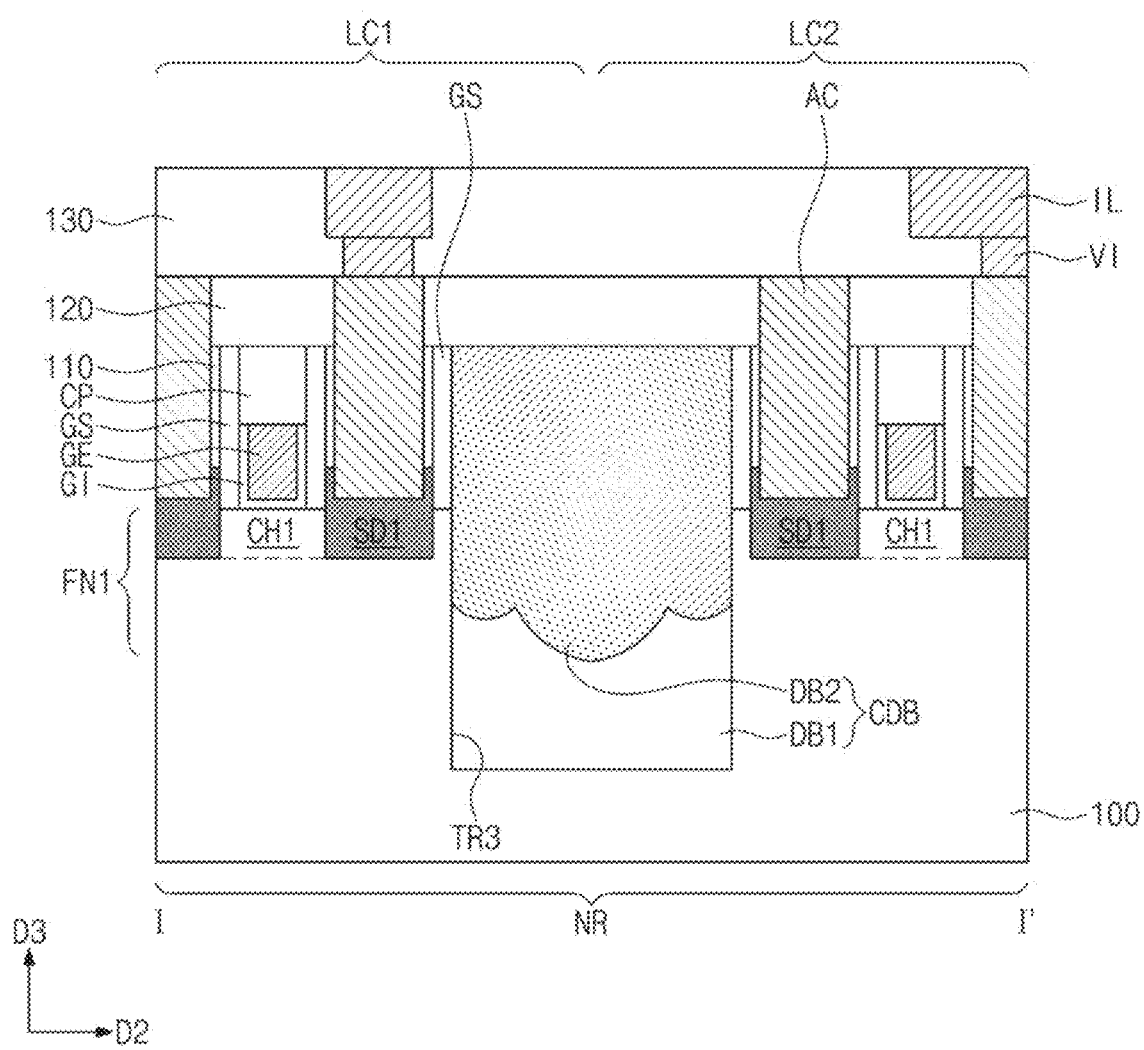
FIGS. 20A to 20C illustrate cross-sectional views respectively taken along lines I-I', II-II', and III-III' of FIG. 19.
Figure 20B:
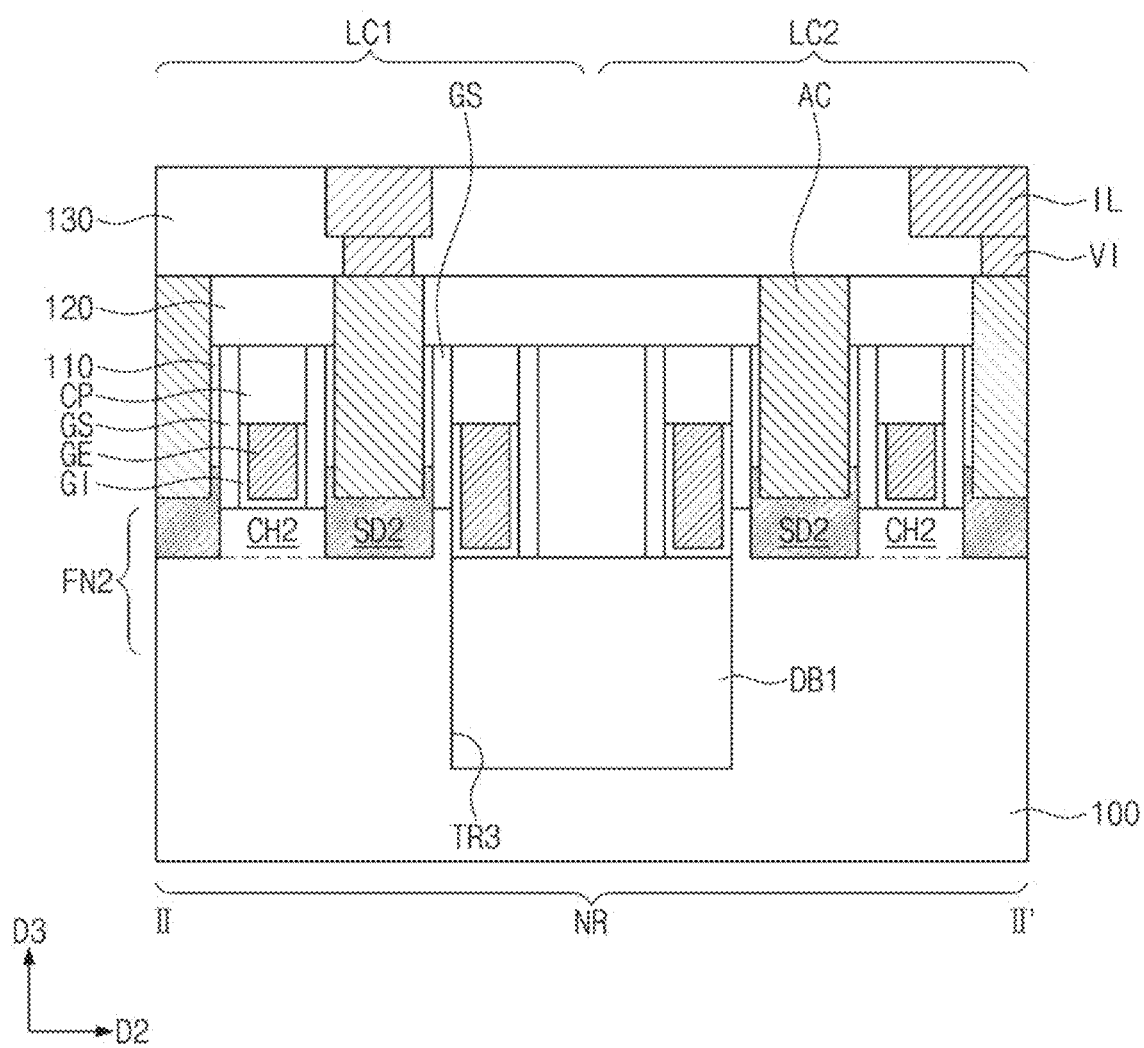
Figure 20C:
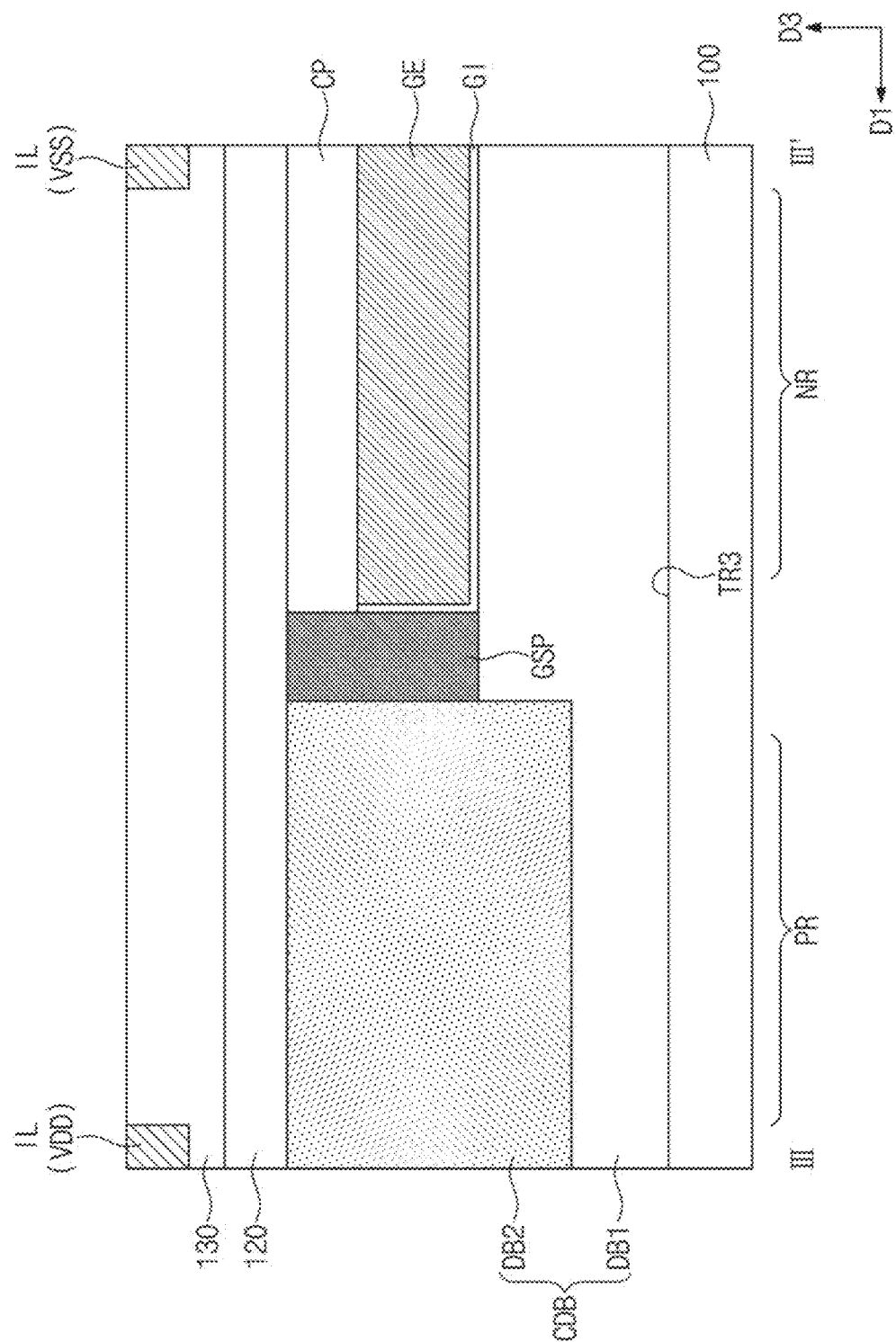

FIG. 19 illustrates a plan view showing a semiconductor device according to exemplary embodiments. FIGS. 20A to 20C illustrate cross-sectional views respectively taken along lines I-I', II-II', and III-III' of FIG. 19. FIGS. 19 and 20A to 20C exemplarily show a semiconductor device actually achieved on a substrate when the layout of FIG. 18 is used. In the exemplary embodiment that follows, a detailed description of technical features repetitive to those discussed above with reference to FIGS. 6 and 7A to 7E will be omitted, and a difference thereof will be discussed in detail.

Referring to FIGS. 18, 19, and 20A to 20C, the mixed separation structure CDB may be provided on each of the cell boundary between the first and second logic cells LC1 and LC2 and the cell boundary between the second and third logic cells LC2 and LC3. The mixed separation structure CDB may include the first separation structure DB1 and the second separation structure DB2.

The first separation structure DB1 may extend in the first direction D1 and run across the first and second active regions PR and NR. The first separation structure DB1 may mutually separate a pair of the active patterns FN1 and FN2 adjacent to each other in the second direction D2.

The second separation structure DB2 may selectively run across the first active region PR except for the second active region NR. On the first active region PR, the second separation structure DB2 may be disposed on the first separation structure DB1.

On the second active region NR, a pair of the gate electrodes GE may be disposed on the first separation structure DB1 of the mixed separation structure CDB. A pair of gate separation structures GSP may be interposed between the second separation structure DB2 and a pair of the gate electrodes GE (see FIG. 20C). The pair of gate separation structures GSP may be disposed on the first separation structure DB1 between the first and second active regions PR and NR. The pair of gate separation structures GSP may include a silicon oxide layer, a silicon nitride layer, or a silicon oxynitride layer.

A pair of the gate electrodes GE on the first separation structure DB1 of the mixed separation structure CDB may be dummy gate electrodes. The pair of the gate electrodes GE may serve as conductive lines.

Figure 21:
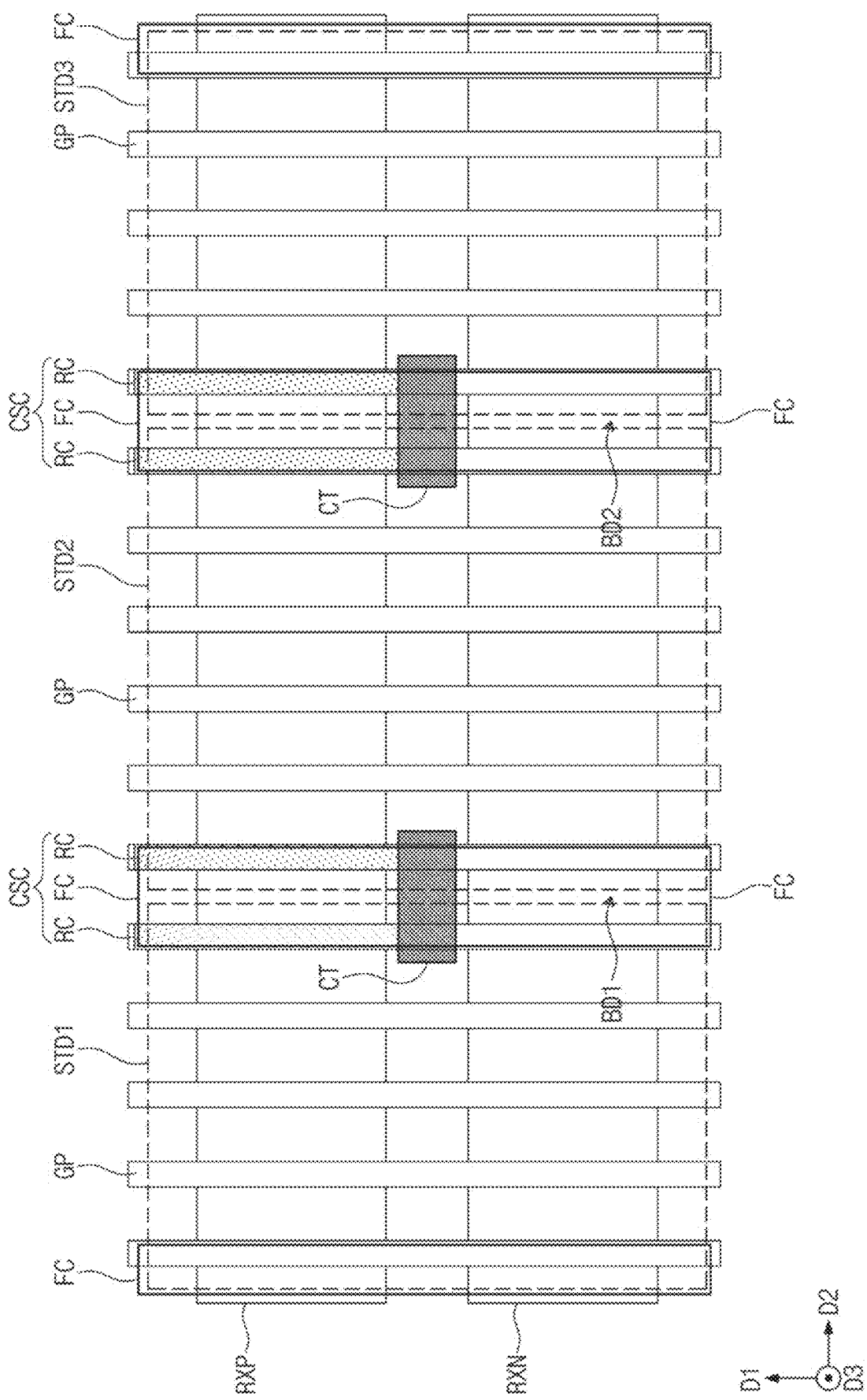
FIG. 21 illustrates a layout according to exemplary embodiments.

FIG. 21 illustrates a layout according to exemplary embodiments. In the exemplary embodiment that follows, a detailed description of technical features repetitive to those discussed above with reference to FIG. 18 will be omitted, and a difference thereof will be discussed in detail.

Referring to FIGS. 3 and 21, the mixed diffusion break pattern CSC may be provided on each of the first and second cell boundaries BD1 and BD2 (S120). The mixed diffusion break pattern CSC may include the first diffusion break pattern FC and a pair of the second diffusion break patterns RC. The pair of the second diffusion break patterns RC may each extend up to a boundary of the gate cut pattern CT.

The pair of the second diffusion break patterns RC may parallel extend in the first direction D1. The pair of the second diffusion break patterns RC may be disposed to overlap a pair of the gate patterns GP.

Figure 22:
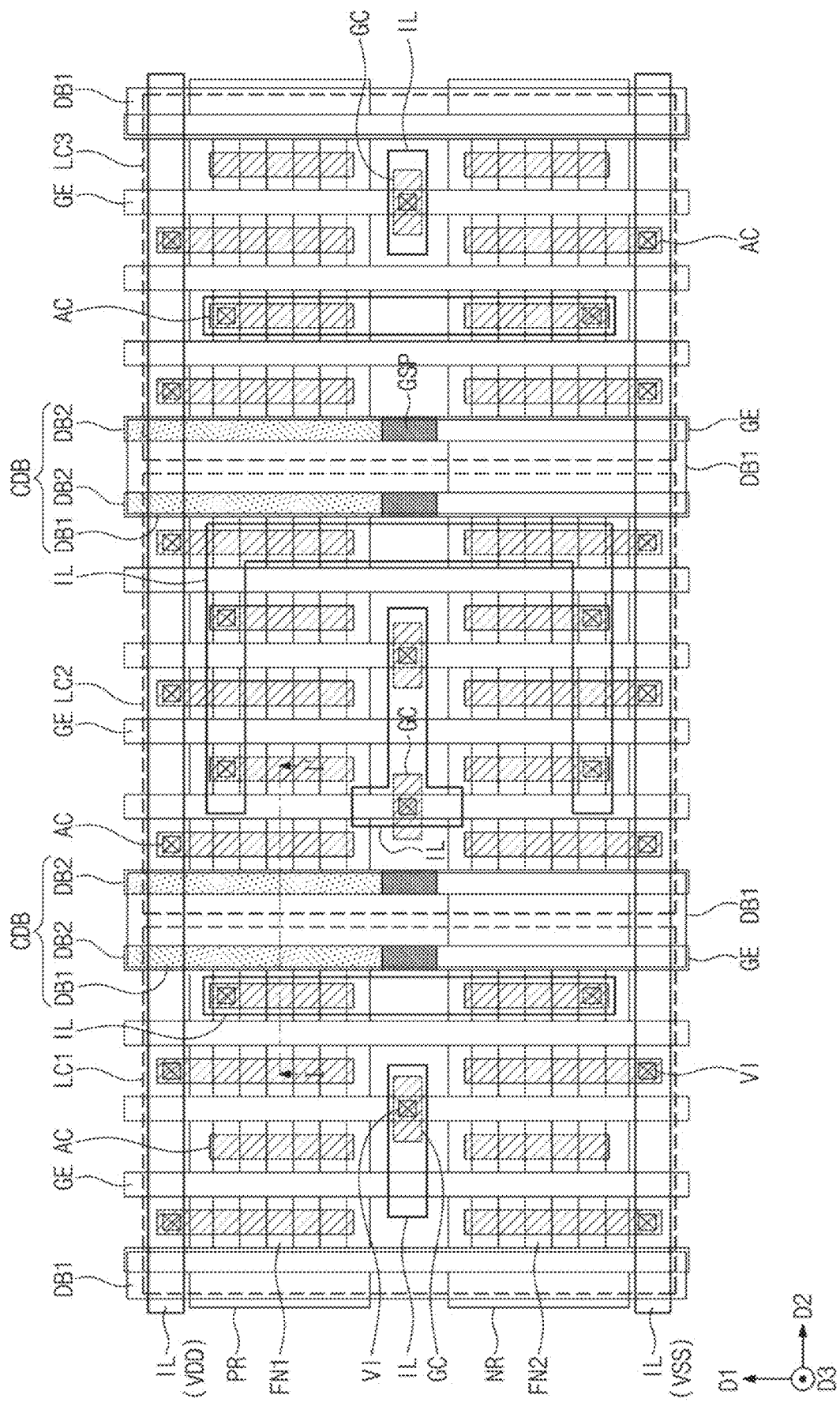
FIG. 22 illustrates a plan view showing a semiconductor device according to exemplary embodiments.
Figure 23:
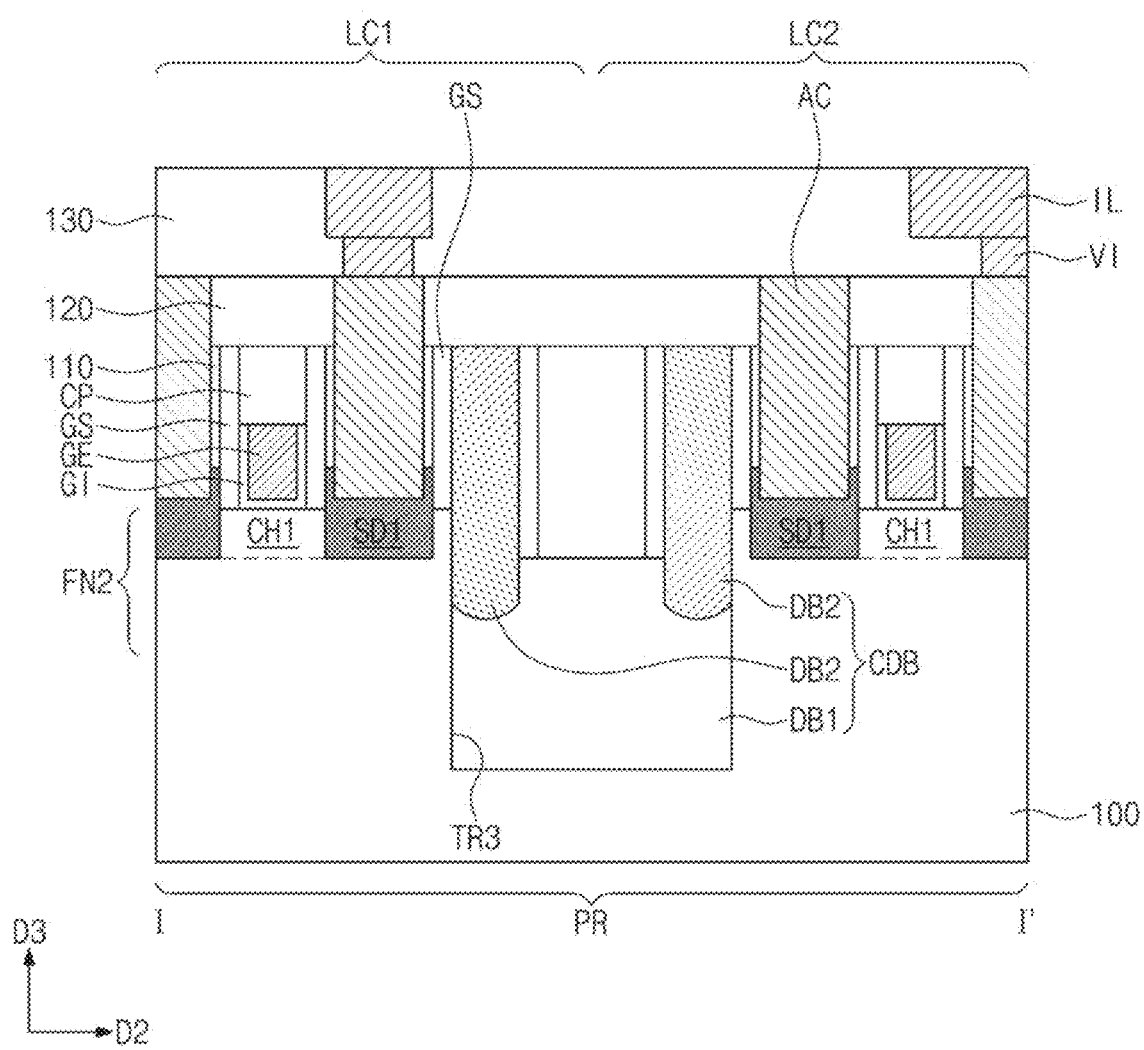
FIG. 23 illustrates a cross-sectional view taken along line I-I' of FIG. 22.

FIG. 22 illustrates a plan view showing a semiconductor device according to exemplary embodiments. FIG. 23 illustrates a cross-sectional view taken along line I-I' of FIG. 22. FIGS. 22 and 23 exemplarily show a semiconductor device actually achieved on a substrate when the layout of FIG. 21 is used. In the exemplary embodiment that follows, a detailed description of technical features repetitive to those discussed above with reference to FIGS. 19 and 20A to 20C will be omitted, and a difference thereof will be discussed in detail.

Referring to FIGS. 21, 22, and 23, the mixed separation structure CDB may be provided on each of the cell boundary between the first and second logic cells LC1 and LC2 and the cell boundary between the second and third logic cells LC2 and LC3. The mixed separation structure CDB may include the first separation structure DB1 and a pair of the second separation structures DB2.

The pair of the second separation structures DB2 may extend in the first direction D1 and selectively run across the first active region PR. A pair of the gate spacers GS may be provided on opposite sidewalls of each of the pair of the second separation structures DB2.

A pair of the gate separation structures GSP may be interposed between a pair of the gate electrodes GE on the first separation structure DB1 of the mixed separation structure CDB and a pair of the second separation structures DB2 of the mixed separation structure CDB. For example, on the first separation structure DB1 of the mixed separation structure CDB, the gate electrode GE, the gate separation structure GSP, and the second separation structure DB2 may be sequentially arranged along the first direction D1. The gate electrode GE, the gate separation structure GSP, and the second separation structure DB2 may be aligned along the first direction D1.

Figure 24:
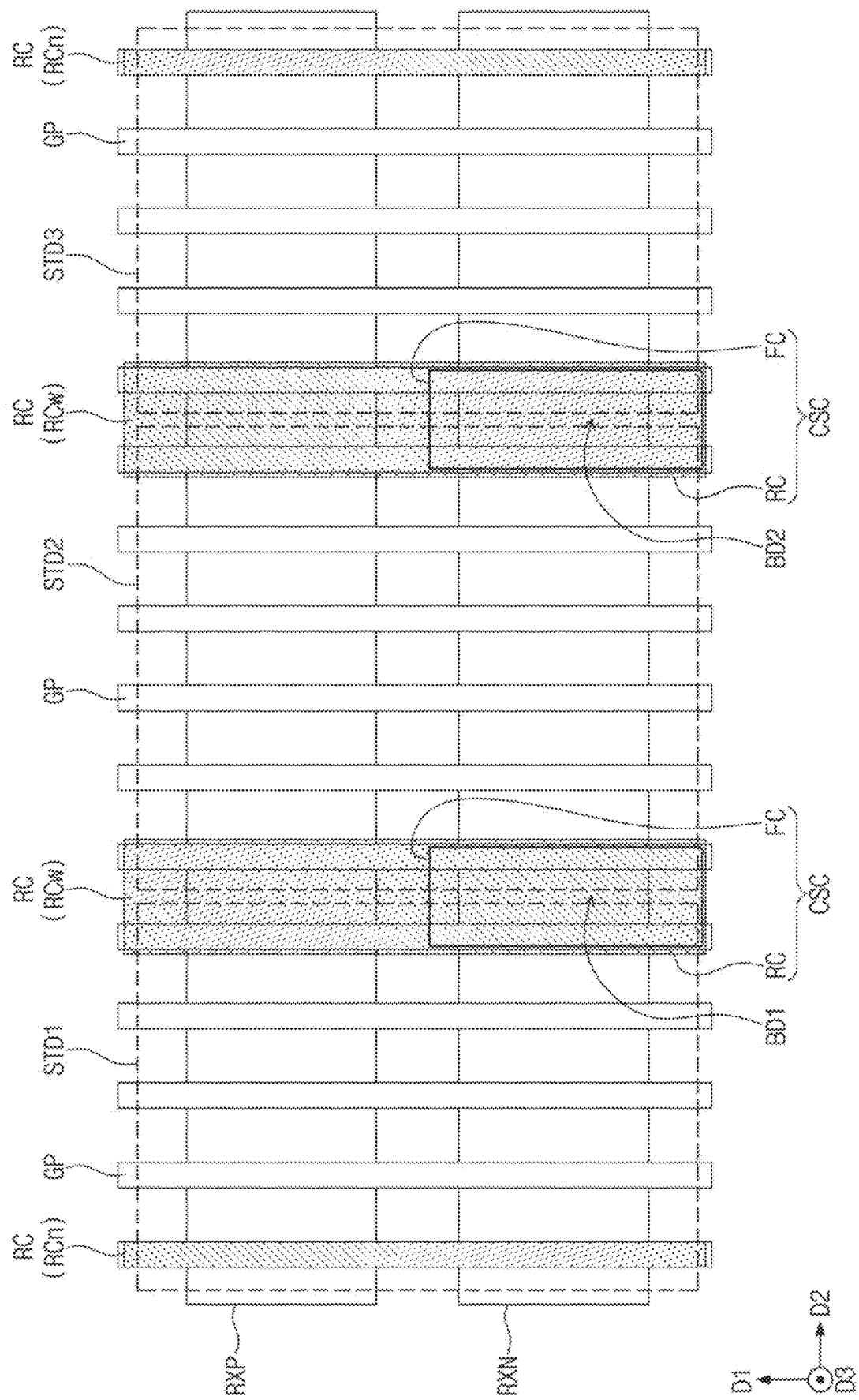
FIG. 24 illustrates a layout according to exemplary embodiments.

FIG. 24 illustrates a layout according to exemplary embodiments. In the exemplary embodiment that follows, a detailed description of technical features repetitive to those discussed above with reference to FIGS. 4 and 5 will be omitted, and a difference thereof will be discussed in detail.

Referring to FIG. 24, the mixed diffusion break pattern CSC may be provided on each of the first cell boundary BD1 between the first and second standard cells STD1 and STD2 and the second cell boundary BD2 between the second and third standard cells STD2 and STD3. The mixed diffusion break pattern CSC may include the first diffusion break pattern FC and the second diffusion break pattern RC. The second diffusion break pattern RC may be provided on each of other cell boundary of the first standard cell STD1 and other cell boundary of the third standard cell STD3.

The second diffusion break pattern RC may include a wide diffusion break pattern RCw and a narrow diffusion break pattern RCn. The wide diffusion break pattern RCw may correspond to the second diffusion break pattern RC of the mixed diffusion break pattern CSC, and the narrow diffusion break pattern RCn may correspond to the second diffusion break pattern RC provided on the other cell boundary of each of the first and third standard cells STD1 and STD3. A detailed description of the wide diffusion break pattern RCw may be substantially the same as that of the second diffusion break pattern RC discussed above with reference to FIG. 5.

The narrow diffusion break pattern RCn may extend in the first direction D1. The narrow diffusion break pattern RCn may separate neighboring standard cells from each other. The narrow diffusion break pattern RCn may define a narrow separation structure. The narrow diffusion break pattern RCn may overlap the gate pattern GP adjacent to a cell boundary. The narrow diffusion break pattern RCn may have substantially the same width as that of the gate pattern GP.

Figure 25:
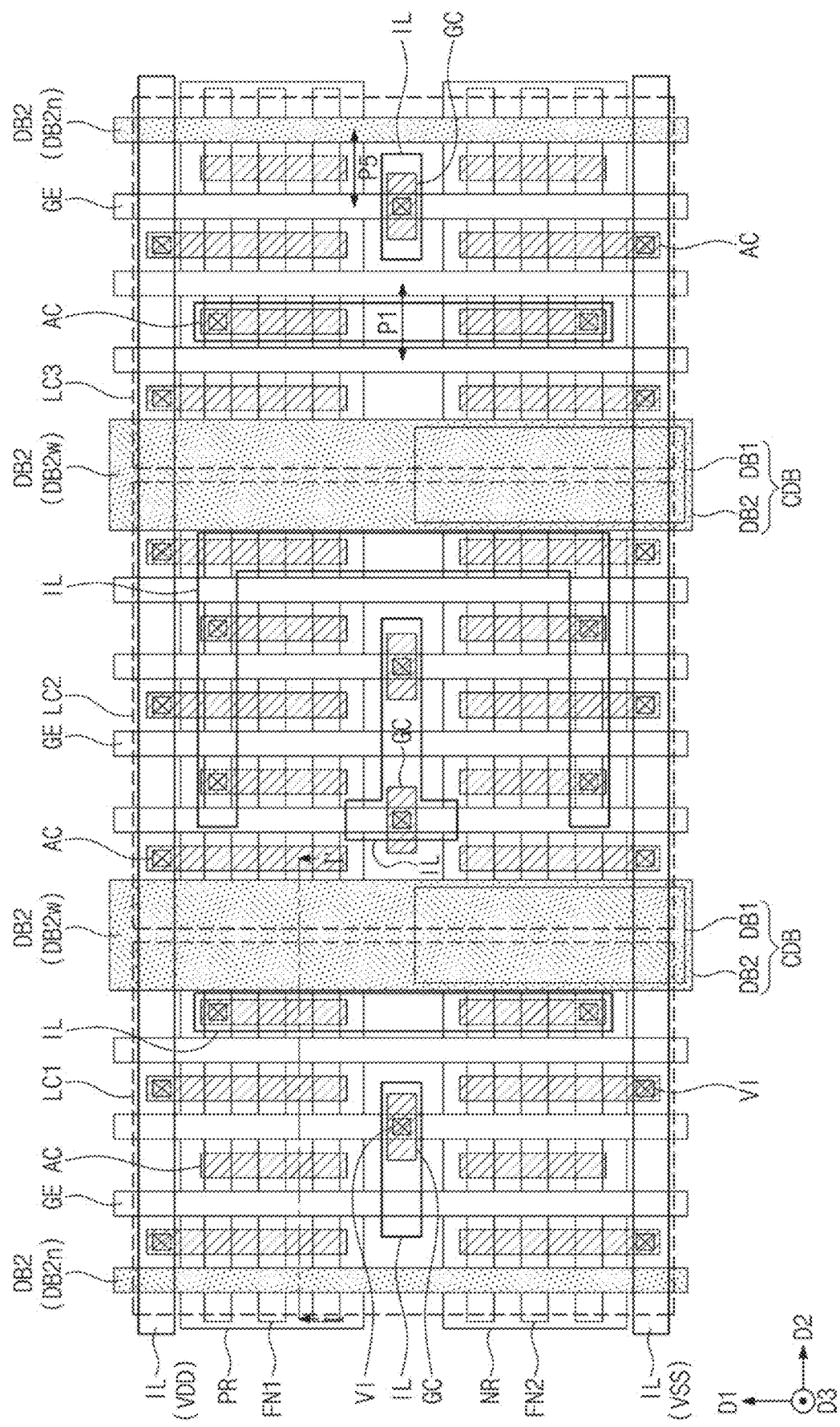
FIG. 25 illustrates a plan view showing a semiconductor device according to exemplary embodiments.
Figure 26:
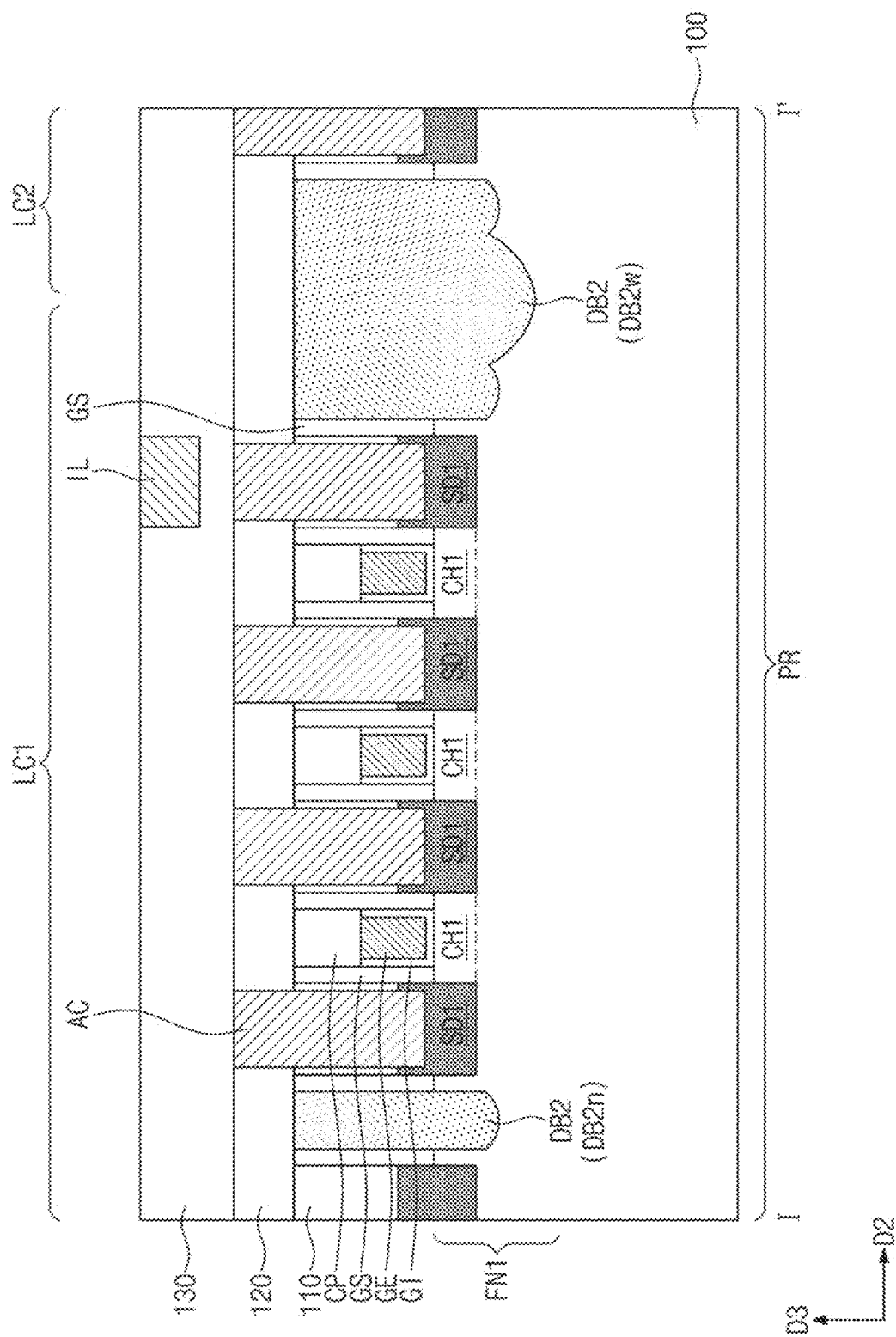
FIG. 26 illustrates a cross-sectional view taken along line I-I' of FIG. 25.

FIG. 25 illustrates a plan view showing a semiconductor device according to exemplary embodiments. FIG. 26 illustrates a cross-sectional view taken along line I-I' of FIG. 25. FIGS. 25 and 26 exemplarily show a semiconductor device actually achieved on a substrate when the layout of FIG. 24 is used. In the exemplary embodiment that follows, a detailed description of technical features repetitive to those discussed above with reference to FIGS. 6 and 7A to 7E will be omitted, and a difference thereof will be discussed in detail.

Referring to FIGS. 24, 25, and 26, the mixed separation structure CDB may be provided on each of the cell boundary between the first and second logic cells LC1 and LC2 and the cell boundary between the second and third logic cells LC2 and LC3. The mixed separation structure CDB may include the first separation structure DB1 and the second separation structure DB2. A detailed description of the mixed separation structure CDB may be substantially the same as that of the mixed separation structure CDB discussed above with reference to FIGS. 6 and 7A to 7E.

The second separation structure DB2 may be provided on each of other cell boundary of the first logic cell LC1 and other cell boundary of the third logic cell LC3. The second separation structure DB2 may include a wide separation structure DB2w and a narrow separation structure DB2n. The wide separation structure DB2w may correspond to the second separation structure DB2 of the mixed separation structure CDB, and the narrow separation structure DB2n may correspond to the second separation structure DB2 provided on the other cell boundary of each of the first and third logic cells LC1 and LC3.

The narrow separation structure DB2n may extend in the first direction D1 and run across the first and second active regions PR and NR. A pair of the gate spacers GS may be provided on opposite sidewalls of the narrow separation structure DB2n. The narrow separation structure DB2n may have substantially the same width as that of the gate electrode GE. The narrow separation structure DB2n and its adjacent gate electrode GE may have a fifth pitch P5 therebetween. The fifth pitch P5 may be substantially the same as the first pitch P1 between the gate electrodes GE.

Figure 27:
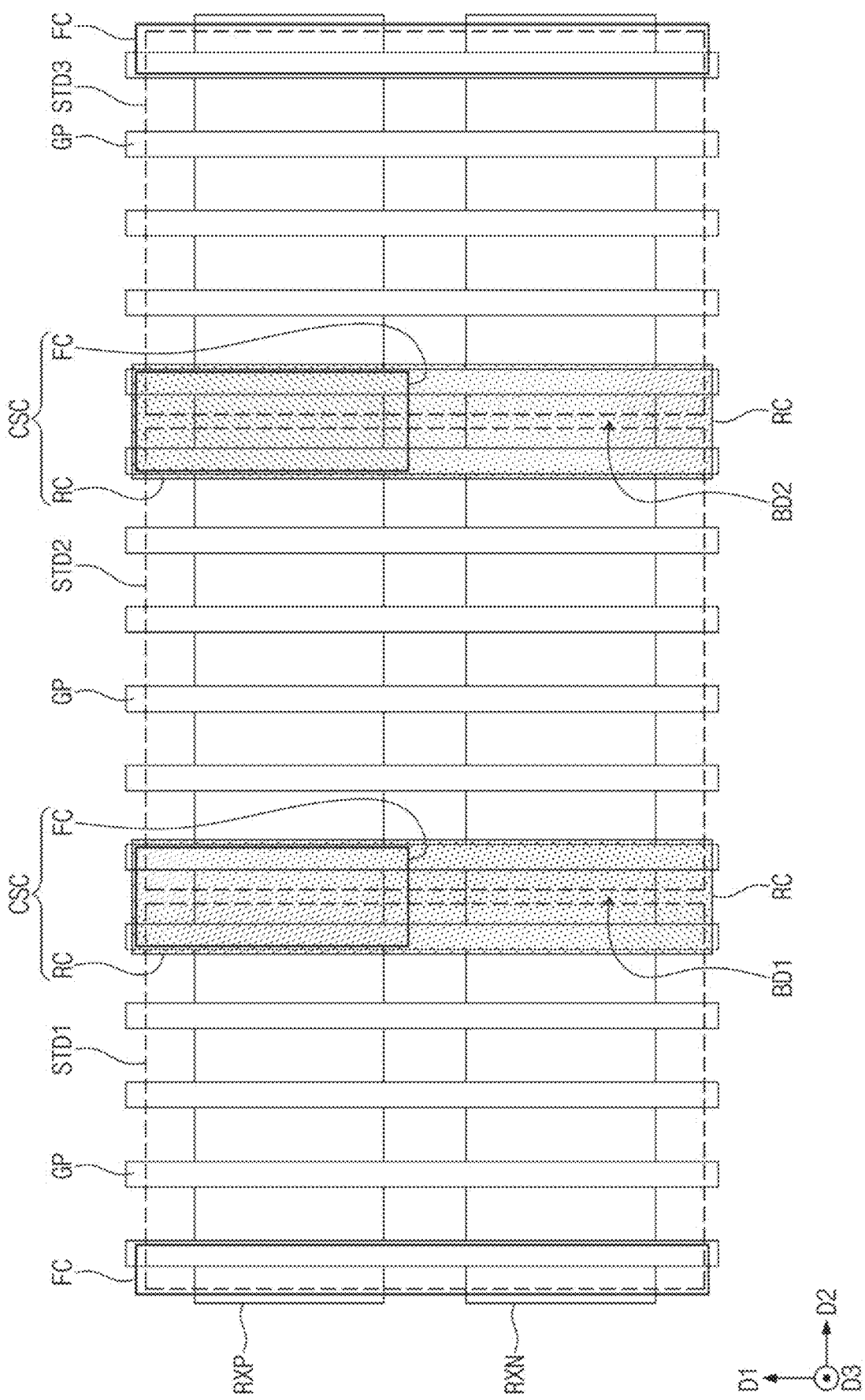
FIG. 27 illustrates a layout according to exemplary embodiments.

FIG. 27 illustrates a layout according to exemplary embodiments. In the exemplary embodiment that follows, a detailed description of technical features repetitive to those discussed above with reference to FIGS. 4 and 5 will be omitted, and a difference thereof will be discussed in detail.

Referring to FIG. 27, the first diffusion break pattern FC of the mixed diffusion break pattern CSC may be disposed limitedly on the first active region pattern RXP. For example, the first diffusion break pattern FC of the mixed diffusion break pattern CSC may separate the first active region pattern RXP of the first standard cell STD1 from the first active region pattern RXP of the second standard cell STD2.

Figure 28:
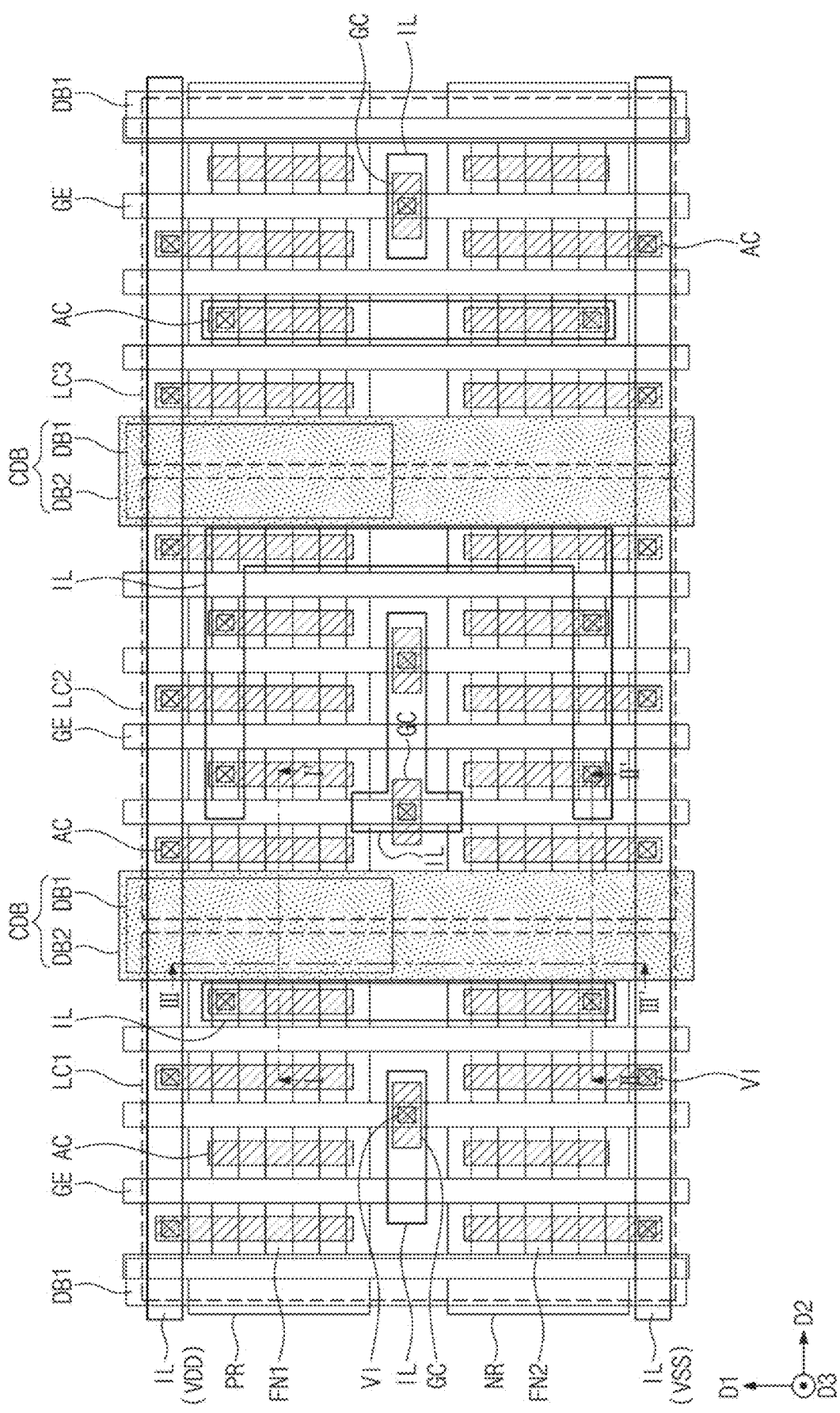
FIG. 28 illustrates a plan view showing a semiconductor device according to exemplary embodiments.
Figure 29A:
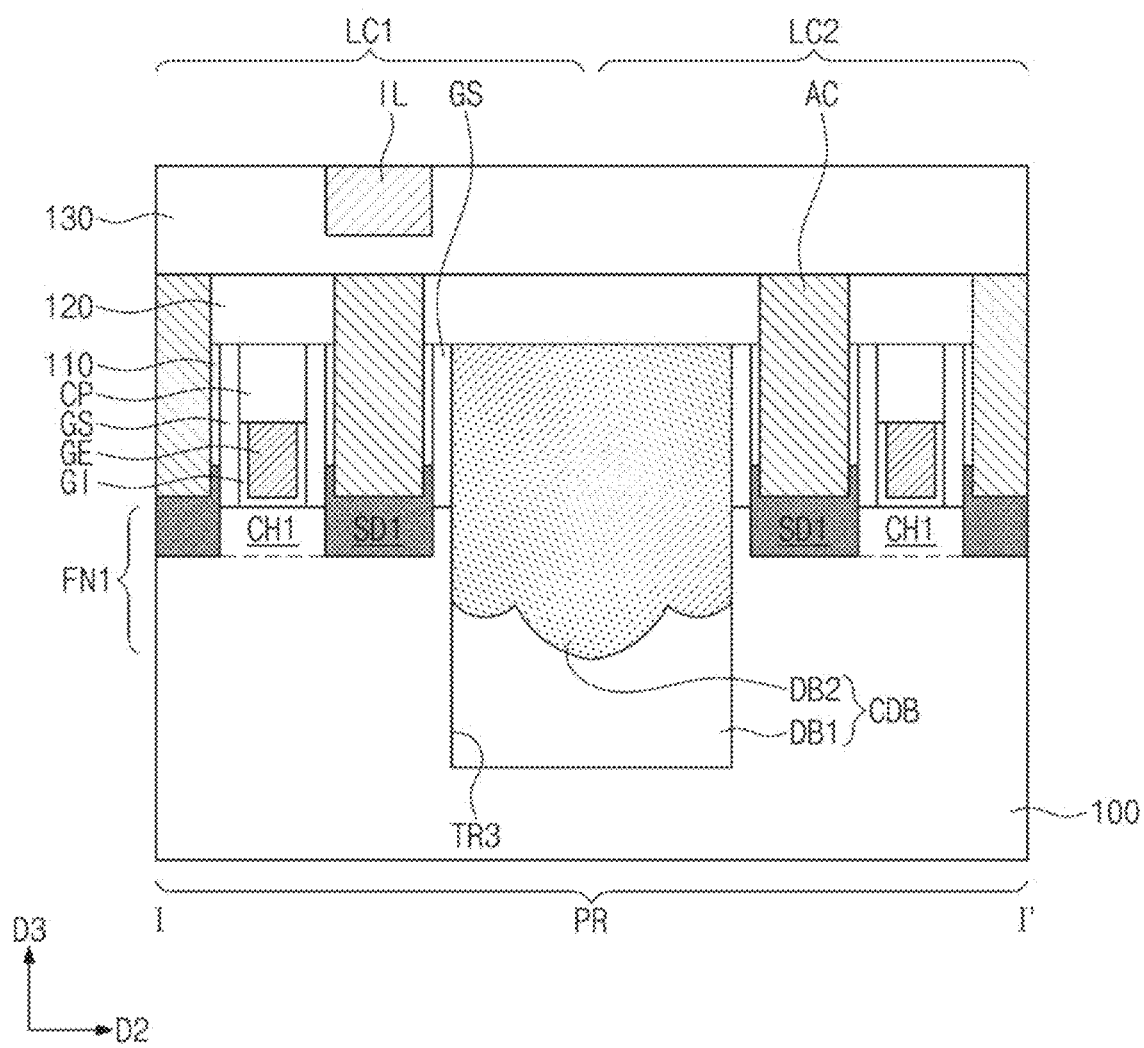
FIGS. 29A to 29C illustrate cross-sectional views respectively taken along lines I-I', II-II', and III-III' of FIG. 28.
Figure 29B:
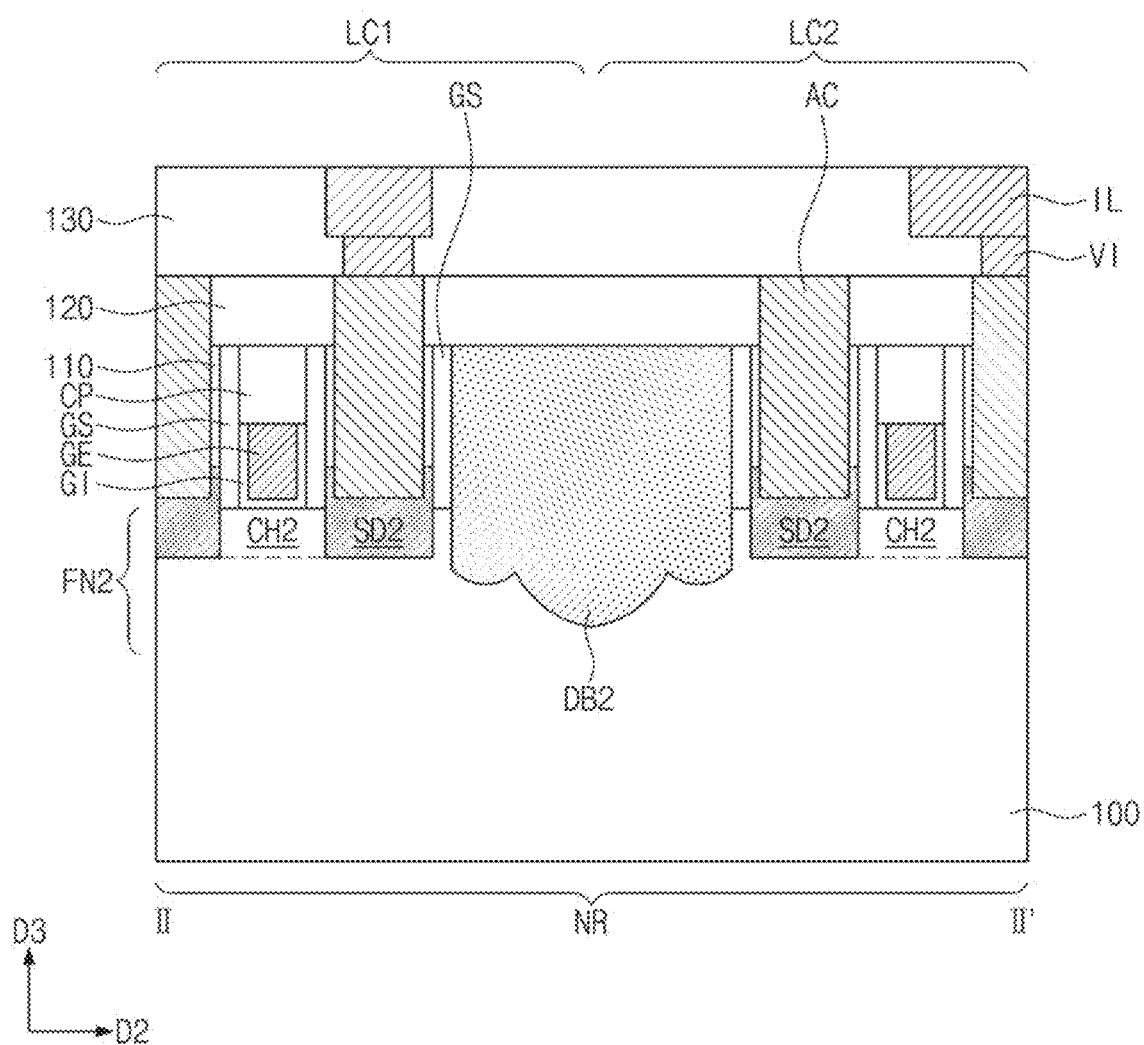
Figure 29C:
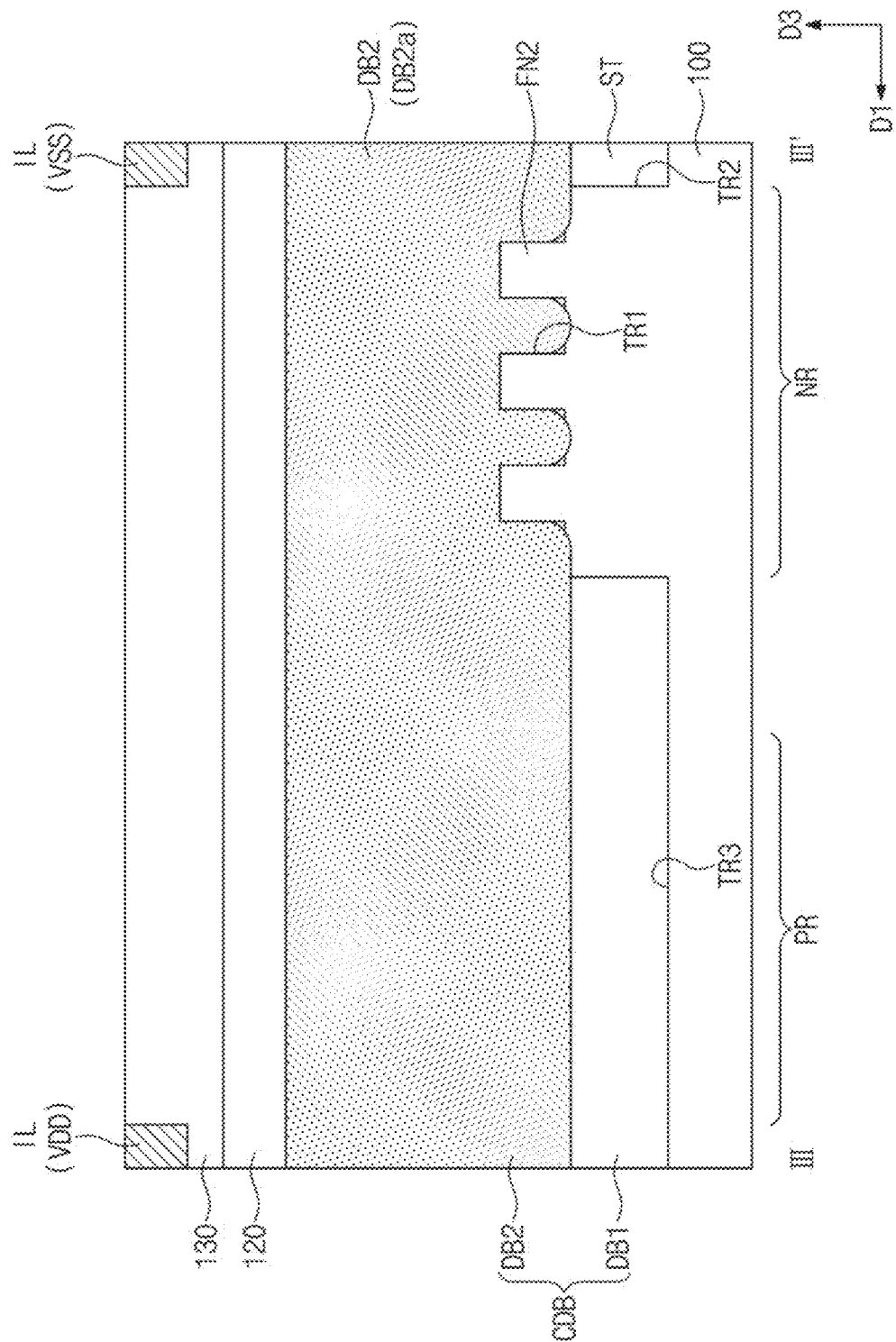

FIG. 28 illustrates a plan view showing a semiconductor device according to exemplary embodiments. FIGS. 29A to 29C illustrate cross-sectional views respectively taken along lines I-I', II-II', and III-III' of FIG. 28. FIGS. 28 and 29A to 29C exemplarily show a semiconductor device actually achieved on a substrate when the layout of FIG. 27 is used. In the exemplary embodiment that follows, a detailed description of technical features repetitive to those discussed above with reference to FIGS. 6 and 7A to 7E will be omitted, and a difference thereof will be discussed in detail.

Referring to FIGS. 27, 28, and 29A to 29C, the first separation structure DB1 of the mixed separation structure CDB may selectively run across the first active region PR except for the second active region NR. The first separation structure DB1 of the mixed separation structure CDB may separate the first active pattern FN1 of the first logic cell LC1 from the first active pattern FN1 of the second logic cell LC2. The first separation structure DB1 of the mixed separation structure CDB may separate the first active pattern FN1 of the second logic cell LC2 from the first active pattern FN1 of the third logic cell LC3.

Figure 30:
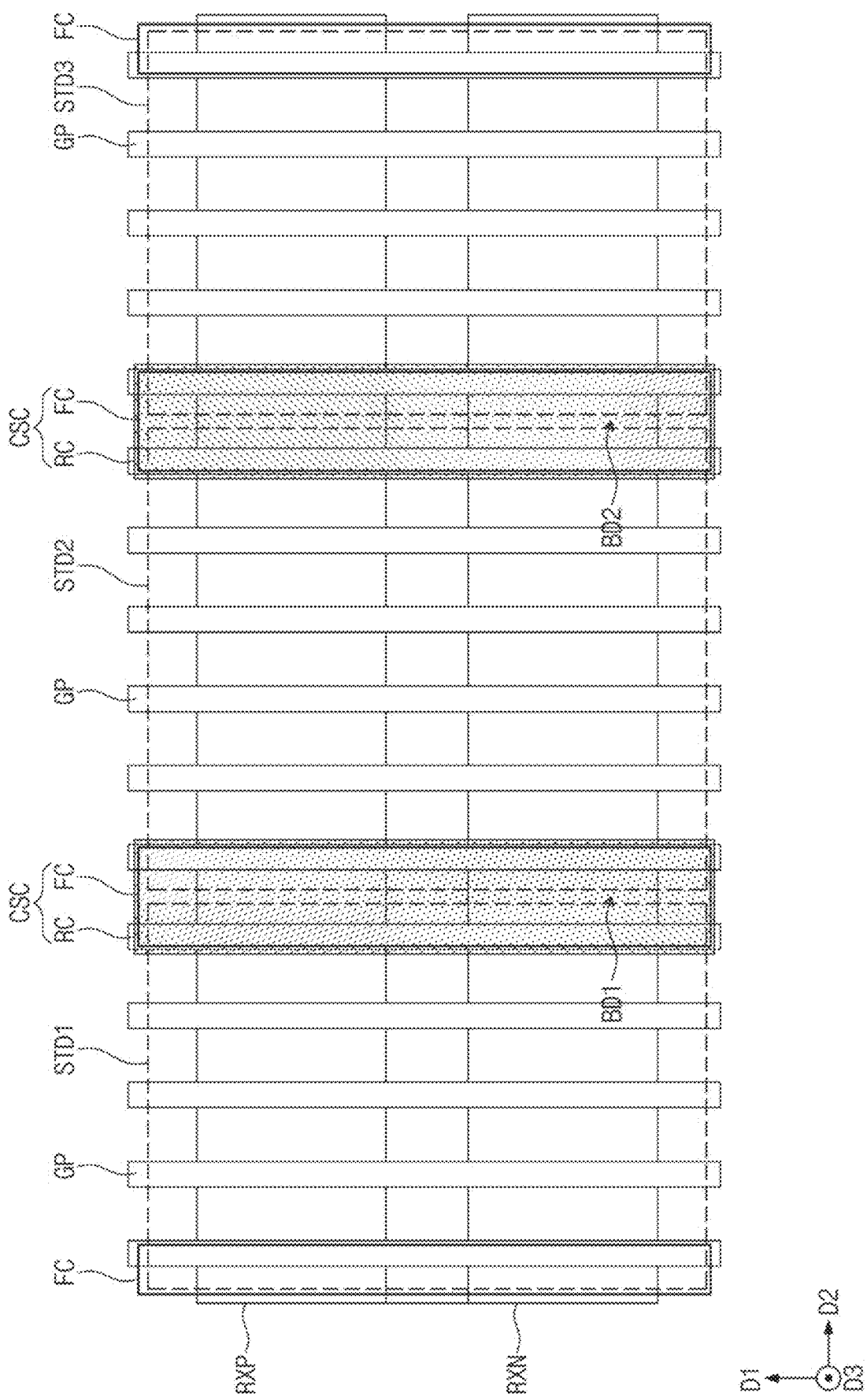
FIG. 30 illustrates a layout according to exemplary embodiments.

FIG. 30 illustrates a layout according to exemplary embodiments. In the exemplary embodiment that follows, a detailed description of technical features repetitive to those discussed above with reference to FIGS. 4 and 5 will be omitted, and a difference thereof will be discussed in detail.

Referring to FIG. 30, the first and second diffusion break patterns FC and RC of the mixed diffusion break pattern CSC may substantially overlap each other. For example, the first and second diffusion break patterns FC and RC of the mixed diffusion break pattern CSC may have substantially the same size and shape. The first diffusion break pattern FC of the mixed diffusion break pattern CSC may extend from the second active region pattern RXN toward the first active region pattern RXP. The second diffusion break pattern RC of the mixed diffusion break pattern CSC may extend from the second active region pattern RXN toward the first active region pattern RXP.

Figure 31:
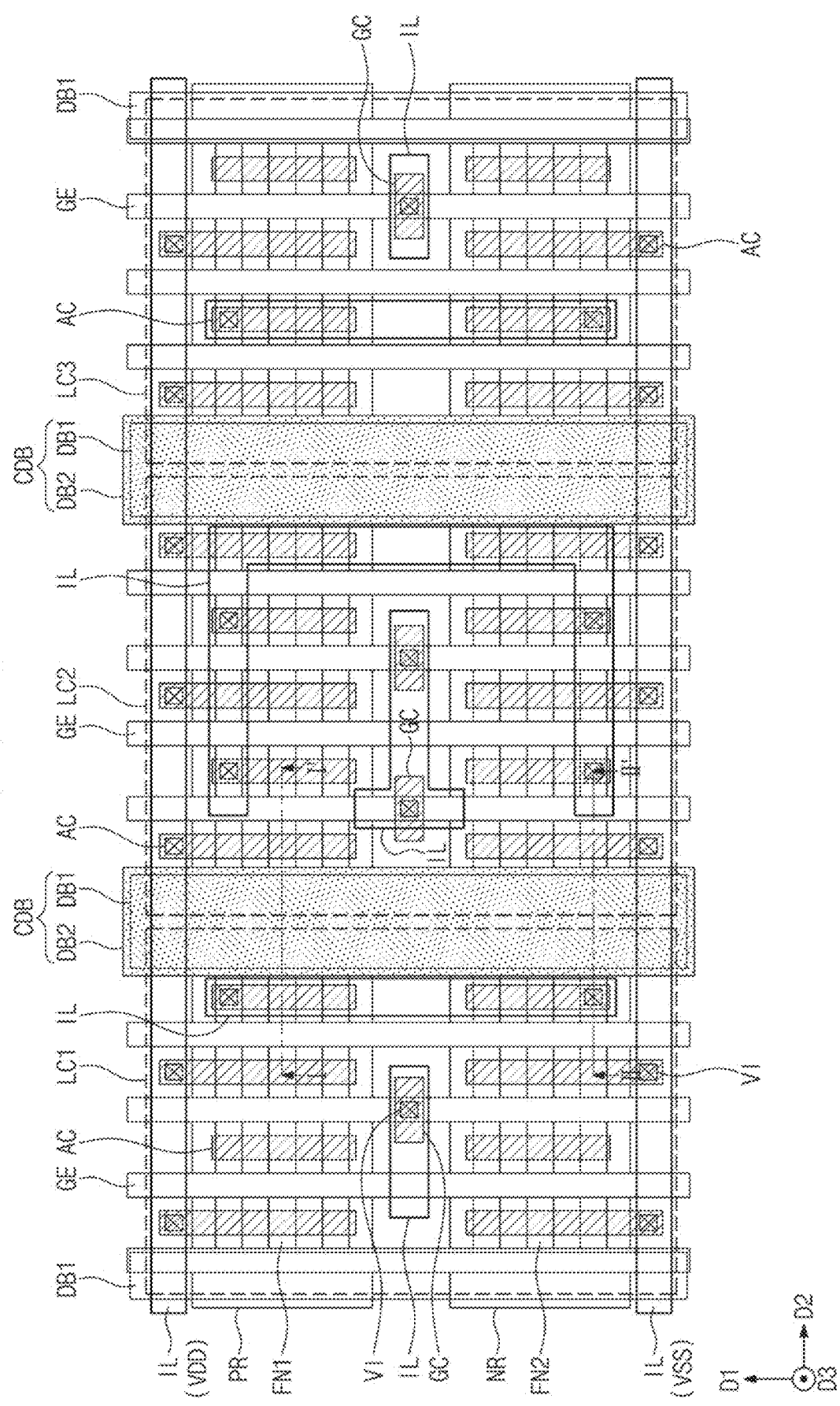
FIG. 31 illustrates a plan view showing a semiconductor device according to exemplary embodiments.
Figure 32A:
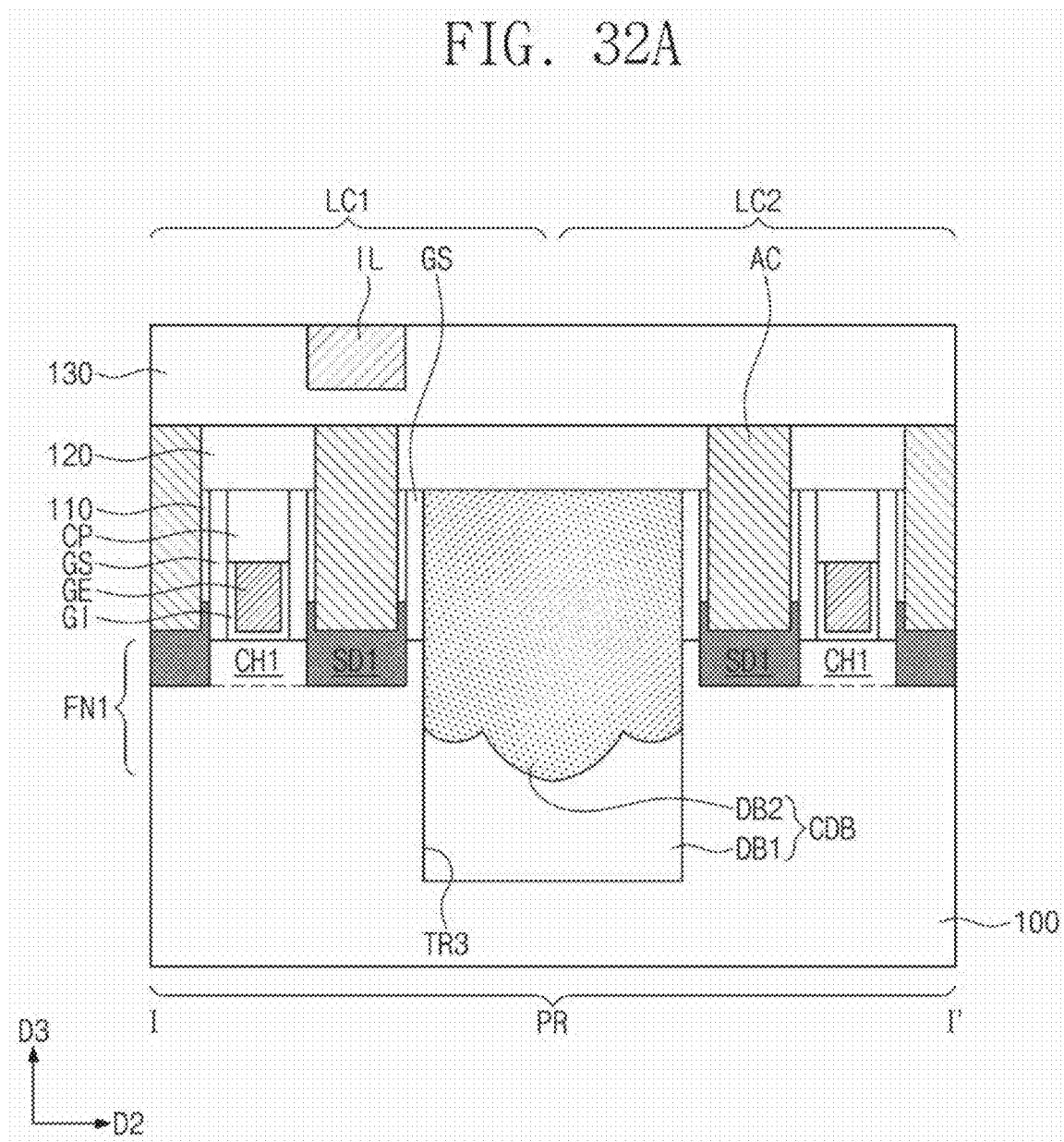
FIGS. 32A and 32B illustrate cross-sectional views respectively taken along lines I-I' and II-II' of FIG. 25.
Figure 32B:
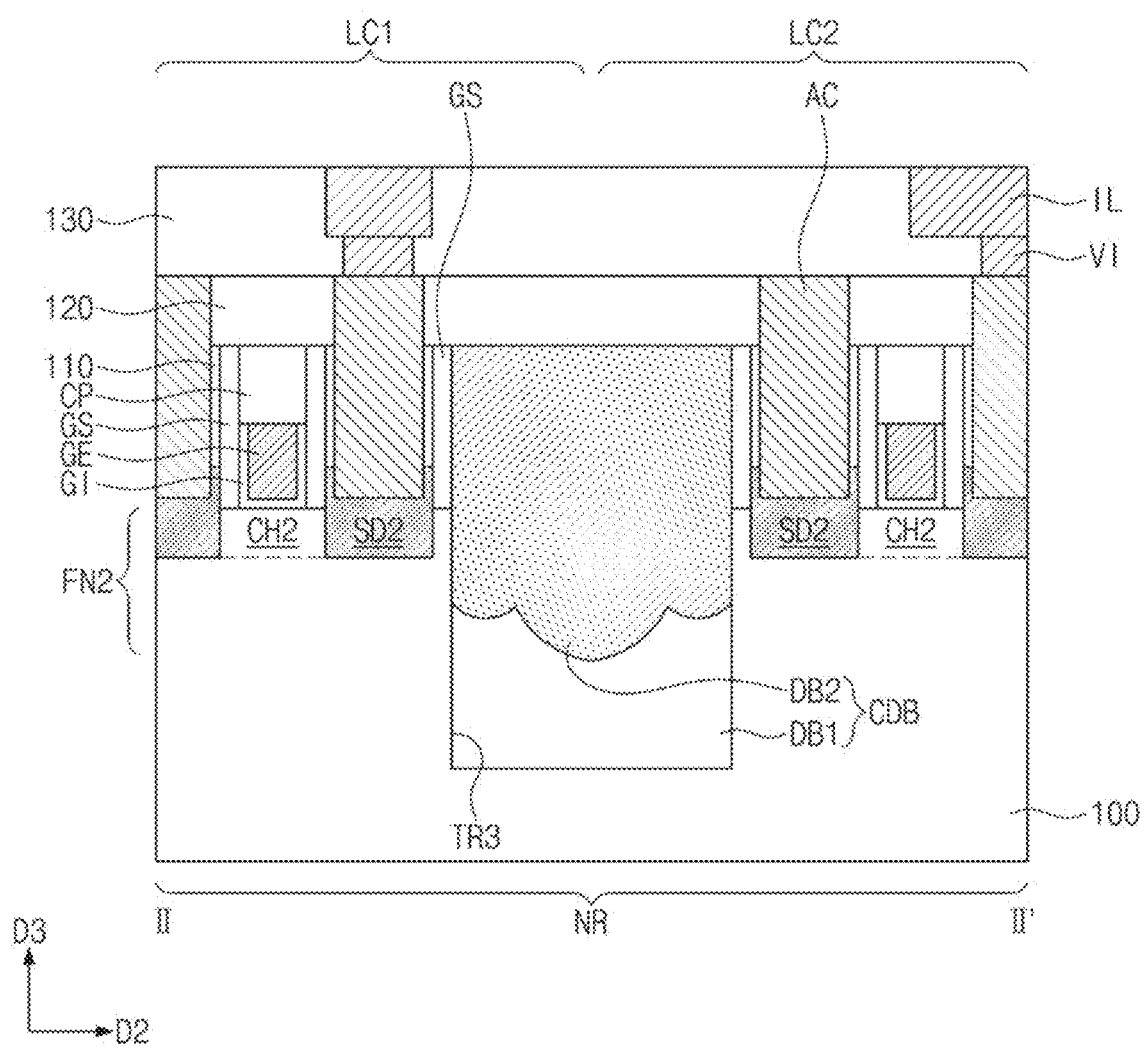

FIG. 31 illustrates a plan view showing a semiconductor device according to exemplary embodiments. FIGS. 32A and 32B illustrate cross-sectional view respectively taken along lines I-I' and II-II' of FIG. 25. FIGS. 31, 32A, and 32B exemplarily show a semiconductor device actually achieved on a substrate when the layout of FIG. 30 is used. In the exemplary embodiment that follows, a detailed description of technical features repetitive to those discussed above with reference to FIGS. 6 and 7A to 7E will be omitted, and a difference thereof will be discussed in detail.

Referring to FIGS. 30, 31, 32A, and 32B, the mixed separation structure CDB may be provided on each of the cell boundary between the first and second logic cells LC1 and LC2 and the cell boundary between the second and third logic cells LC2 and LC3.

The mixed separation structure CDB may be configured in such a way that the second separation structure DB2 is provided on the first separation structure DB1. The mixed separation structure CDB may have a structure in which the second separation structure DB2 vertically overlaps the first separation structure DB1. The first active patterns FN1 in neighboring logic cells may be separated from each other by the mixed separation structure CDB having a structure where the first and second separation structures DB1 and DB2 are stacked. The second active patterns FN2 in neighboring logic cells may be separated from each other by the mixed separation structure CDB having a structure where the first and second separation structures DB1 and DB2 are stacked.

Figure 33:
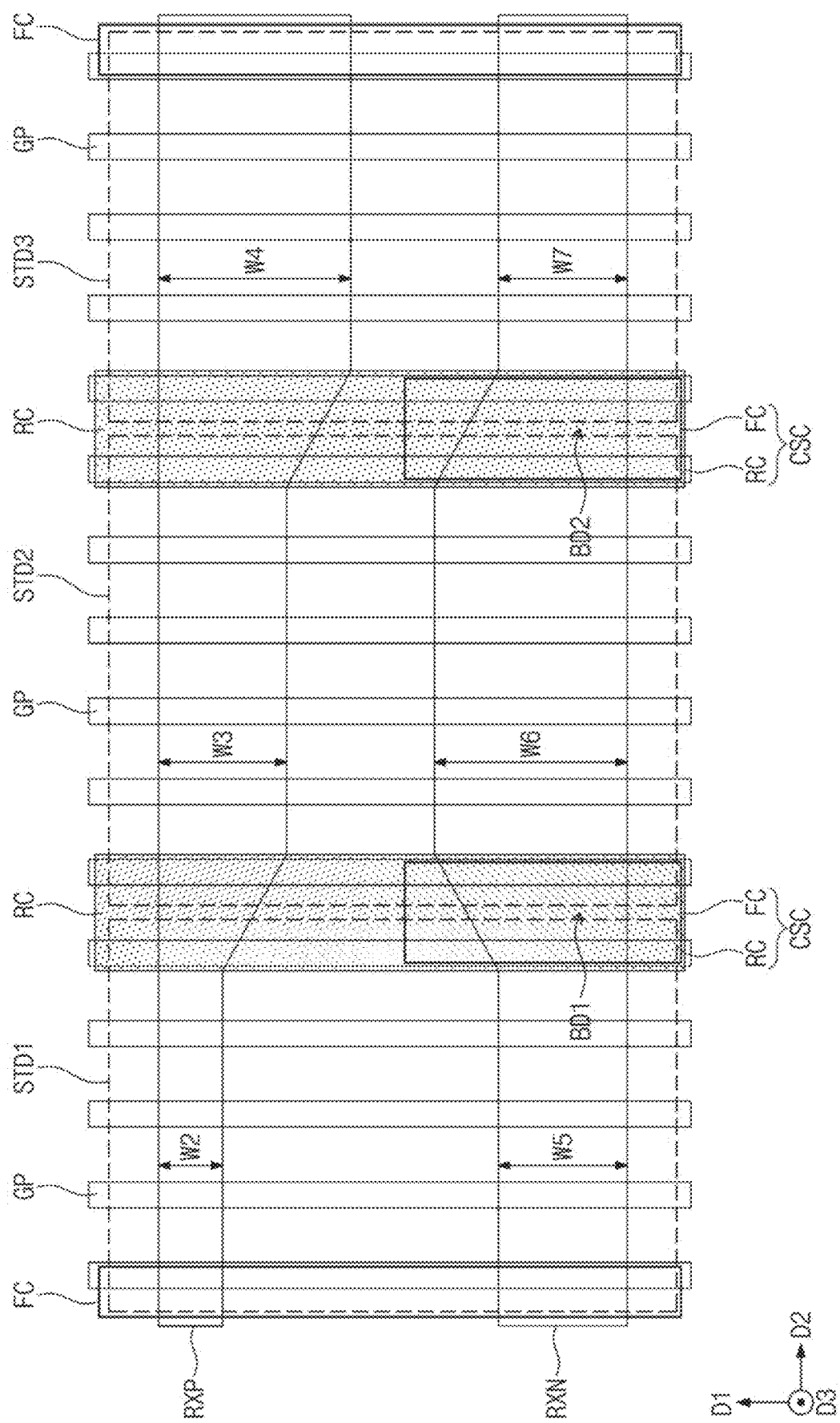
FIG. 33 illustrates a layout according to exemplary embodiments.

FIG. 33 illustrates a layout according to exemplary embodiments. In the exemplary embodiment that follows, a detailed description of technical features repetitive to those discussed above with reference to FIGS. 4 and 5 will be omitted, and a difference thereof will be discussed in detail.

Referring to FIG. 33, the first active region pattern RXP may have a variable width in the first direction D1. For example, the first active region pattern RXP of the first standard cell STD1 may have a second width W2 in the first direction D1. The first active region pattern RXP of the second standard cell STD2 may have a third width W3 in the first direction D1. The first active region pattern RXP of the third standard cell STD3 may have a fourth width W4 in the first direction D1. The second to fourth widths W2, W3, and W4 may be different from one another. The third width W3 may be greater than the second width W2, and the fourth width W4 may be greater than the third width W3.

The second active region pattern RXN may have a variable width in the first direction D1. For example, the second active region pattern RXN of the first standard cell STD1 may have a fifth width W5 in the first direction D1. The second active region pattern RXN of the second standard cell STD2 may have a sixth width W6 in the first direction D1. The second active region pattern RXN of the third standard cell STD3 may have a seventh width W7 in the first direction D1. The fifth to seventh widths W5, W6, and W7 may be different from one another. The sixth width W6 may be greater than the fifth width W5, and the fifth and seventh widths W5 and W7 may be substantially the same as each other.

Within the mixed diffusion break pattern CSC on the first cell boundary BD1, the first and second active region patterns RXP and RXN may have their variable widths. For example, within the mixed diffusion break pattern CSC on the first cell boundary BD1, the width of the first active region pattern RXP may be changed from the second width W2 into the third width W3. Within the mixed diffusion break pattern CSC on the first cell boundary BD1, the width of the second active region pattern RXN may be changed from the fifth width W5 into the sixth width W6.

Within the mixed diffusion break pattern CSC on the second cell boundary BD2, the first and second active region patterns RXP and RXN may have their variable widths. For example, within the mixed diffusion break pattern CSC on the second cell boundary BD2, the width of the first active region pattern RXP may be changed from the third width W3 into the fourth width W4. Within the mixed diffusion break pattern CSC on the second cell boundary BD2, the width of the second active region pattern RXN may be changed from the sixth width W6 into the seventh width W7.

Figure 34:
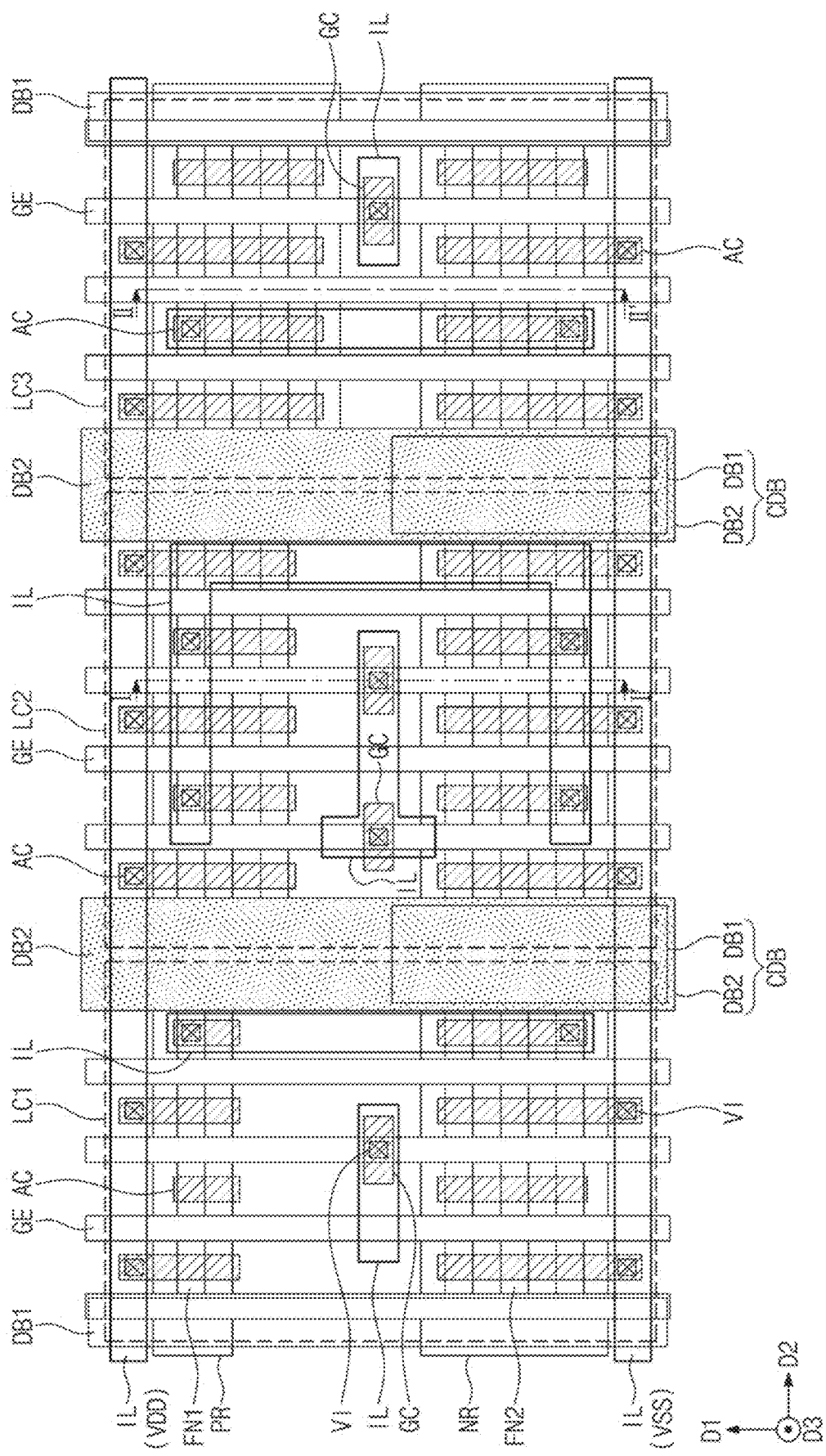
FIG. 34 illustrates a plan view showing a semiconductor device according to exemplary embodiments.
Figure 35A:
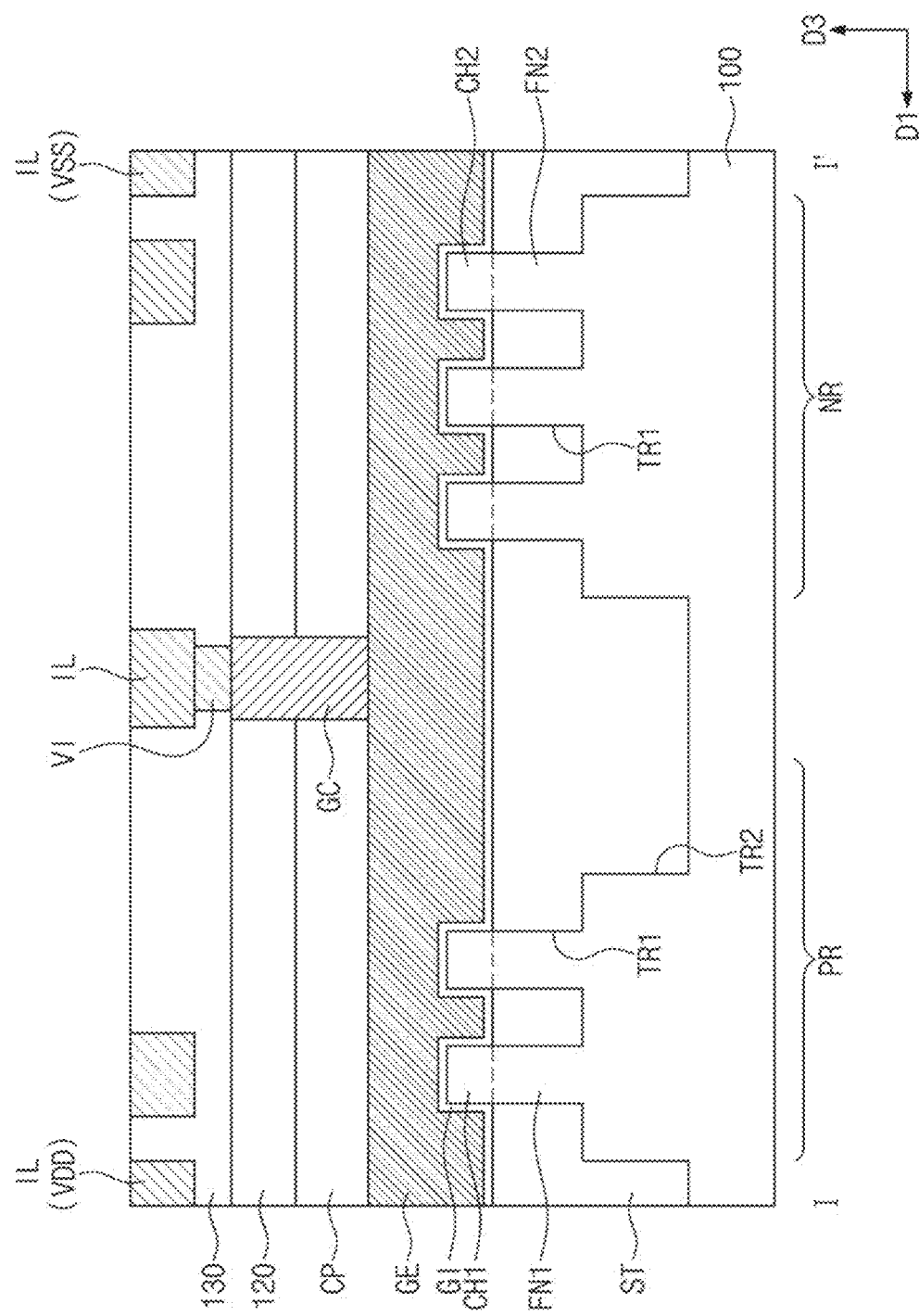
FIGS. 35A and 35B illustrate cross-sectional views respectively taken along lines I-I' and II-II' of FIG. 34.
Figure 35B:
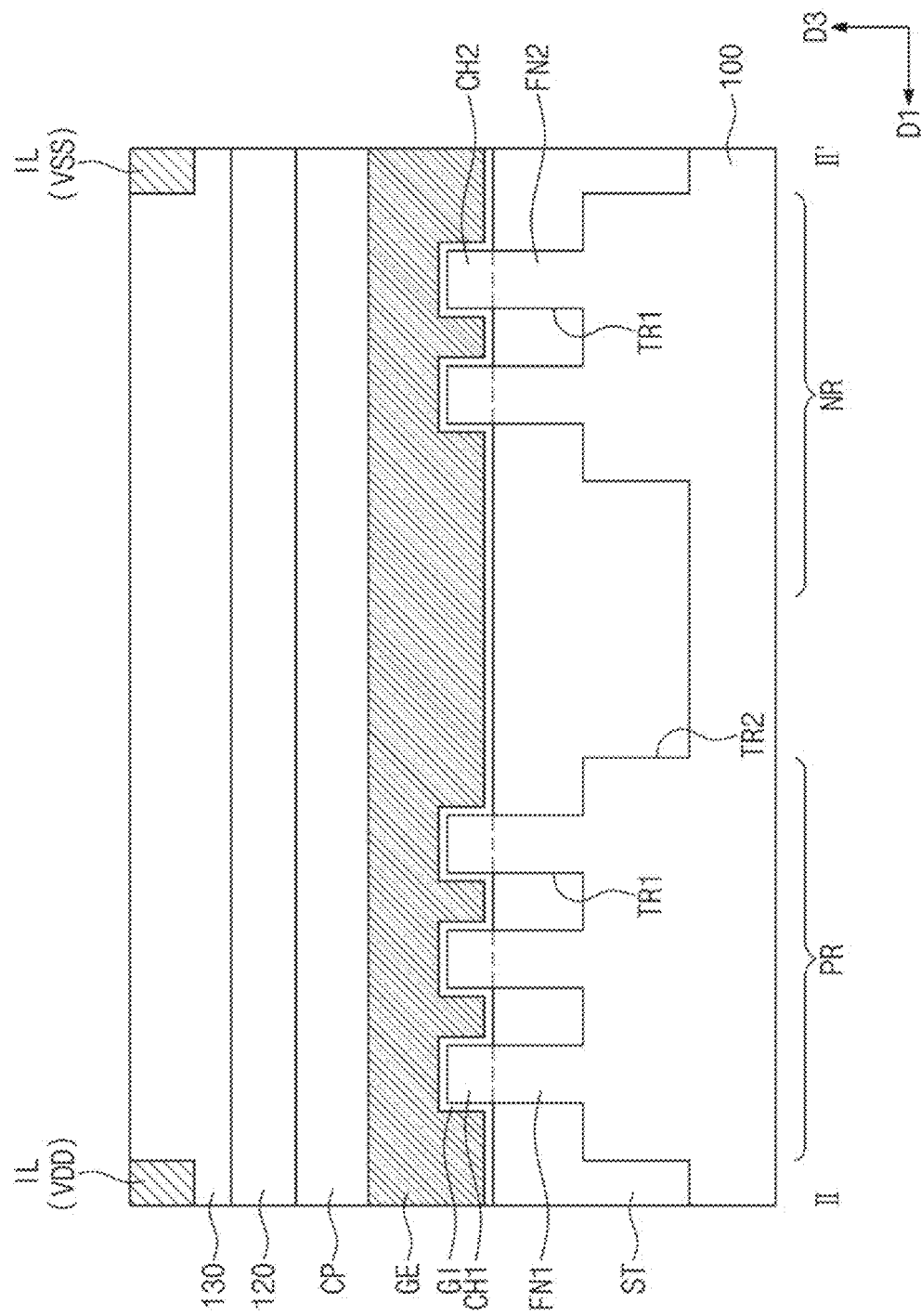

FIG. 34 illustrates a plan view showing a semiconductor device according to exemplary embodiments. FIGS. 35A and 35B illustrate cross-sectional views respectively taken along lines I-I' and II-II' of FIG. 34. FIGS. 34, 35A, and 35B exemplarily show a semiconductor device actually achieved on a substrate when the layout of FIG. 33 is used. In the exemplary embodiment that follows, a detailed description of technical features repetitive to those discussed above with reference to FIGS. 6 and 7A to 7E will be omitted, and a difference thereof will be discussed in detail.

Referring to FIGS. 33, 34, 35A, and 35B, the first active region PR may have a variable width in the first direction D1. The variation in width of the first active region PR may be similar to that of the first active region pattern RXP discussed above with reference to FIG. 33. The second active region NR may have a variable width in the first direction D1. The variation in width of the second active region NR may be similar to that of the second active region pattern RXN discussed above with reference to FIG. 33.

The first logic cell LC1 may include one first active pattern FN1, the second logic cell LC2 may include two first active patterns FN1, and the third logic cell LC3 may include three first active patterns FN1. The first logic cell LC1 may include two second active patterns FN2, the second logic cell LC2 may include three second active patterns FN2, and the third logic cell LC3 may include two second active patterns FN2.

The number of the first active patterns FN1 on one side of the mixed separation structure CDB may be different from that of the first active patterns FN1 on opposite side of the mixed separation structure CDB. The number of the second active patterns FN2 on one side of the mixed separation structure CDB may be different from that of the second active patterns FN2 on opposite side of the mixed separation structure CDB. For example, the second logic cell LC2 may include two first active patterns FN1 and three second active patterns FN2 (see FIG. 35A). The third logic cell LC3 may include three first active patterns FN1 and two second active patterns FN2 (see FIG. 35B). The mixed separation structure CDB may be positioned between the second and third logic cells LC2 and LC3 and the number of active patterns on one side of the mixed separation structure CDB may be different from that of active patterns on opposite side of the mixed separation structure CDB. The mixed separation structure CDB may be positioned on an area where the number of active patterns is changed, which configuration may prevent occurrence of various variables caused by the change in number of active patterns.

According to exemplary embodiments, semiconductor devices may be configured in such a way that a mixed separation structure is provided on a boundary between neighboring logic cells. Electrical characteristics of semiconductor devices may be improved by appropriate arrangement of first and second separation structures in the mixed separation structure.

Although exemplary embodiments have been discussed with reference to accompanying figures, it will be understood that various changes in form and details may be made therein without departing from the spirit and scope of exemplary embodiments. It therefore will be understood that the exemplary embodiments described above are just illustrative but not limitative in all aspects, the scope being defined by the appended claims.

What is claimed is:

1. A semiconductor device comprising:
   a substrate including a first active region;
   a first active pattern on the first active region;
   a plurality of gate electrodes extending in a first direction, spanning the first active pattern, and having a first pitch; and
   a pair of first separation structures including an insulating material, extending in the first direction, and having a second pitch,
   wherein the second pitch is substantially the same with the first pitch.

2. The semiconductor device of claim 1, further comprising a plurality of source/drain regions on the first active pattern,
   wherein a first one of the plurality of source/drain regions is interposed between a pair of the plurality of gate electrodes, and
   wherein a second one of the plurality of source/drain regions is interposed between the pair of first separation structures.

3. The semiconductor device of claim 2, further comprising a plurality of active contacts on the plurality of source/drain regions, respectively.

4. The semiconductor device of claim 3, further comprising an interlayer dielectric layer on the substrate,
   wherein a top surface of the interlayer dielectric layer and top surfaces of the pair of first separation structures are positioned at the same level.

5. The semiconductor device of claim 4, wherein top surfaces of the plurality of active contacts are positioned at a higher level than the top surfaces of the pair of first separation structures.

6. The semiconductor device of claim 2, wherein the plurality of source/drain regions include silicon-germanium.

7. The semiconductor device of claim 1, wherein one of the pair of first separation structures is adjacent to one of the plurality of gate electrodes in a second direction crossing the first direction,
   wherein the one of the pair of first separation structures and the one of the plurality of gate electrodes have a third pitch, and
   wherein the third pitch is substantially the same with the first pitch.

8. The semiconductor device of claim 1, further comprising a second active pattern on a second active region of the substrate,
   wherein the first active pattern includes a plurality of first active fins extending in a second direction crossing the first direction,
   wherein the second active pattern includes a plurality of second active fins extending in the second direction, and
   wherein the first active region is a PMOSFET region and the second active region is an NMOSFET region.

9. The semiconductor device of claim 8, further comprising a device isolation layer on the substrate,
   wherein the device isolation layer covers a sidewall of a lower portion of each of the first and second active fins, and
   wherein an upper portion of each of the first and second active fins protrudes upwardly from the device isolation layer.

10. The semiconductor device of claim 1, further comprising a gate separation structure interposed between one of the pair of first separation structures and one of the plurality of gate electrodes,
  wherein the one of the pair of first separation structures, the gate separation structure, and the one of the plurality of gate electrodes are arranged in the first direction.

11. The semiconductor device of claim 10, wherein the gate separation structure includes a silicon nitride layer, or a silicon oxynitride layer.

12. The semiconductor device of claim 10, wherein a first sidewall of the gate separation structure contacts the one of the pair of first separation structures, and
  a second sidewall of the gate separation structure that is opposite to the first sidewall contacts the one of the plurality of gate electrodes.

13. The semiconductor device of claim 1, further comprising a second separation structure having a width greater than the first pitch,
  wherein a bottom surface of each of the pair of first separation structures is positioned at a level different from that of the second separation structure.

14. The semiconductor device of claim 13, wherein the pair of first separation structures include a material different from the second separation structure.

15. The semiconductor device of claim 14, wherein the pair of first separation structures include a silicon nitride layer, or a silicon oxynitride layer.

16. The semiconductor device of claim 1, further comprising a plurality of gate spacers,
  wherein one of the plurality of gate electrodes is between a first pair of the plurality of gate spacers, and
  wherein one of the pair of first separation structures is between a second pair of the plurality of gate spacers.

17. The semiconductor device of claim 1, wherein the pair of first separation structures include a silicon nitride layer, or a silicon oxynitride layer.

18. A semiconductor device comprising:
  a substrate including a first active region;
  a first active fin and a second active fin that are on the first active region;
  a device isolation layer on the substrate, the device isolation layer covering a sidewall of a lower portion of each of the first and second active fins;
  a plurality of gate electrodes on the first and second active fins, the plurality of gate electrodes having a first pitch; and
  a pair of separation structures between the first active fin and the second active fin, the pair of separation structures including an insulating material and having a second pitch,
  wherein the second pitch is substantially the same with the first pitch.

19. The semiconductor device of claim 18, further comprising:
  a plurality of source/drain regions on the first active fin; and
  a plurality of active contacts on the plurality of source/drain regions, respectively,
  wherein a first one of the plurality of source/drain regions is interposed between a pair of the plurality of gate electrodes, and
  wherein a second one of the plurality of source/drain regions is interposed between the pair of separation structures.

20. The semiconductor device of claim 18, further comprising a gate separation structure interposed between one of the pair of separation structures and one of the plurality of gate electrodes,
  wherein the one of the pair of separation structures, the gate separation structure, and the one of the plurality of gate electrodes are arranged in a first direction.

21. The semiconductor device of claim 20, wherein the gate separation structure includes a silicon nitride layer, or a silicon oxynitride layer.

22. The semiconductor device of claim 18, wherein the pair of separation structures include a silicon nitride layer, or a silicon oxynitride layer.

23. A semiconductor device comprising:
  a first logic cell and a second logic cell that are on a substrate, the first logic cell including a first active region and the second logic cell including a second active region;
  a first active pattern and a second active pattern that are on the first active region and the second active region, respectively;
  a plurality of gate electrodes on the first active region, the plurality of gate electrodes extending in a first direction and having a first pitch; and
  a pair of separation structures between the first active region and the second active region, the pair of separation structures including an insulating material, extending in the first direction, and having a second pitch,
  wherein the second pitch is substantially the same with the first pitch.

24. The semiconductor device of claim 23, wherein a boundary between the first and second logic cells extends in the first direction and between the pair of separation structures.

25. The semiconductor device of claim 23, wherein the first active pattern includes a plurality of first active fins extending in a second direction, and
  wherein the second active pattern includes a plurality of second active fins extending in the second direction.

26. The semiconductor device of claim 25, wherein the first logic cell further includes a third active region,
  wherein the second logic cell further includes a fourth active region,
  wherein the semiconductor device further comprises a plurality of third active fins and a plurality of fourth active fins that are on the third active region and the fourth active region, respectively, and
  wherein the first active region is a PMOSFET region and the third active region is an NMOSFET region.

27. The semiconductor device of claim 23, further comprising a gate separation structure interposed between one of the pair of separation structures and one of the plurality of gate electrodes,
  wherein the one of the pair of separation structures, the gate separation structure, and the one of the plurality of gate electrodes are arranged in the first direction.

28. The semiconductor device of claim 23, wherein one of the pair of separation structures is adjacent to one of the plurality of gate electrodes in a second direction crossing the first direction,
  wherein the one of the pair of separation structures and the one of the plurality of gate electrodes have a third pitch, and
  wherein the third pitch is substantially the same with the first pitch.

29. The semiconductor device of claim 23, wherein the pair of separation structures include a silicon nitride layer, or a silicon oxynitride layer.

* * * * *